US012654751B2

(12) United States Patent
Braatz et al.

(10) Patent No.: US 12,654,751 B2
(45) Date of Patent: Jun. 16, 2026

(54) SYSTEMS AND METHODS FOR RETARDING THE SPEED OF A RAILCAR

(71) Applicant: Precision Rail and Mfg., Inc., Oak Creek, WI (US)

(72) Inventors: James D. Braatz, Oak Creek, WI (US); Ryan Flitsch, Salem Lakes, WI (US); Joshua Stockton, Pleasant Prairie, WI (US); David Dworschack, Oak Creek, WI (US)

(73) Assignee: Precision Rail and Mfg., Inc., Oak Creek, WI (US)

( * ) Notice: Subject to any disclaimer, the term of this patent is extended or adjusted under 35 U.S.C. 154(b) by 498 days.

(21) Appl. No.: 18/188,215

(22) Filed: Mar. 22, 2023

(65) Prior Publication Data

US 2023/0303136 A1      Sep. 28, 2023

Related U.S. Application Data

(60) Provisional application No. 63/323,392, filed on Mar. 24, 2022.

(51) Int. Cl.
B61K 7/08 (2006.01)
B61K 7/04 (2006.01)
(Continued)

(52) U.S. Cl.
CPC .................. B61K 7/04 (2013.01); B61K 7/08 (2013.01); F16D 65/78 (2013.01); F16D 65/813 (2013.01); F16D 2065/782 (2013.01)

(58) Field of Classification Search
CPC ...... F16D 65/78; F16D 65/813; F16D 65/853; B61K 7/04; B61K 7/08
See application file for complete search history.

(56) References Cited

U.S. PATENT DOCUMENTS

| | | | | |
|---|---|---|---|---|
| 3,216,769 A | * | 11/1965 | Hicks | ...................... F16D 65/78 |
| | | | | 303/6.01 |
| 4,393,960 A | | 7/1983 | Mazur et al. | |

(Continued)

FOREIGN PATENT DOCUMENTS

| | | | | |
|---|---|---|---|---|
| RU | 2686018 C1 | * | 4/2019 | ............ H02P 27/047 |

OTHER PUBLICATIONS

RU-2686018-C1 (Year: 2019).*

*Primary Examiner* — Thomas J Williams
(74) *Attorney, Agent, or Firm* — ANDRUS INTELLECTUAL PROPERTY LAW, LLP

(57) ABSTRACT

A system for retarding a railcar having wheels. The system includes a brake and an actuator that moves the brake between a closed position in which the brake contacts the wheels of the railcar and an open position in which the brake does not contact the wheels of the railcar. The system further includes a hydraulic circuit through which a hydraulic fluid flows between the actuator and a reservoir. A first pump is operably connected within the hydraulic circuit and configured to provide the hydraulic fluid to the actuator for operating the brake. A heat exchanger is operably connected within the hydraulic circuit and configured to cool the hydraulic fluid flowing therethrough. A second pump is operably connected within the hydraulic circuit and configured to provide the hydraulic fluid to the heat exchanger. The heat exchanger prevents the hydraulic fluid within the hydraulic fluid from exceeding a target operating temperature.

20 Claims, 35 Drawing Sheets

(51) Int. Cl.
_F16D 65/78_ (2006.01)
_F16D 65/813_ (2006.01)

(56) References Cited

U.S. PATENT DOCUMENTS

| | | | |
|---|---|---|---|
| 4,988,273 A * | 1/1991 | Faig .......................... | H02P 6/04 |
| | | | 425/149 |
| 7,140,698 B2 | 11/2006 | Braatz et al. | |
| 8,413,770 B1 | 4/2013 | Heyden et al. | |
| 8,499,900 B1 | 8/2013 | Heyden et al. | |
| 8,899,385 B2 * | 12/2014 | Frailing .................. | B61K 7/08 |
| | | | 188/62 |
| 9,862,368 B2 * | 1/2018 | Majeskie .............. | B60T 17/228 |
| 2009/0050424 A1 * | 2/2009 | Bares ...................... | F16D 65/78 |
| | | | 165/41 |
| 2011/0315491 A1 | 12/2011 | Frailing et al. | |
| 2013/0069456 A1 * | 3/2013 | Matsuki ................. | H02K 5/203 |
| | | | 310/54 |
| 2013/0287596 A1 * | 10/2013 | Geneau ............... | F04D 15/0066 |
| | | | 417/44.1 |
| 2023/0303136 A1 * | 9/2023 | Braatz ..................... | F16D 65/78 |
| 2023/0331265 A1 * | 10/2023 | Braatz ..................... | B61K 7/12 |

* cited by examiner

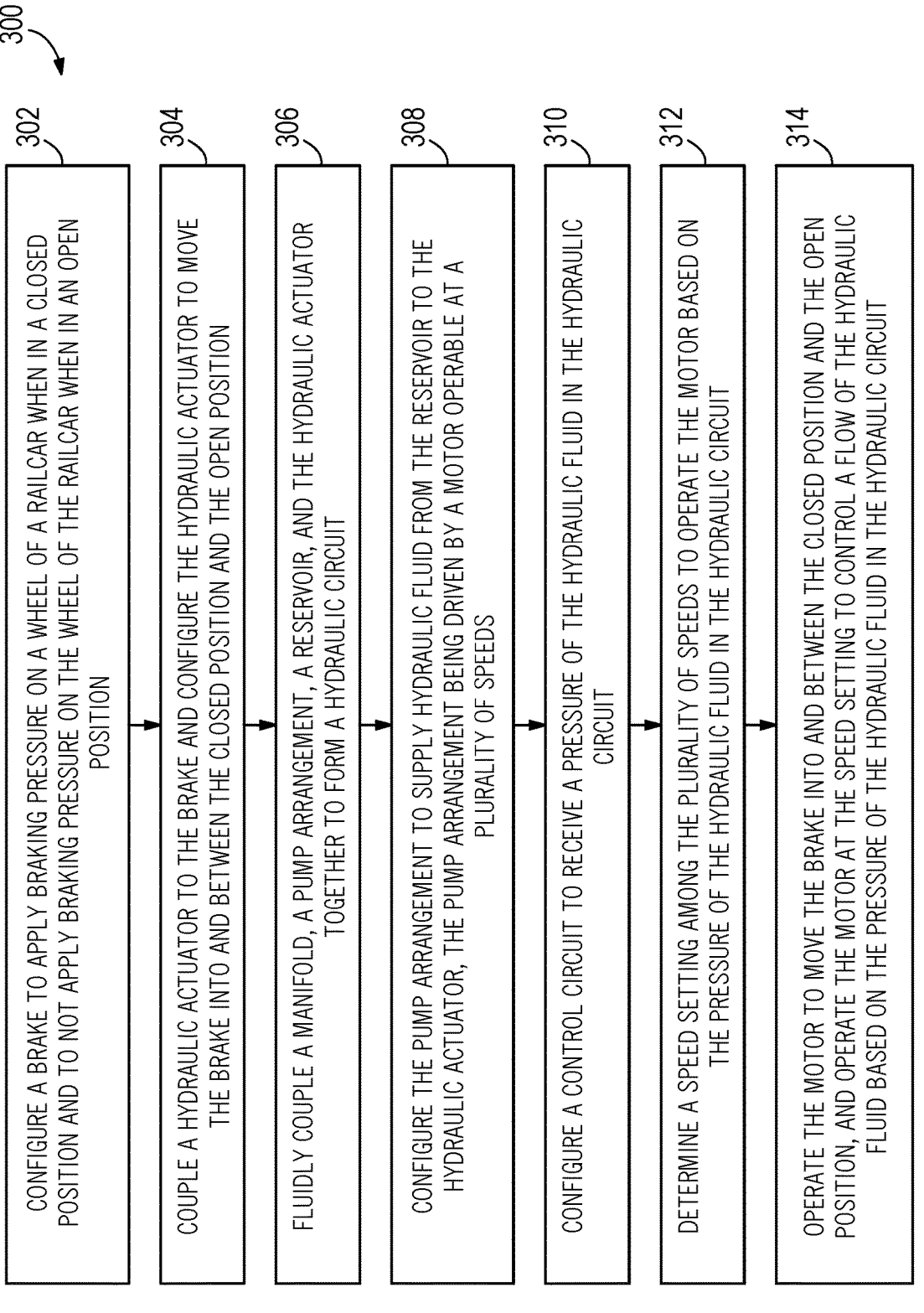

300

302 CONFIGURE A BRAKE TO APPLY BRAKING PRESSURE ON A WHEEL OF A RAILCAR WHEN IN A CLOSED POSITION AND TO NOT APPLY BRAKING PRESSURE ON THE WHEEL OF THE RAILCAR WHEN IN AN OPEN POSITION

304 COUPLE A HYDRAULIC ACTUATOR TO THE BRAKE AND CONFIGURE THE HYDRAULIC ACTUATOR TO MOVE THE BRAKE INTO AND BETWEEN THE CLOSED POSITION AND THE OPEN POSITION

306 FLUIDLY COUPLE A MANIFOLD, A PUMP ARRANGEMENT, A RESERVOIR, AND THE HYDRAULIC ACTUATOR TOGETHER TO FORM A HYDRAULIC CIRCUIT

308 CONFIGURE THE PUMP ARRANGEMENT TO SUPPLY HYDRAULIC FLUID FROM THE RESERVOIR TO THE HYDRAULIC ACTUATOR, THE PUMP ARRANGEMENT BEING DRIVEN BY A MOTOR OPERABLE AT A PLURALITY OF SPEEDS

310 CONFIGURE A CONTROL CIRCUIT TO RECEIVE A PRESSURE OF THE HYDRAULIC FLUID IN THE HYDRAULIC CIRCUIT

312 DETERMINE A SPEED SETTING AMONG THE PLURALITY OF SPEEDS TO OPERATE THE MOTOR BASED ON THE PRESSURE OF THE HYDRAULIC FLUID IN THE HYDRAULIC CIRCUIT

314 OPERATE THE MOTOR TO MOVE THE BRAKE INTO AND BETWEEN THE CLOSED POSITION AND THE OPEN POSITION, AND OPERATE THE MOTOR AT THE SPEED SETTING TO CONTROL A FLOW OF THE HYDRAULIC FLUID BASED ON THE PRESSURE OF THE HYDRAULIC FLUID IN THE HYDRAULIC CIRCUIT

FIG. 18

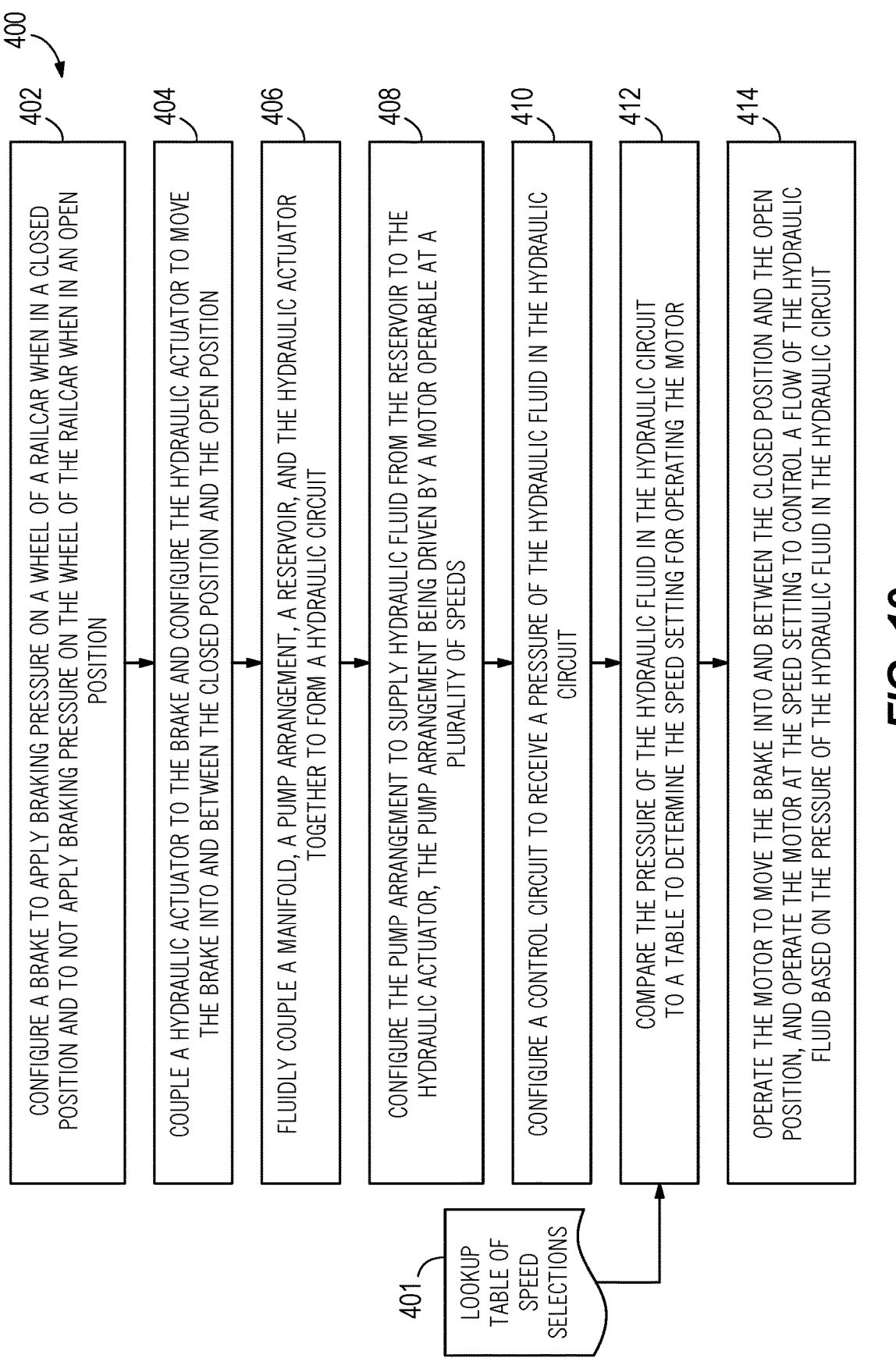

400

402 CONFIGURE A BRAKE TO APPLY BRAKING PRESSURE ON A WHEEL OF A RAILCAR WHEN IN A CLOSED POSITION AND TO NOT APPLY BRAKING PRESSURE ON THE WHEEL OF THE RAILCAR WHEN IN AN OPEN POSITION

404 COUPLE A HYDRAULIC ACTUATOR TO THE BRAKE AND CONFIGURE THE HYDRAULIC ACTUATOR TO MOVE THE BRAKE INTO AND BETWEEN THE CLOSED POSITION AND THE OPEN POSITION

406 FLUIDLY COUPLE A MANIFOLD, A PUMP ARRANGEMENT, A RESERVOIR, AND THE HYDRAULIC ACTUATOR TOGETHER TO FORM A HYDRAULIC CIRCUIT

408 CONFIGURE THE PUMP ARRANGEMENT TO SUPPLY HYDRAULIC FLUID FROM THE RESERVOIR TO THE HYDRAULIC ACTUATOR, THE PUMP ARRANGEMENT BEING DRIVEN BY A MOTOR OPERABLE AT A PLURALITY OF SPEEDS

410 CONFIGURE A CONTROL CIRCUIT TO RECEIVE A PRESSURE OF THE HYDRAULIC FLUID IN THE HYDRAULIC CIRCUIT

412 COMPARE THE PRESSURE OF THE HYDRAULIC FLUID IN THE HYDRAULIC CIRCUIT TO A TABLE TO DETERMINE THE SPEED SETTING FOR OPERATING THE MOTOR

414 OPERATE THE MOTOR TO MOVE THE BRAKE INTO AND BETWEEN THE CLOSED POSITION AND THE OPEN POSITION, AND OPERATE THE MOTOR AT THE SPEED SETTING TO CONTROL A FLOW OF THE HYDRAULIC FLUID BASED ON THE PRESSURE OF THE HYDRAULIC FLUID IN THE HYDRAULIC CIRCUIT

401 LOOKUP TABLE OF SPEED SELECTIONS

FIG. 19

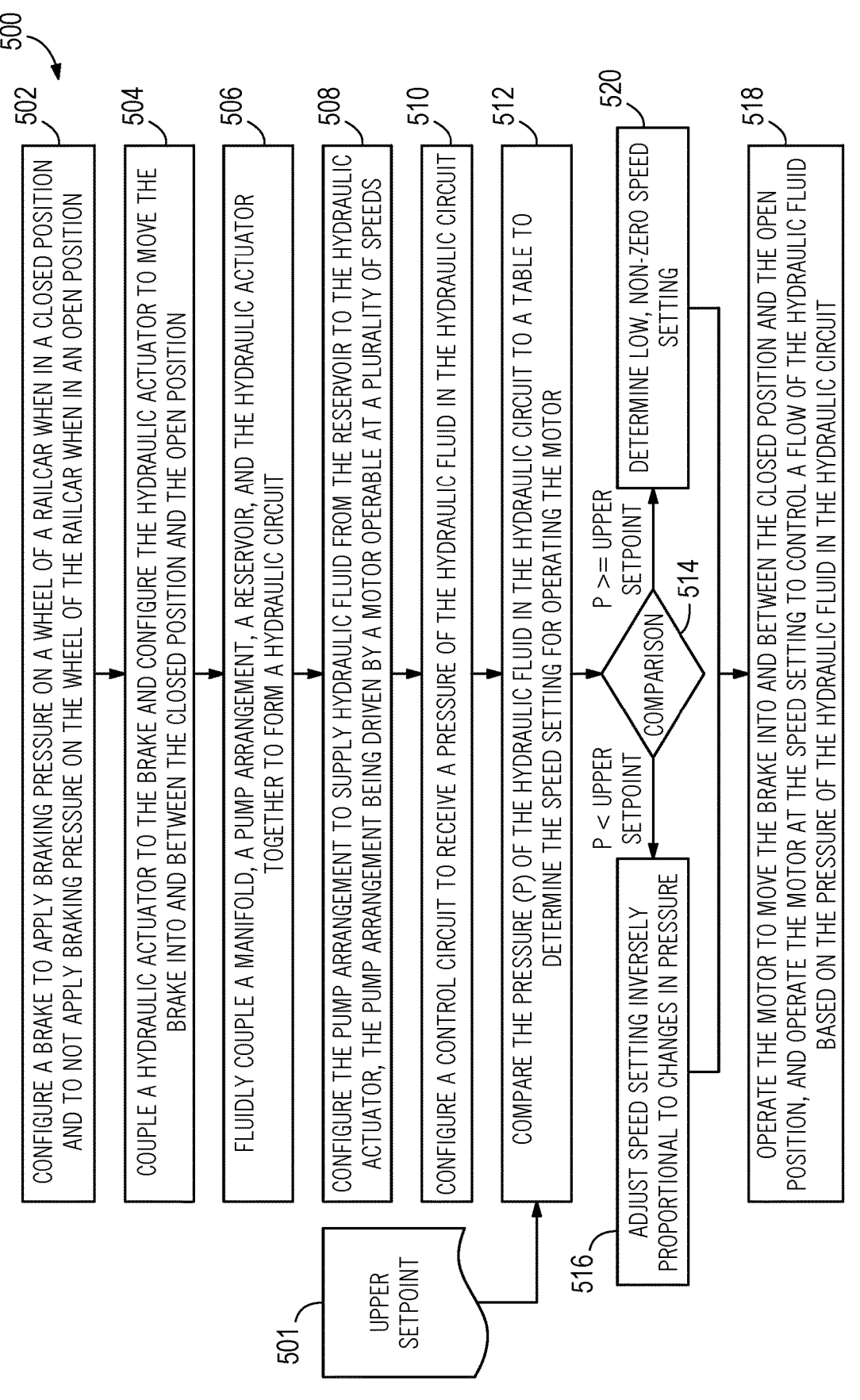

500

501

502 CONFIGURE A BRAKE TO APPLY BRAKING PRESSURE ON A WHEEL OF A RAILCAR WHEN IN A CLOSED POSITION AND TO NOT APPLY BRAKING PRESSURE ON THE WHEEL OF THE RAILCAR WHEN IN AN OPEN POSITION

504 COUPLE A HYDRAULIC ACTUATOR TO THE BRAKE AND CONFIGURE THE HYDRAULIC ACTUATOR TO MOVE THE BRAKE INTO AND BETWEEN THE CLOSED POSITION AND THE OPEN POSITION

506 FLUIDLY COUPLE A MANIFOLD, A PUMP ARRANGEMENT, A RESERVOIR, AND THE HYDRAULIC ACTUATOR TOGETHER TO FORM A HYDRAULIC CIRCUIT

508 CONFIGURE THE PUMP ARRANGEMENT TO SUPPLY HYDRAULIC FLUID FROM THE RESERVOIR TO THE HYDRAULIC ACTUATOR, THE PUMP ARRANGEMENT BEING DRIVEN BY A MOTOR OPERABLE AT A PLURALITY OF SPEEDS

510 CONFIGURE A CONTROL CIRCUIT TO RECEIVE A PRESSURE OF THE HYDRAULIC FLUID IN THE HYDRAULIC CIRCUIT

512 COMPARE THE PRESSURE (P) OF THE HYDRAULIC FLUID IN THE HYDRAULIC CIRCUIT TO A TABLE TO DETERMINE THE SPEED SETTING FOR OPERATING THE MOTOR

UPPER SETPOINT

514 COMPARISON

P < UPPER SETPOINT

P >= UPPER SETPOINT

516 ADJUST SPEED SETTING INVERSELY PROPORTIONAL TO CHANGES IN PRESSURE

520 DETERMINE LOW, NON-ZERO SPEED SETTING

518 OPERATE THE MOTOR TO MOVE THE BRAKE INTO AND BETWEEN THE CLOSED POSITION AND THE OPEN POSITION, AND OPERATE THE MOTOR AT THE SPEED SETTING TO CONTROL A FLOW OF THE HYDRAULIC FLUID BASED ON THE PRESSURE OF THE HYDRAULIC FLUID IN THE HYDRAULIC CIRCUIT

FIG. 20

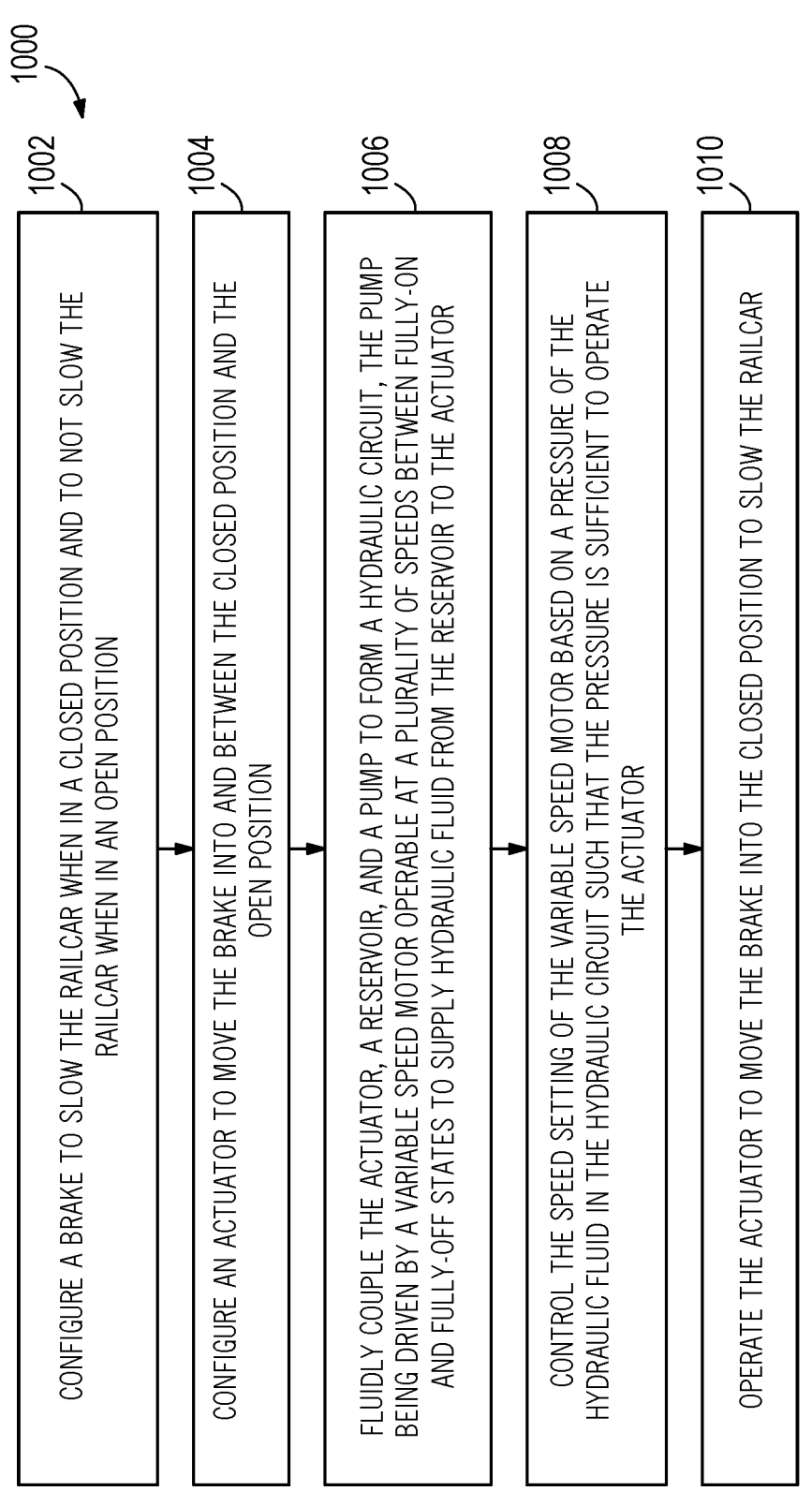

1000

1002 — CONFIGURE A BRAKE TO SLOW THE RAILCAR WHEN IN A CLOSED POSITION AND TO NOT SLOW THE RAILCAR WHEN IN AN OPEN POSITION

1004 — CONFIGURE AN ACTUATOR TO MOVE THE BRAKE INTO AND BETWEEN THE CLOSED POSITION AND THE OPEN POSITION

1006 — FLUIDLY COUPLE THE ACTUATOR, A RESERVOIR, AND A PUMP TO FORM A HYDRAULIC CIRCUIT, THE PUMP BEING DRIVEN BY A VARIABLE SPEED MOTOR OPERABLE AT A PLURALITY OF SPEEDS BETWEEN FULLY-ON AND FULLY-OFF STATES TO SUPPLY HYDRAULIC FLUID FROM THE RESERVOIR TO THE ACTUATOR

1008 — CONTROL THE SPEED SETTING OF THE VARIABLE SPEED MOTOR BASED ON A PRESSURE OF THE HYDRAULIC FLUID IN THE HYDRAULIC CIRCUIT SUCH THAT THE PRESSURE IS SUFFICIENT TO OPERATE THE ACTUATOR

1010 — OPERATE THE ACTUATOR TO MOVE THE BRAKE INTO THE CLOSED POSITION TO SLOW THE RAILCAR

*FIG. 29*

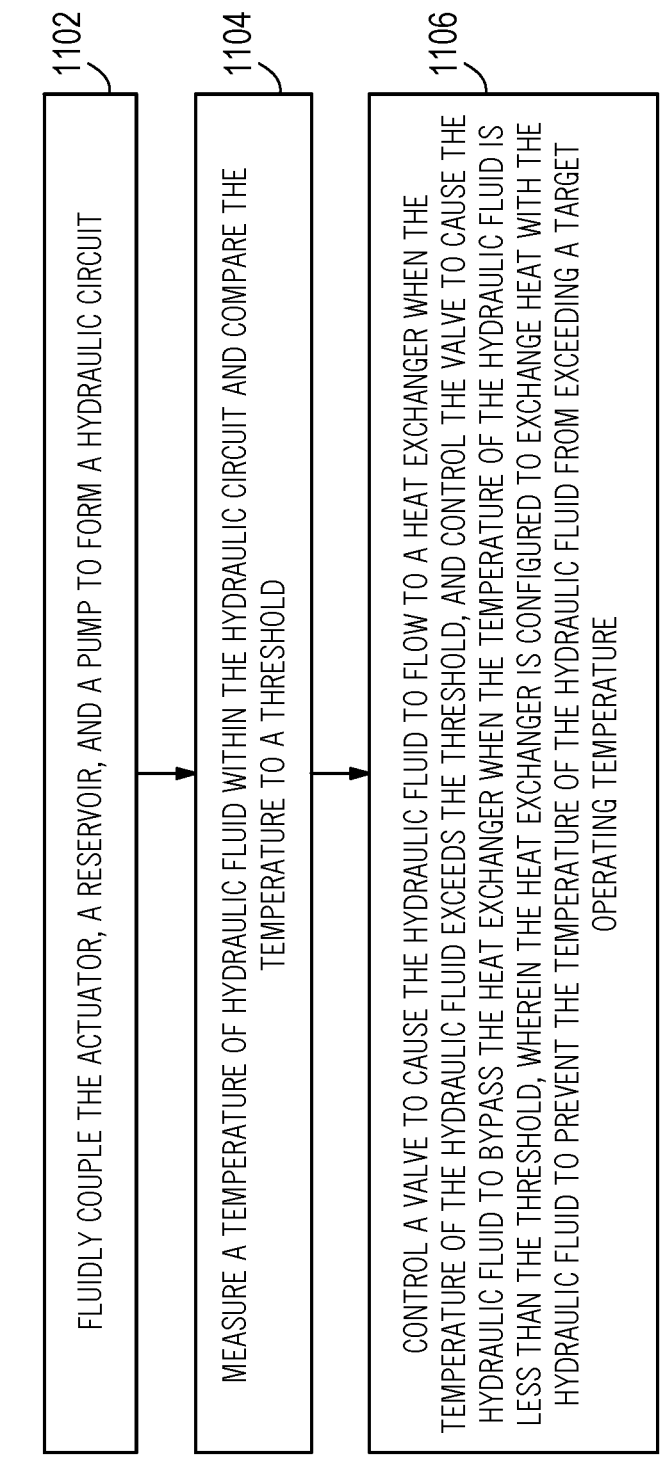

1100

1102

FLUIDLY COUPLE THE ACTUATOR, A RESERVOIR, AND A PUMP TO FORM A HYDRAULIC CIRCUIT

1104

MEASURE A TEMPERATURE OF HYDRAULIC FLUID WITHIN THE HYDRAULIC CIRCUIT AND COMPARE THE TEMPERATURE TO A THRESHOLD

1106

CONTROL A VALVE TO CAUSE THE HYDRAULIC FLUID TO FLOW TO A HEAT EXCHANGER WHEN THE TEMPERATURE OF THE HYDRAULIC FLUID EXCEEDS THE THRESHOLD, AND CONTROL THE VALVE TO CAUSE THE HYDRAULIC FLUID TO BYPASS THE HEAT EXCHANGER WHEN THE TEMPERATURE OF THE HYDRAULIC FLUID IS LESS THAN THE THRESHOLD, WHEREIN THE HEAT EXCHANGER IS CONFIGURED TO EXCHANGE HEAT WITH THE HYDRAULIC FLUID TO PREVENT THE TEMPERATURE OF THE HYDRAULIC FLUID FROM EXCEEDING A TARGET OPERATING TEMPERATURE

*FIG. 30*

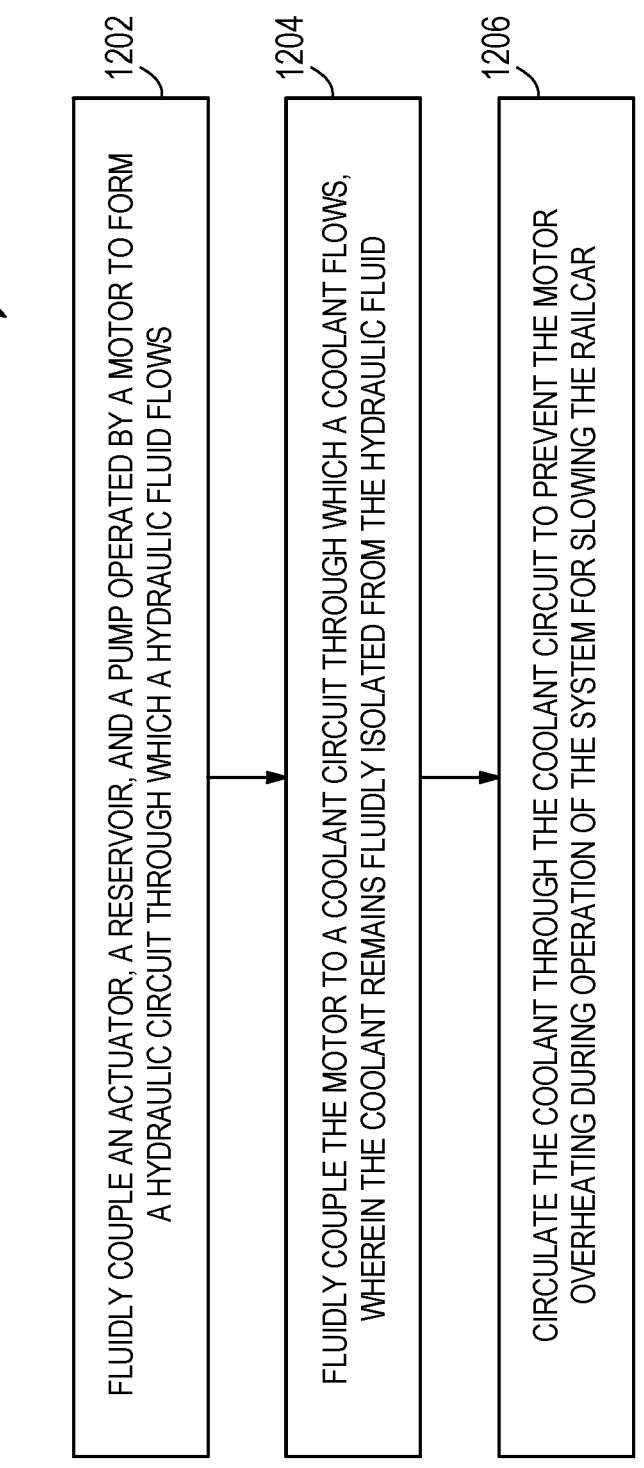

1200

1202 FLUIDLY COUPLE AN ACTUATOR, A RESERVOIR, AND A PUMP OPERATED BY A MOTOR TO FORM A HYDRAULIC CIRCUIT THROUGH WHICH A HYDRAULIC FLUID FLOWS

1204 FLUIDLY COUPLE THE MOTOR TO A COOLANT CIRCUIT THROUGH WHICH A COOLANT FLOWS, WHEREIN THE COOLANT REMAINS FLUIDLY ISOLATED FROM THE HYDRAULIC FLUID

1206 CIRCULATE THE COOLANT THROUGH THE COOLANT CIRCUIT TO PREVENT THE MOTOR OVERHEATING DURING OPERATION OF THE SYSTEM FOR SLOWING THE RAILCAR

*FIG. 31*

SYSTEMS AND METHODS FOR RETARDING THE SPEED OF A RAILCAR

CROSS REFERENCE TO RELATED APPLICATION

This application claims the benefit of U.S. Provisional Patent Application No. 63/323,392, filed Mar. 24, 2022, which is incorporated herein by reference in its entirety.

FIELD

The present disclosure relates generally to systems and methods for controlling the movement of a railcar riding along a set of rails, including retarders suitable for reducing the speed of a railcar.

BACKGROUND

The following are incorporated herein by reference in entirety.

U.S. Pat. No. 4,393,960, the disclosure of which is hereby incorporated herein by reference in entirety, discloses a brake shoe structure that includes a series of alternating long brake shoes and short brake shoes mountable on adjacent brake beams in a railroad car retarder. The length of the long brake shoe is such that the long brake shoe symmetrically straddles two adjacent brake beams. The length of the short brake shoe is such that the shoe occupies the spacing on the brake beams between two long brake shoes. The long brake shoes are affixable to each of the brake beams in at least two locations. The brake shoes contain a plurality of slanting slots in their braking surfaces for interrupting harmonics producing screeching noises during retardation. The brake shoes may be formed of steel or heat treatable ductile iron.

U.S. Pat. No. 7,140,698, the disclosure of which is hereby incorporated herein by reference in entirety, discloses a hydraulic control and operating system for a railroad car retarder to control the movement of railroad cars in a railroad classification yard. The system utilizes a double-acting hydraulic cylinder to operate the retarder mechanism and includes a hydraulic control circuit that provides protection against pressure spikes and high-pressure excursions, high and low temperature excursions, low oil levels and oil filter fouling. The system shuts itself down to prevent damage and provides a warning to maintenance staff that service should be performed long before a need for system shutdown is required. The system includes a central operating panel in the rail yard control center, a remote-control panel located at the position of the retarder, and the system can be connected for operation from a completely remote location.

U.S. Pat. No. 8,413,770, the disclosure of which is hereby incorporated herein by reference in entirety, discloses systems for and methods of operating electro-hydraulic retarders. In one example, a system is provided for retarding the speed of a railcar. The system includes a brake, a hydraulic actuator coupled to the brake, and a hydraulic circuit that directs pressurized hydraulic fluid to the actuator. The fluid causes the actuator to move the brake towards a closed position in which the brake will apply a predetermined braking pressure on a wheel of the railcar. A hydraulic accumulator is coupled to the hydraulic circuit and configured to accumulate fluid from the hydraulic circuit when the wheel forces the brake out of the closed position and to supply pressurized accumulated fluid back to the hydraulic circuit when the brake moves back into the closed position to thereby maintain a substantially constant braking pressure on the wheel of the railcar as it moves through the brake.

U.S. Pat. No. 8,499,900, the disclosure of which is hereby incorporated herein by reference in entirety, discloses electro-hydraulic retarders designed to allow opposing brake shoes on the retarder to spread to the width of a wheel entering the retarder, and yet still maintain a desired braking pressure on the sides of the wheel. In one example, the retarder includes a brake and a brake actuator that has a piston-cylinder and a spring. One or both of the piston and the cylinder acts on the brake and the other of the piston and the cylinder acts on one end of the spring. The other end of the spring acts on the brake. In one example, the spring is wrapped around the cylinder and connected thereto in series. In such an arrangement, supplying pressurized hydraulic fluid to the piston-cylinder causes both the piston-cylinder and the spring to move the brake towards a closed position in which the brake will apply a predetermined braking pressure on a wheel of the railcar. The spring resiliently biases the brake into the closed position to maintain a substantially constant braking pressure on the wheel of the railcar as it moves through the retarder.

U.S. Patent Application Publication No. 2011/0315491, the disclosure of which is hereby incorporated herein by reference in entirety, discloses systems for retarding the speed of a railcar. In one example, a hydraulic actuator moves a brake between a closed position in which the brake applies braking pressure on a railcar wheel, and an open position in which the brake does not apply braking pressure on the railcar wheel. A pump supplies hydraulic fluid into at least one of a first manifold and a second manifold of a hydraulic circuit. A logic element reacts to maintaining a selected pressure in the first manifold when a railcar wheel enters a brake and moves the brake from the closed position to the open position to cause a selected braking pressure to be applied to the railcar wheel. A control system Controls the logic element to apply the selected braking pressure on the railcar wheel.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One aspect of the present disclosure generally relates to a system for retarding a railcar. They system includes a brake and an actuator that moves the brake between a closed position in which the brake slows the railcar and an open position in which the brake does not slow the railcar. The system further includes a hydraulic circuit through which a hydraulic fluid flows between the actuator, a pump, and a reservoir. A variable speed motor drives the pump to supply the hydraulic fluid from the reservoir to the actuator, the variable speed motor being operable at a plurality of speeds between fully-on and fully-off states. A control system determines a speed setting within the plurality of speeds for operating the variable speed motor based on a pressure of the hydraulic fluid in the hydraulic circuit, the speed setting being determined such that the pressure is sufficient for operating the actuator.

In another aspect, a pressure sensor is fluidly coupled within the hydraulic circuit and configured to measure the pressure of the hydraulic fluid therein.

In another aspect, the control system compares the pressure of the hydraulic fluid in the hydraulic circuit to a table stored in memory for determining the speed setting for operating the motor.

In another aspect, the control system compares the pressure of the hydraulic fluid to an upper setpoint for determining the speed setting, wherein when the pressure of the hydraulic fluid is below the upper setpoint the control system is configured to determine the speed setting inversely proportionally to changes in the pressure of the hydraulic fluid.

In another aspect, the control system compares the pressure of the hydraulic fluid to an upper setpoint for determining the speed setting, wherein the speed setting is greater when the pressure is below the upper setpoint than when the pressure is above the upper setpoint, and wherein the speed setting remains non-zero when the pressure is above the upper setpoint such that the hydraulic fluid continues to flow through the hydraulic circuit.

In another aspect, a fluid quality sensor is operatively coupled within the hydraulic circuit and configured to compare a quality measurement of the hydraulic fluid as measured by the fluid quality sensor to a threshold, wherein the control system is configured to provide a notification when the quality measurement exceeds the threshold. In a further aspect, the quality measurement includes a type of particulate present within the hydraulic fluid, and the notification is based at least in part on the type of particular present within the hydraulic fluid. In a further aspect, the notification includes a recommended action based on the type of particular present to bring the quality measurement below the threshold.

In another aspect, the control system permits a user to manually change the notification, wherein the control system records when the notification is manually changed.

In another aspect, an accumulator is fluidly coupled to the pump, wherein the pump charges the accumulator, and wherein the accumulator is configured to provide powered movement of the brake to the closed position when the pump is de-energized.

In another aspect, the control system and the hydraulic circuit are configured to provide a non-powered movement of the brake from the closed position to the open position without the hydraulic fluid being forced from the actuator and without the hydraulic fluid being supplied to the actuator such that the actuator is in a relaxed position in which the hydraulic fluid from the actuator is given a free path back to the reservoir.

In another aspect, the pump is configured to supply the hydraulic fluid to one end of the actuator to provide a powered movement of the brake to the closed position and to an opposite end of the actuator to provide a powered movement of the brake to the open position.

In another aspect, the control system controls the speed setting of the variable speed motor by adjusting a frequency of voltage delivered thereto.

In another aspect, the variable speed motor is a brushless AC induction motor.

In another aspect, the control system is further configured to control the variable speed motor so as to not exceed at least one of a maximum current, maximum voltage, maximum speed, and maximum rate of speed change.

Another aspect generally relates to a method for slowing a railcar. The method includes configuring a brake to slow the railcar when in a closed position and to not slow the railcar when in an open position, configuring an actuator to move the brake into and between the closed position and the open position, and fluidly coupling the actuator, a reservoir, and a pump to form a hydraulic circuit, the pump being driven by a variable speed motor operable at a plurality of speeds between fully-on and fully-off states to supply hydraulic fluid from the reservoir to the actuator. The method further includes controlling the speed setting of the variable speed motor based on a pressure of the hydraulic fluid in the hydraulic circuit such that the pressure is sufficient to operate the actuator, and operating the actuator to move the brake into the closed position to slow the railcar.

In another aspect, the method further includes determining the pressure of the hydraulic fluid via a pressure sensor fluidly coupled within the hydraulic circuit.

In another aspect, the pressure measured by the pressure sensor is distinct from a braking pressure applied by the brake.

In another aspect, the method further includes fluidly coupling an accumulator within the hydraulic circuit such that the pump charges the accumulator and the accumulator is configured to provide a powered movement of the brake to the closed position when the pump is de-energized.

Another aspect generally relates to a system for controlling a railcar moving along a set of rails. The system includes a member configured to selectively contact wheels of the railcar, and an actuator that moves the member between a closed position in which the member contacts the wheels of the railcar and an open position in which the member does not contact the wheels of the railcar. The system further includes a hydraulic circuit through which a hydraulic fluid flows between the actuator, a pump, and a reservoir. A variable speed motor drives the pump to supply the hydraulic fluid from the reservoir to the actuator, the variable speed motor being operable at a plurality of speeds between fully-on and fully-off states. A pressure sensor is configured to measure a pressure of the hydraulic fluid in the hydraulic circuit. A control system determines a speed setting within the plurality of speeds for operating the variable speed motor based on the pressure of the hydraulic fluid in the hydraulic circuit, the speed setting being determined such that the pressure is sufficient for operating the actuator.

Another aspect of the present disclosure generally relates to a system for retarding a railcar having wheels. The system includes a brake and an actuator configured to move the brake between a closed position in which the brake contacts the wheels of the railcar and an open position in which the brake does not contact the wheels of the railcar. The system further includes a hydraulic circuit through which a hydraulic fluid flows between the actuator and a reservoir. A first pump is operably connected within the hydraulic circuit and configured to provide the hydraulic fluid to the actuator for operating the brake. A heat exchanger is operably connected within the hydraulic circuit and configured to cool the hydraulic fluid flowing therethrough. A second pump is operably connected within the hydraulic circuit and configured to provide the hydraulic fluid to the heat exchanger. The heat exchanger prevents the hydraulic fluid within the hydraulic fluid from exceeding a target operating temperature.

In another aspect, the system further includes a motor, wherein the first pump and the second pump are operated by the motor.

In another aspect, the motor operates the first pump and the second pump simultaneously.

In another aspect, the motor is a variable speed motor operable at a plurality of speeds between fully-on and fully-off states. In a further aspect, the variable speed motor is a brushless AC motor. In a further aspect, the variable speed motor is operable at the plurality of speeds by adjusting a frequency of voltage delivered thereto.

In another aspect, the system further includes a temperature sensor that measure a temperature of the hydraulic fluid within the hydraulic circuit, a value operatively coupled within the hydraulic circuit and configured to change a flow of the hydraulic circuit to the heat exchanger, and a control system operatively coupled to the valve, wherein the control system is configured to control the valve based on the temperature measured by the temperature sensor. In a further aspect, the control system is configured to compare the temperature measured by the temperature sensor to a lower threshold and to bypass the heat exchanger when the temperature is below the lower threshold.

In another aspect, the heat exchanger is a radiator and a fan. In a further aspect, the fan is hydraulically operated via the hydraulic fluid flowing through the hydraulic circuit.

In another aspect, a motor operates at least one of the first pump and the second pump, and further comprising a coolant system in which a coolant flows through a coolant circuit to cool the motor so as to prevent the motor from overheating. In a further aspect, the heat exchanger includes a first radiator and a second radiator, and wherein the first radiator is operatively connected within the hydraulic circuit so as to provide heat exchange for the hydraulic fluid, and wherein the second radiator is operatively connected within the coolant circuit so as to provide heat exchange for the coolant. In a further aspect, the first pump and the second pump are both operated by the motor. In a further aspect, a fan is configured to cool both the first radiator and the second radiator. In a further aspect, the coolant system comprises a pump for circulating the coolant through the coolant circuit, further comprising a temperature sensor that measures a temperature of the coolant within the coolant circuit, and further comprising a control system for operating the pump based on the temperature of the coolant within the coolant circuit.

In another aspect, a motor operates at least one of the first pump and the second pump, and the system further includes an enclosure in which the first pump, the second pump, and the motor are situated for protection. In a further aspect, the enclosure includes a housing and a cover separated from the housing, wherein the cover at least partially shades the housing, and wherein the cover is positioned above the housing such that a gap remains therebetween to provide a thermal buffer between the housing and the cover. In a further aspect, an opening extends through a top of the housing, and the cover is positioned at least over the opening to prevent ingress into the housing from above.

Another aspect generally relates to a method for cooling a system configured for slowing a railcar. The system includes a brake that slows the railcar when in a closed position and does not slow the railcar when in an open position, and the system further including an actuator that moves the brake into and between the closed position and the open position. The method includes fluidly coupling the actuator, a reservoir, and a pump to form a hydraulic circuit, and measuring a temperature of hydraulic fluid within the hydraulic circuit and comparing the temperature to a threshold. The method further includes controlling a valve to cause the hydraulic fluid to flow to a heat exchanger when the temperature of the hydraulic fluid exceeds the threshold, and controlling the valve to cause the hydraulic fluid to bypass the heat exchanger when the temperature of the hydraulic fluid is less than the threshold. The heat exchanger is configured to exchange heat with the hydraulic fluid to prevent the temperature of the hydraulic fluid from exceeding a target operating temperature.

Another aspect generally relates to a method for cooling a system configured for slowing a railcar. The system including a brake that slows the railcar when in a closed position and does not slow the railcar when in an open position, and the system further including an actuator that moves the brake into and between the closed position and the open position. The method includes fluidly coupling the actuator, a reservoir, and a pump operated by a motor to form a hydraulic circuit through which a hydraulic fluid flows, fluidly coupling the motor to a coolant circuit through which a coolant flows, wherein the coolant remains fluidly isolated from the hydraulic fluid, and circulating the coolant through the coolant circuit to prevent the motor overheating during operation of the system for slowing the railcar.

It should be recognized that the different aspects described throughout this disclosure may be combined in different manners, including those than expressly disclosed in the provided examples, while still constituting an invention accord to the present disclosure.

Various other features, objects and advantages of the disclosure will be made apparent from the following description taken together with the drawings.

BRIEF DESCRIPTION OF THE DRAWINGS

FIG. 18 is a flow chart of one method for retarding the speed of a railcar according to the present disclosure.

FIG. 19 is a flow chart of another method for retarding the speed of a railcar according to the present disclosure.

FIG. 20 is a flow chart of another method for retarding the speed of a railcar according to the present disclosure.

FIG. 29 is a flow chart of another method for retarding a railcar according to the present disclosure.

FIG. 30 is a flow chart of a method for cooling a system for retarding a railcar according to the present disclosure, such as the system of FIG. 23.

FIG. 31 is a flow chart of a method for cooling a system for retarding a railcar according to the present disclosure, such as the system of FIG. 23.

DETAILED DESCRIPTION OF THE DRAWINGS

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims.

The present disclosure arises from the present inventors' research and development of electro-hydraulic systems for retarding or slowing the speed of a railcar traveling on a set of rails. The inventors have recognized that more efficient and effective electro-hydraulic retarder systems and methods of operating such systems are needed in the art. The present inventors have recognized advantages to controlling a variable speed motor to drive the hydraulic pump, rather than a single-speed motors as presently known in the art. One advantage is faster pressurization of hydraulic fluid within the system. Another advantage is reducing unnecessary flow of the hydraulic fluid through the system, which reduces wasted energy, reduces heat generated within the system, and improves the reliability and longevity of components by reduced usage.

Figures 1, 2:
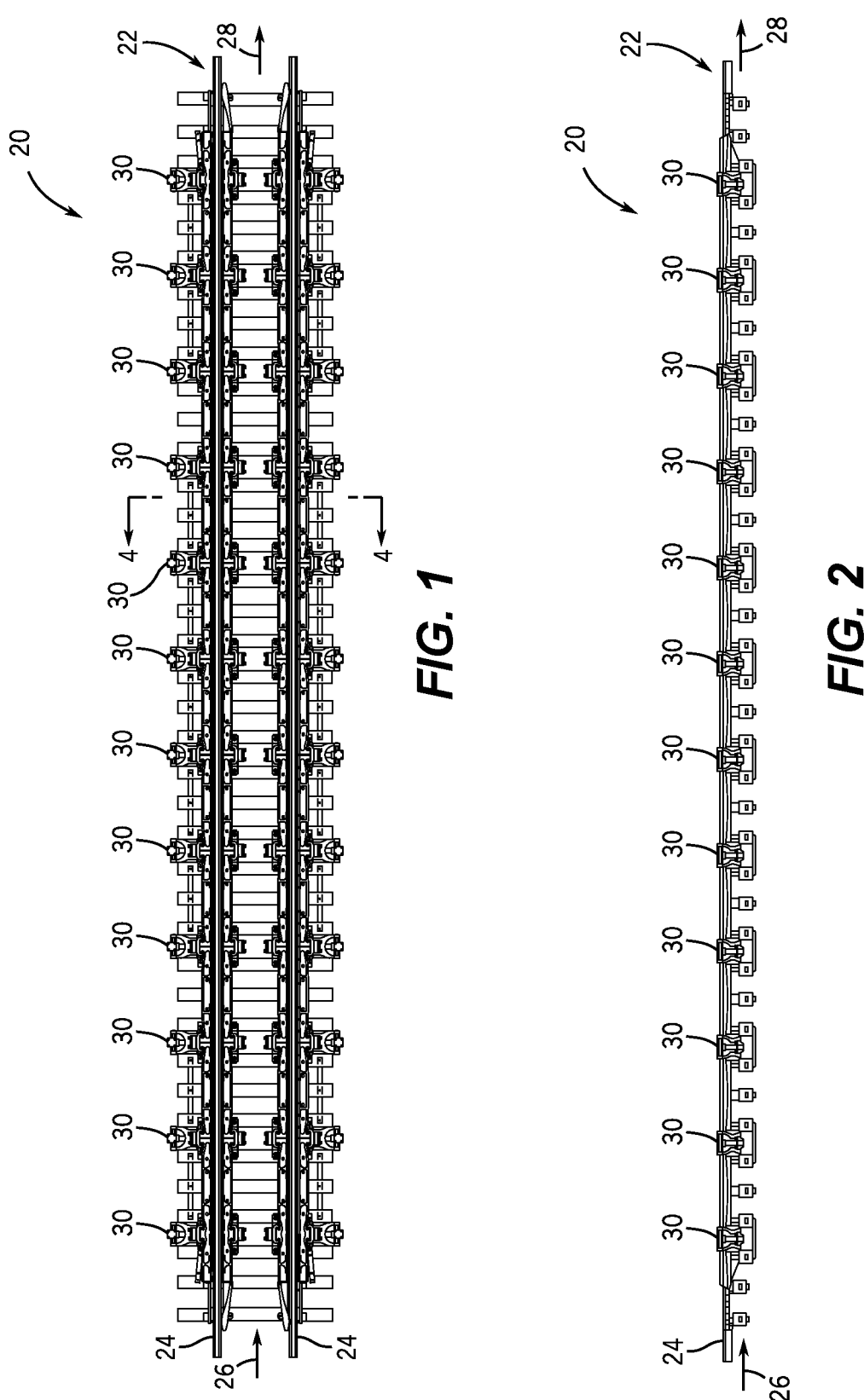
FIG. 1 is a plan view of a pair of rails and a retarder system for reducing the speed of a railcar riding on the rails.
FIG. 2 is a side view of the pair of rails and retarder system depicted in FIG. 1.

FIGS. 1 and 2 depict a railcar retarder system 20 that is mounted along a section of track 22, including a pair of conventional rails 24. The section of track 22 continues in both directions from the retarder system 20 with railcars entering the retarder system 20 from the left in the direction shown by arrow 26 and exiting to the right in the direction shown by arrow 28. The retarder system 20 includes a series of pairs of brakes 30 positioned on opposite sides of each of the rails 24. The brakes 30 are positioned alongside and on top of the rails 24 such that, when actuated, the brakes 30 engage the sides of the railcar wheels to brake or retard the moving railcar. Although the particular example shown depicts a two series 29*a*, 29*b* (see FIG. 3) of six pairs of brakes 30, it should be recognized that the number and arrangement of the brakes 30 can vary from that shown depending upon various operational parameters. In the example shown, each series 29*a*, 29*b* includes six pairs of brakes 30 that are connected in series to a power unit comprising a hydraulic circuit 32. In use, each hydraulic circuit 32 receives and directs pressurized hydraulic fluid to the brakes 30 to actuate the brakes 30, as is further discussed herein below.

Figure 3:
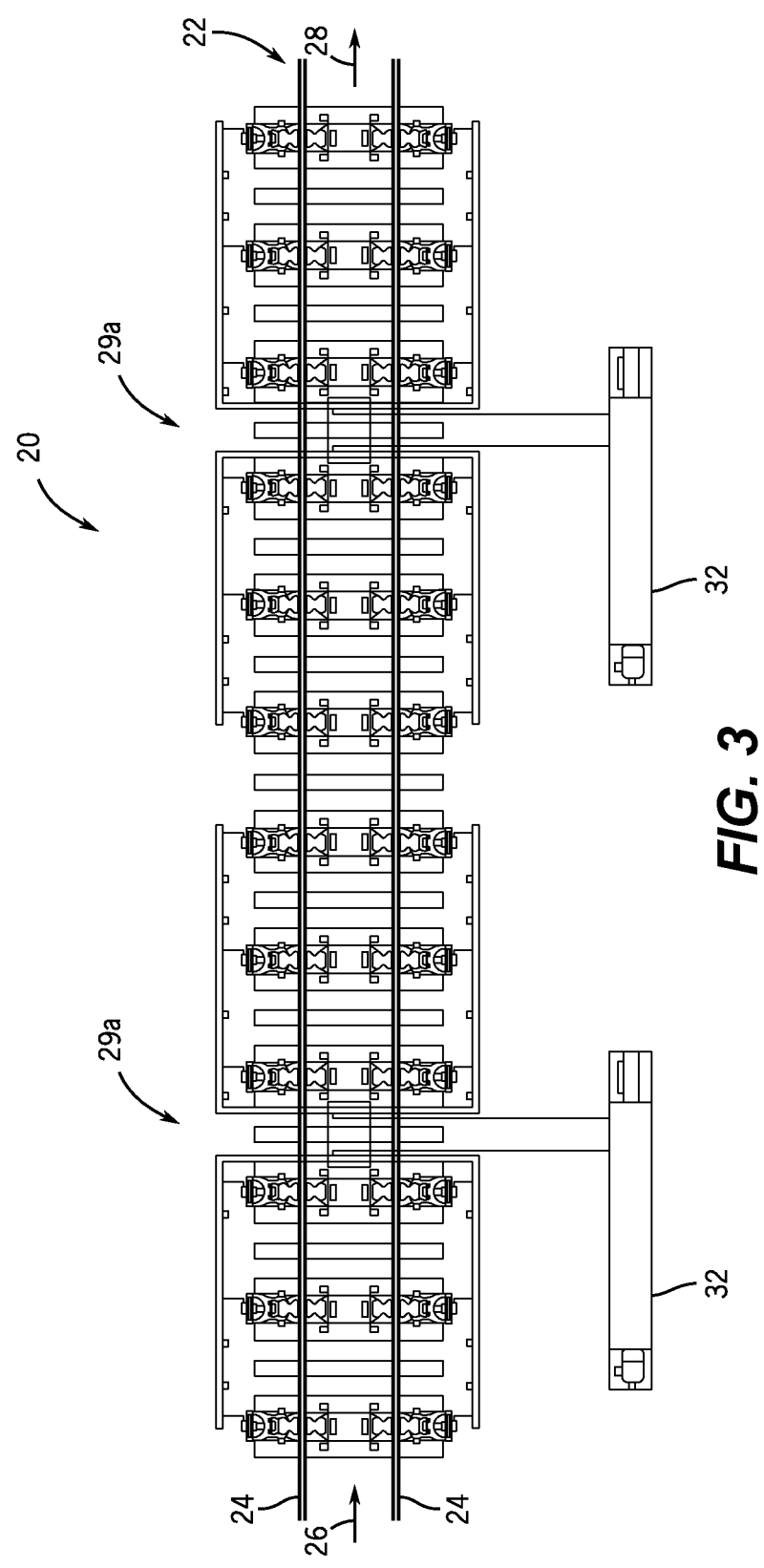
FIG. 3 is a plan view of the pair of rails shown in FIG. 1, further depicting hydraulic systems for operating the retarder system.

FIG. 3 is a view showing the retarder system 20 and more particularly showing the hydraulic circuit 32. Portions of the brakes 30 are omitted to more clearly show the hydraulic circuit 32.

Figure 4:
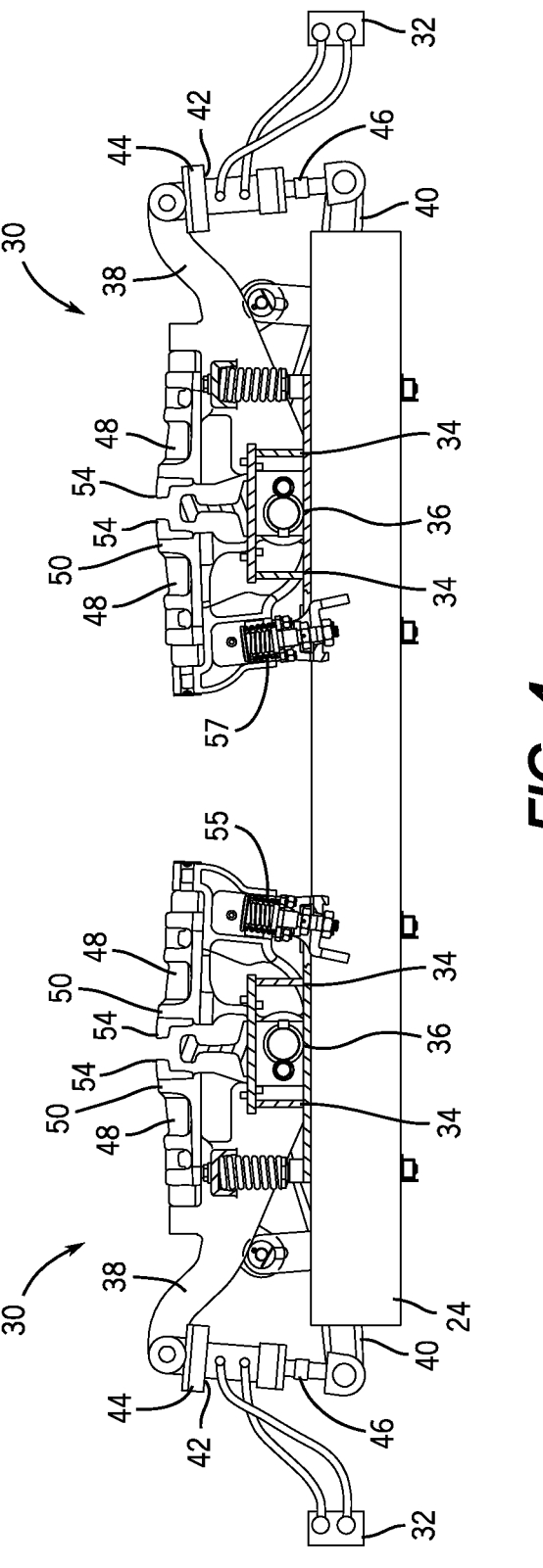
FIG. 4 is a sectional view taken through Section 4-4 in FIG. 1 showing a brake.

FIG. 4 depicts Section 4-4 of FIG. 1. FIG. 4 is representative of each pair of brakes 30 in the retarder system 20. Generally, each brake 30 includes rail supports 34 to which a rail 24 is secured. Each rail support 34 contains a fulcrum pin 36 supporting upper and lower levers 38, 40, which together function as a brake 30. The fulcrum pin 36 passes through an end of upper lever 38 and also through a center portion of lower lever 40. A brake beam 48 is secured to each of the levers 38, 40. The position of the brake beam 48 on the levers 38, 40 can be adjusted by an adjustment mechanism extending through flanges on the lever arms, according to known arrangements such as those described in U.S. Pat. No. 4,393,960. Brake shoes 50 are mounted on the brake beams 48. The brake shoes 50 are generally L-shaped, having a short arm containing braking surface 54 supported by a flange mounted to the brake beam 48. The hydraulic circuit 32 is connected to a hydraulic actuator, which is movable under hydraulic forces to move the retarder between the open and closed positions. Different types of hydraulic actuators could be used, such as for example a plunger cylinder and/or the like. In the particular example shown, the actuator includes a hydraulic piston-cylinder 42 having a cylinder 44 connected to the end of one of the levers 38, 40 and a piston-rod 46 connected to the other.

Figure 6:
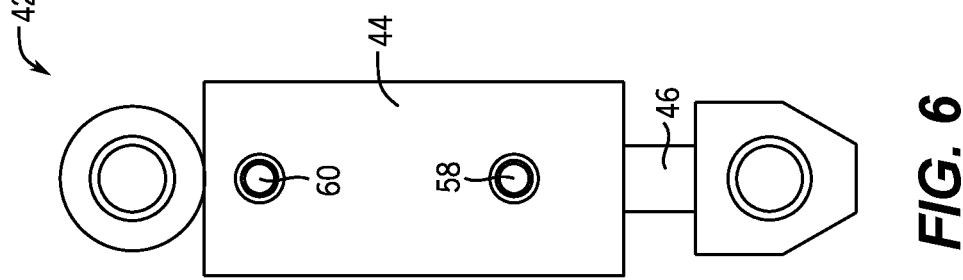
FIG. 6 is a side view of the actuator.
Figure 5:
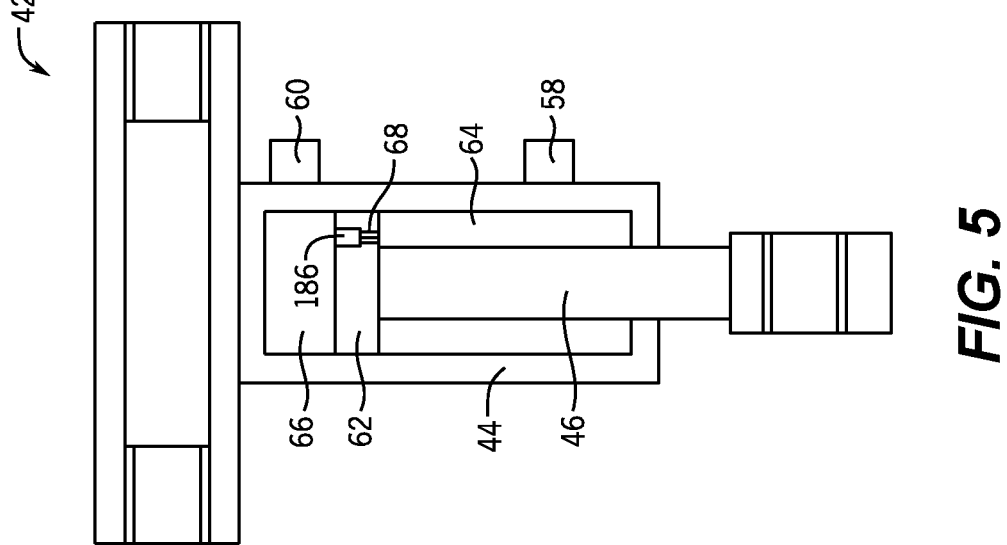
FIG. 5 is a sectional view of an actuator, including a piston, piston-rod and cylinder.

FIGS. 5 and 6 show a sectional view and side view, respectively, of an exemplary piston-cylinder 42. The piston-cylinder 42 includes a pair of hydraulic ports including a rod-side port 58 and a cap-side port 60. A piston 62 is disposed on the internal end of the piston-rod 46 and divides the cylinder 44 into two chambers 64, 66, including a rod-side chamber 64 and a cap-side chamber 66. The piston 62 is connected to piston-rod 46, which extends from the piston-cylinder 42. Rod-side port 58 is in fluid communication with rod-side chamber 64 and cap-side hydraulic port 60 is in fluid communication with cap-side chamber 66. A passageway in the form of a dampening orifice 68 is defined in the piston 62 and facilitates flow of hydraulic fluid between the rod-side chamber 64 and the cap-side chamber 66. As will be described hereafter, the dampening orifice 68 is used in conjunction with a check valve 186 in the piston cylinder 42 to further control the flow of hydraulic fluid between the chambers 64, 66, such as, for example, one way flow only from the rod-side chamber 64 to the cap-side chamber 66.

In use, the hydraulic circuit 32 conveys hydraulic fluid to and from the piston-cylinders 42 and controls the pressure of the hydraulic fluid to move the brake 30 between its closed position and its open position and to apply selected braking pressures to the wheel of the railcar. Specifically, the hydraulic piston-cylinder 42 is movable under hydraulic pressure from the circuit 32 between an extended position, wherein the piston-rod 46 extends from the cylinder 44 to move the brake 30 into the closed position and a retracted position wherein the piston-rod 46 retracts into the cylinder 44 to move the brake 30 into the open position. When it is desired to retard the motion of a railcar riding on rails 24 a Braking State is initiated, hydraulic fluid is provided to one end of the piston-cylinder 42 via the hydraulic circuit 32 to actuate the piston-cylinder 42 to extend piston-rod 46. The piston-cylinder 42 pivots the ends of levers 38, 40 apart, and thus moves the brake shoes 50 towards each other and into contact with a railcar wheel. Brake shoes 50 contact the inside and outside of a railcar wheel riding on the rail to apply a braking pressure. To decrease braking force during the Braking State, the fluid pressure on the end of the piston-cylinder 42 is decreased. To terminate the retarding action the fluid pressure on the end of the piston-cylinder 42 is removed and the return springs 55, 57 and the weight of the upper lever 38 move the ends of levers 38, 40 together and thus move the brake shoes 50 outwardly away from the railcar wheel and into a Relaxed State. The brake shoes 50 can also be moved outwardly away from the railcar wheel and into a Power Open/Flush State by providing hydraulic fluid to an opposite end of the piston-cylinder 42 to actuate the piston-cylinder 42 to retract piston-rod 46.

Figure 7:
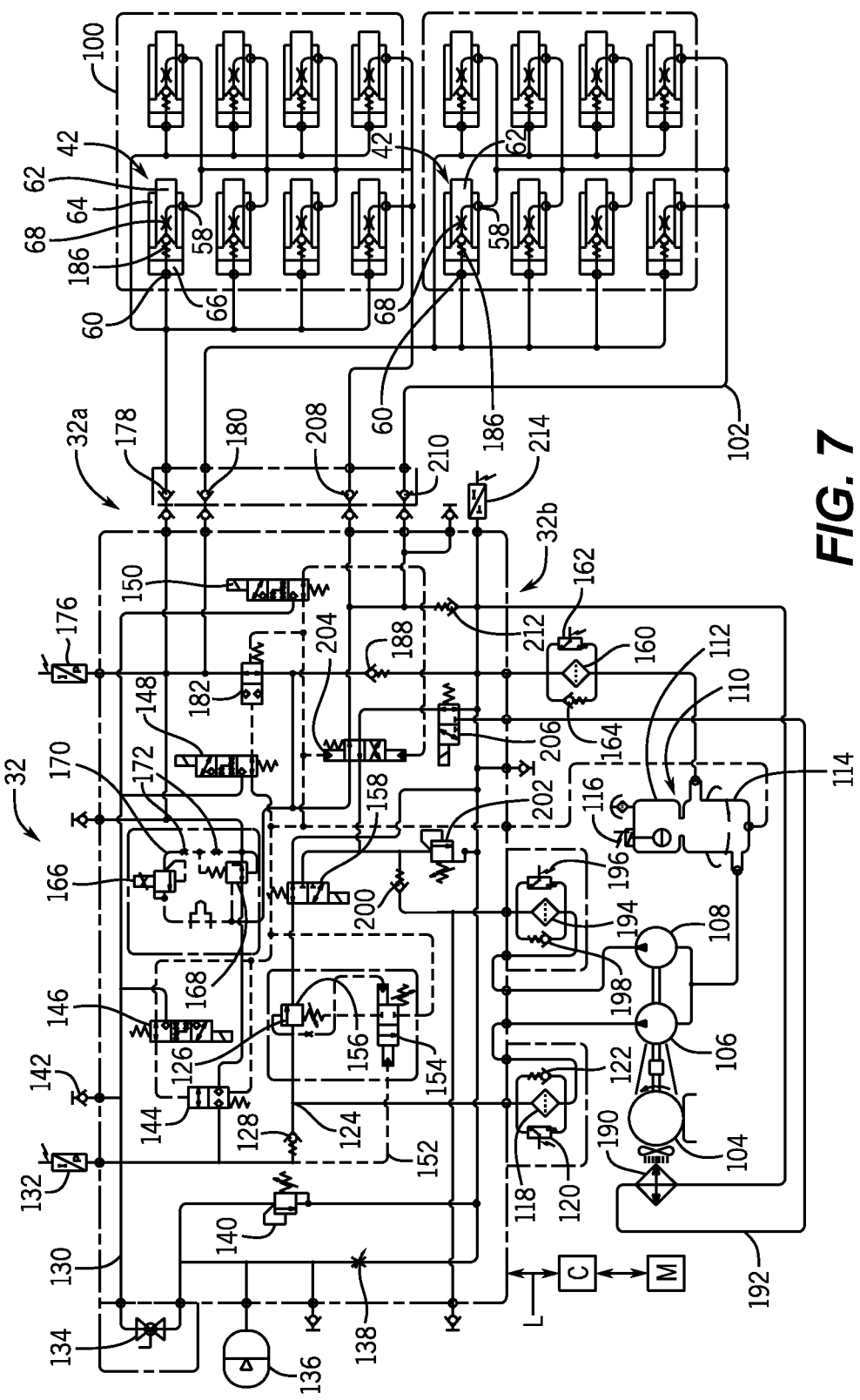
FIG. 7 is a schematic view of an electro-hydraulic system for operating the retarder system.

A non-limiting example of the hydraulic circuit 32 and related components will now be described with reference to drawing FIG. 7. The hydraulic circuit 32 is configured with a first section or manifold 32a and a second section or manifold 32b. FIG. 7 depicts the hydraulic circuit 32 including a first cylinder bank 100 and a second cylinder bank 102. In the example shown, each of the banks 100, 102 includes a series of eight piston-cylinders 42 which are interconnected together in series to selectably control opening and closing of brakes 30 associated with the piston-cylinders 42. It should be recognized that other cylinder bank configurations are contemplated by this disclosure.

The retarder system 20 also includes a control system C which can be located adjacent to and/or remotely from the retarder system 20. The control system C can include one or more control circuit sections. Each section is generally a computing system that includes a processing system, storage system, software, communication interface, and optionally a user interface. The processing system loads and executes software from the storage system, including a software module. When executed by the computing system, software module directs the processing system to operate as described herein in further detail in accordance with the methods of the present disclosure. While a description as provided herein refers to a computing system and a processing system, it is to be recognized that implementation of such systems can be performed using one or more processors, which may be communicatively connected, and such implementations are considered to be within the scope of the disclosure. The processing system can include a microprocessor and other circuitry that retrieves and executes software from a storage system. Processing systems can be implemented with a single processing device but can also be distributed across multiple processing devices or subsystems that cooperate in executing program instructions. Examples of processing systems includes a general-purpose central processing unit, application specific processor, logic devices, as well as other types of processing devices, combinations of processing devices, or variations thereof. Storage systems can include any storage media readable by a processing system and capable of storing software. The storage system can include volatile and non-volatile, removable and non-removable media implemented in any method or technology for storage of information, such as computer readable instructions, data structures, program modules, or other data. Storage systems can be implemented as a single storage device but may also be implemented across multiple storage devices or subsystems. Storage systems can further include additional elements, such as a controller, capable of communicating with the processing system. Each storage media can include random access memory, read only memory, magnetic disks, optical disks, flash memory disks, virtual and non-virtual memory, magnetic sets, magnetic tape, magnetic disk storage or other magnetic storage devices, or any other media which can be used to store the desired information and that may be accessed by an instruction execution system, as well as any combination or variation thereof, or any other type of storage media. In some implementations, the storage media can be a non-transitory storage media. User interface can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or a graphical display can display an interface further associated with embodiments of the system and method as disclosed herein.

The control system C is configured to send and receive commands or signals with a location yard monitor system M, such as by means of a detector, radar, laser and the like, to determine the position of a moving railcar in the retarder system 20. As a railcar approaches the retarder system 20, the yard monitor system M monitors environmental factors and/or characteristics of the railcar such as weight, velocity, direction and the like, and calculates an amount of braking pressure necessary to achieve a desired railcar speed, all as is conventional. Based upon the calculation, the control system C is programmed, such as by a programmable logic controller (PLC), to control operations of the various components of the retarder system 20 via one or more wired or wireless links as shown schematically at L to achieve a selected braking pressure. Braking pressure is typically defined in the art in terms of various railcar weight classes.

The control system C is designed to control one or more components of the retarder system 20 to apply, maintain or change a predetermined braking pressure on the railcar wheel(s) as it travels and leaves the retarder system 20 (as determined by the yard monitoring system M). Prior to the wheel(s) entering the retarder system 20, the control system C can control the retarder system 20 to open and/or close the brakes 30 with minimal pressure. Once the railcar is in the retarder system 20, the control system C can quickly change braking pressures applied to the wheel(s) in accordance with the predetermined or active parameters set by the yard monitoring system M and/or entered by an operator into the retarder system 20 via a conventional computer input device (not shown). Each of these functions is accomplished by the programming of the control system C and its communication with components in the retarder system 20 which will be understood by one having ordinary skill in the art.

Figure 8:
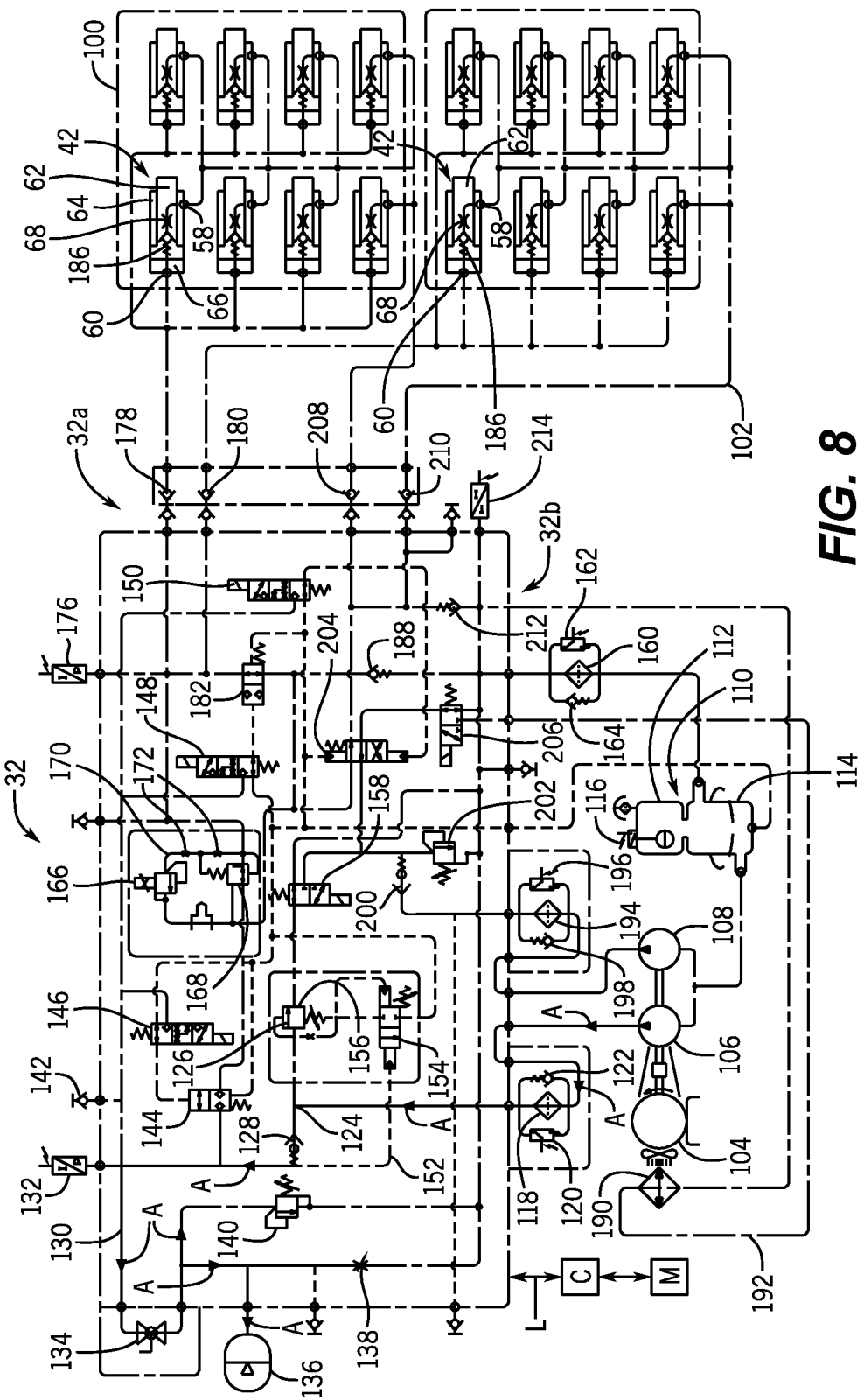
FIG. 8 is a schematic view of the system of FIG. 7 showing charging of an accumulator.

With further reference to FIGS. 7 and 8, the hydraulic circuit 32 includes an electric motor 104 for powering a primary gear pump 106 and a secondary gear pump 108 which are interconnected so as to be operated together, and are controlled for selective activation and deactivation by the control system C. The pumps 106, 108 are configured to variously pump hydraulic fluid into the first manifold 32a and the second manifold 32b. The pumps 106, 108 are in communication with a supply of hydraulic fluid contained in a cyclonic reservoir 110 having an upper portion 112 and a lower portion 114 such as is commercially available from Eaton Corporation Hydraulics Operation of Eden Prairie, Minnesota. Such cyclonic reservoir 110 is more fully disclosed in U.S. Pat. No. 5,918,760, European Patent No. 0831238, Swedish Patent No. 510620 and German Patent No. 69705474.8, each of which is incorporated herein in entirety by reference. The upper portion 112 is provided with a switch 116 for sensing and responding to a lower than desired hydraulic fluid level in the reservoir 110. When the motor 104 is energized, the primary pump 106 pumps hydraulic fluid, such as oil, from the reservoir 110 into the hydraulic circuit 32 and, more specifically, to a high-pressure filter unit defined further by a high-pressure filter 118, a clogging switch 120 and a check valve 122 as shown by the arrows A in FIG. 8. Hydraulic fluid normally flows through the filter 118 which acts to protect contaminants from entering components in the hydraulic circuit 32 and is directed towards a junction 124. In the event the filter 118 becomes clogged or obstructed with contaminants carried by the hydraulic fluid, the clogging switch 120 will react to an increase in hydraulic fluid pressure differential and will transmit a signal to the PLC unit associated with the control system C that the filter 118 needs to be changed. At the same time, when the hydraulic fluid pressure exceeds a predetermined level (e.g., 50 psi) due to the clogging of the filter 118, the check valve 122 opens. This allows the hydraulic fluid to bypass the filter 118 and continue into the hydraulic circuit 32 to the junction 124 which is connected on one side to a pump unloader valve 126 and is connected on an opposite side to a check valve 128. Hydraulic fluid cannot flow past the unloader valve 126 because it is closed and travels instead through the check valve 128 to a header 130 which is connected to a pressure transducer 132 that is monitoring system pressure and controlling the motor 104. The hydraulic fluid is then directed through a ball valve 134 to an accumulator 136, a manual flow control valve 138 and a relief valve 140, as required by OSHA for a manual bleed-off and safety release of the accumulator's stored energy. As will be explained below, the pump 106 is periodically energized to charge the accumulator 136 so that the accumulator 136 by itself provides pressurized hydraulic fluid which is used to provide powered movement of the brake 30 to the closed position and the Braking State. Periodically operating the pump 106 provides a savings cost to the railyard owner in contrast with prior art systems with constantly running pumps which have been found to consume excessive electrical power.

The accumulator 136 can include any one of a variety of hydraulic energy storage devices, such as compressed gas or a gas-charged accumulator or the like. In the example shown, the accumulator 136 is constructed with two chambers that are separated, for example, by an elastic diaphragm or floating piston. One chamber contains an inert gas under pressure or "pre-charge" that provides compressive force on the hydraulic fluid in the hydraulic circuit 32. Here, the hydraulic circuit 32 is designed so that the primary pump 106 pumps hydraulic fluid to the other chamber of the accumulator 136 for a predetermined time to charge or load the accumulator 136 above its preloaded nitrogen charge (e.g., 2200 psi) until the hydraulic fluid reaches a predetermined maximum system pressure such as, for example, 3000 psi. In this charging phase, hydraulic fluid is prevented from flowing past the manual flow control valve 138 which is normally closed. The manual flow control valve 138 can be opened to ensure that hydraulic fluid in the accumulator 136 is directed back to the reservoir 110 at a regulated rate when the retarder system 20 is shut down. The relief valve 140 is normally closed to prevent any fluid flow therethrough. However, if the pressure of the hydraulic fluid charged in the accumulator 136 exceeds the predetermined maximum system pressure by a certain amount, for example if the charge pressure reaches 3250 psi, the relief valve 140 is shifted open to discharge an appropriate amount of fluid back to the reservoir 110 until the maximum system pressure is satisfied at which time the relief valve 140 is again closed.

Figure 9:
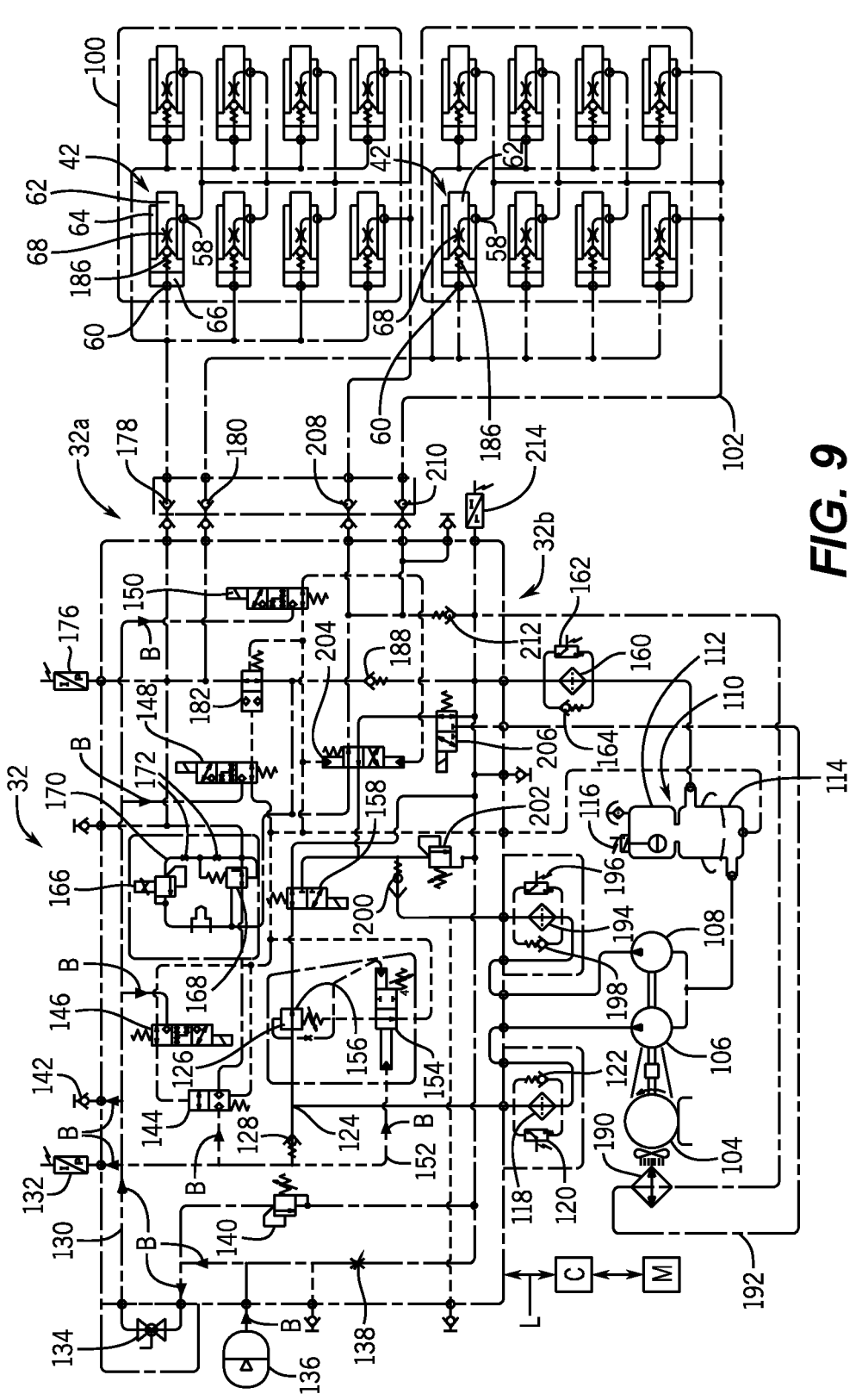
FIG. 9 is a schematic view of the system of FIG. 7 showing the accumulator being fully charged.

As the primary pump 106 charges the accumulator 136 with hydraulic fluid, the system pressure, represented by arrows B in FIG. 9, begins to build up in the hydraulic circuit 32. This increasing system pressure is transmitted through the ball valve 134 and the header 130, the pressure transducer 132 (also referred to as a pressure sensor) and to a pressure tap 142 to allow for manual system monitoring. System pressure is also transmitted to an accumulator isolator 144 and a pilot-controlled solenoid valve 146 for the operation of the isolator 144. Both the isolator 144 and the solenoid valve 146 are used when it is desired to close the brakes 30 in the retarder system 20, during the Braking State. Both the isolator 144 and the solenoid valve 146 are normally closed so that there is no fluid flow therethrough. System pressure is further transmitted to a pilot directional control solenoid valve 148 and a pilot-controlled solenoid valve 150, both of which are initially closed so that there is no fluid flow therethrough. In addition, system pressure is communicated via path 152 so that it will push on a plunger of an unloader 154. This opens up a circuit which allows the system pressure to be transmitted to the unloader valve 126 where the high system pressure which has been built up shifts the spool of the unloader valve 126 enabling all the hydraulic fluid to be unloaded such as represented at 156. Hydraulic fluid exiting the unloader valve 126 is in communication with a flow diverter solenoid valve 158, which is further in communication with a filter 160 of a return filter unit to the reservoir 110. The return filter unit includes a clogging switch 162 and a check valve 164 which operates similarly to clogging switch 120 and check valve 122.

Figure 10:
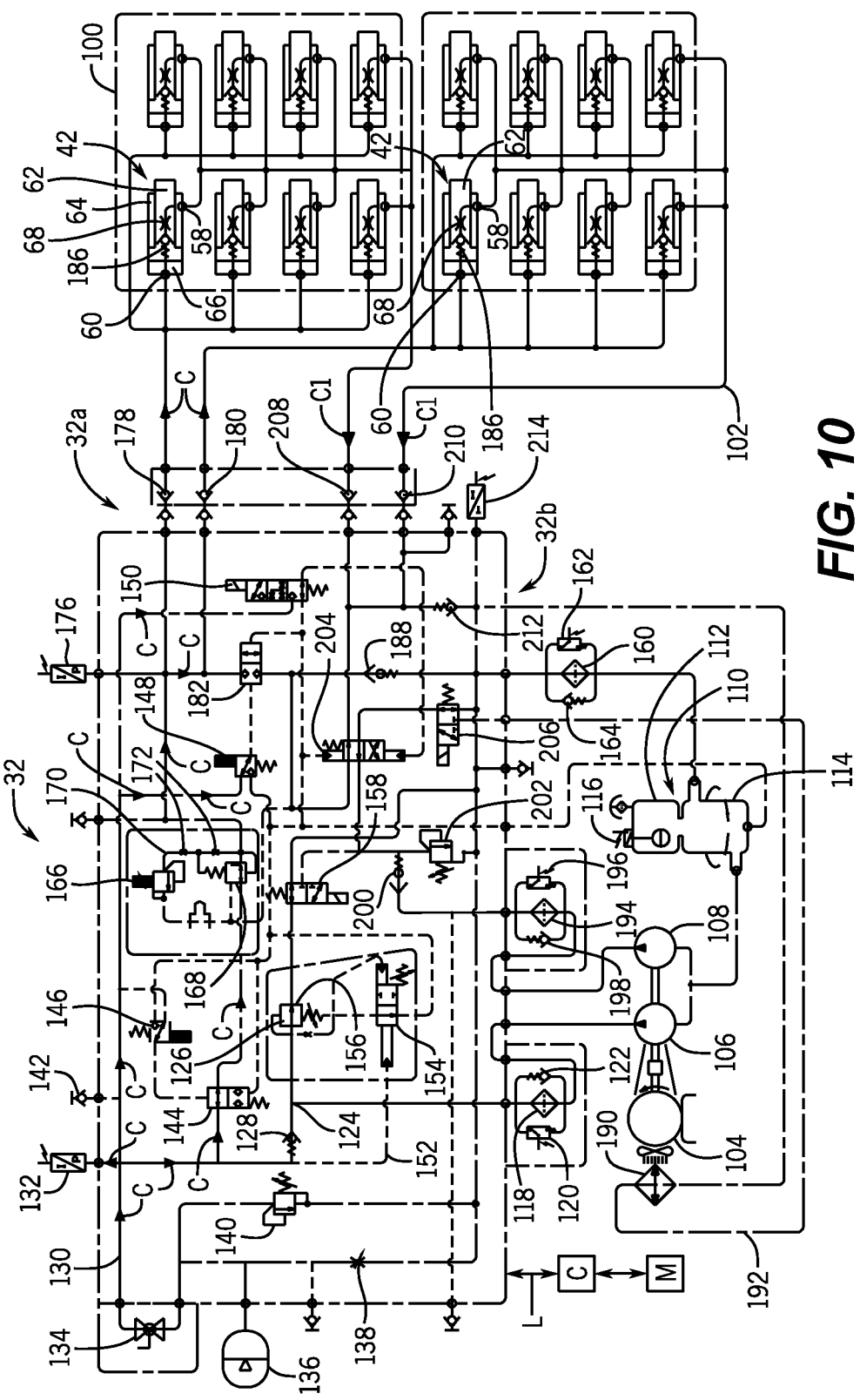
FIG. 10 is a schematic view of the system of FIG. 7 showing a powered closing of the brake and a discharging of the accumulator into a Braking State.

At this point, the accumulator 136 is fully charged, the motor 104 is turned off, the piston-cylinders 42 associated with the brakes 30 are in a retracted mode and the hydraulic circuit 32 is readied for a braking event in which each piston 62 may be extended as the accumulator 136 is discharged. To close the brakes 30, the control system C sends a signal to energize and shift the pilot control solenoid valve 146 from the closed condition to an open condition. As depicted in FIG. 10, hydraulic fluid, as represented by arrows C, then flows through the solenoid valve 146 which acts as a pilot valve to a port of the accumulator isolator 144. Here, the pressure of the hydraulic fluid acts on a spring biased spool of the accumulator isolator 144 to effect opening thereof so that full pressure hydraulic fluid exits from the accumulator isolator 144 and flows towards a pressure controlling arrangement where a particular hydraulic fluid operating pressure is selected. The pressure controlling arrangement is located in the first manifold 32a and includes a pilot controlled proportional solenoid valve 166, and a main stage logic element 168 connected to the solenoid valve 166 by a pilot line 170 provided with a pair of orifices 172. The control system C sends an electrical signal to energize the pilot control solenoid valve 166 corresponding to a selected desired braking pressure. That is, the control system C is configured to send a plurality of different electrical signals to the pilot control solenoid valve 166, each signal causing the valve 166 to control the logic element 168 to achieve a different one of a plurality of different fluid pressures in the first manifold 32a corresponding to a different one of a plurality of different braking pressures. The pilot-controlled solenoid valve 166 controls the logic element 168 by controlling the pressure of fluid in the pilot line 170 coupled to the logic element 168. Pressure of fluid in the pilot line 170 is maintained proportional to the plurality of the different signals. Pressure of fluid in the first manifold 32a which is controlled by the logic element 168 is maintained proportional to the pressure of fluid in the pilot line 170. This arrangement is designed to provide fine pressure control of the hydraulic fluid in the hydraulic circuit, and provide a more efficient quick response to commands from the control system C.

Hydraulic fluid at the selected pressure is then monitored by a pressure transducer 176 (also referred to as a pressure sensor) and delivered through multi-port connectors 178, 180 into the cap-side chamber 66 of each piston-cylinder 42. Hydraulic fluid flowing towards a directional control valve 182 is prevented from flow therethrough by sending a signal to energize solenoid valve 148 causing the directional control valve 182 to close and prevent flow to the reservoir 110. Introduction of hydraulic fluid represented by arrows C into the cap-side chamber 66 forces each piston 62 into an extended position thus forcing the upper and lower levers 38, 40 to pivot about the pin 36 and close the brake shoes 50 relative to one another. Thus, the brake 30 is actuated via a powered movement into a closed condition and the Braking State with a selected braking pressure commensurate to that set by the control system C. During brake closing, the solenoid valves 150 and 158 are de-energized, while solenoid valves 146, 148 and 166 are energized as noted above.

During movement of each piston 62 into its extended position, the hydraulic fluid will act to close a check valve 186 provided on the piston 62 so that there is no fluid transfer through dampening orifices 68 between the rod-side chamber 64 and the cap-side chamber 66. Hydraulic fluid flows out of the rod-side port 58 and, as represented by arrows Cl, is discharged back into the hydraulic circuit 32 thus facilitating movement of the brake 30 to the closed position.

Figure 11:
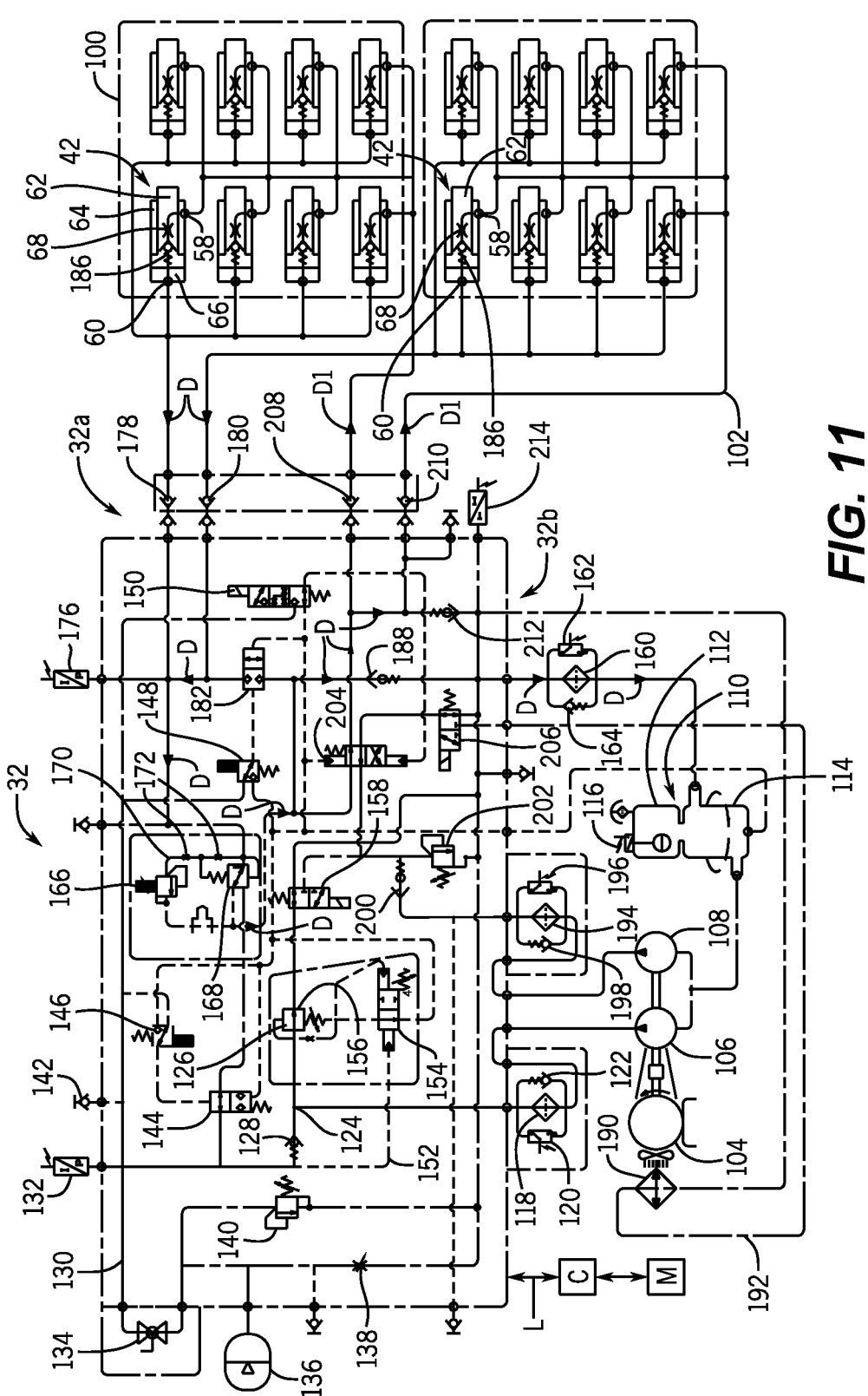
FIG. 11 is a schematic view of the system of FIG. 7 when the brake is closed and a railcar wheel enters the brake.

When the brake 30 is in the closed position and with solenoid valves 146, 148 and 166 energized, it is forced into an open position by a railcar wheel traveling into the brake 30 as illustrated in FIG. 11. As hydraulic fluid represented by arrows D is forced from the cap-side port 60 of each piston-cylinder 42, there is a rapid movement of piston rod 62 and an increase or spike in the hydraulic fluid pressure. Such pressure increase is transmitted to the logic element 168 in the first manifold 32a which shifts to allow excess hydraulic fluid to be directed to the reservoir 110 so that over-pressurization is avoided and the selected system pressure is maintained. The excess hydraulic fluid flowing to the reservoir 110 passes through a back-pressure inducing check valve 188 so that a portion of the hydraulic fluid is transferred through multi-port connectors 208, 210, as represented by arrows D1, to the rod port 58 of each piston-cylinder 42 to prevent cavitation during rapid movement of each piston rod 62.

Figure 12:
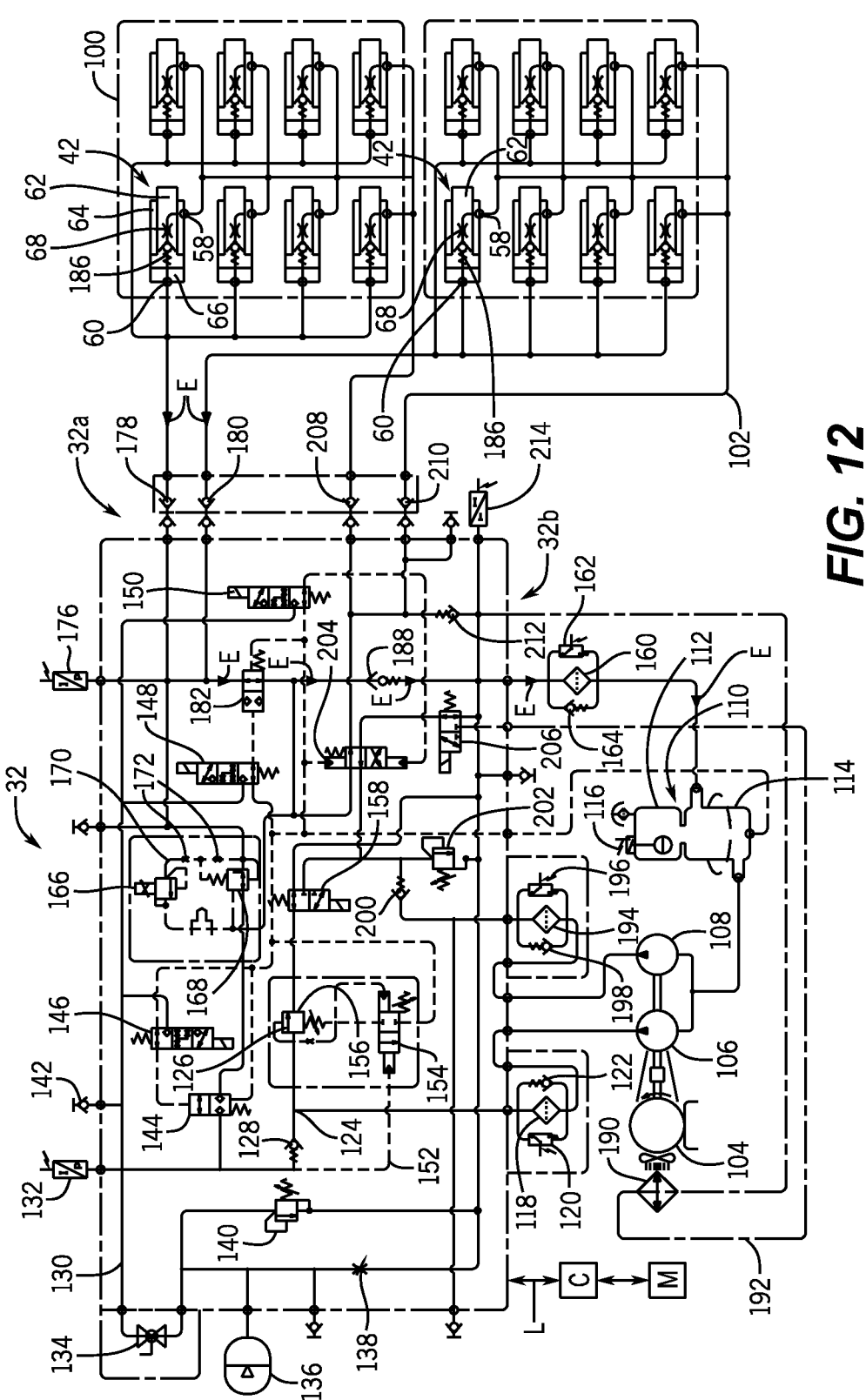
FIG. 12 is a schematic view of the system of FIG. 7 showing a non-powered opening of the brake into a Relaxed State.

Referring to FIG. 12, when it is desired to move from the Braking State to the Relaxed State, the solenoid valves 146, 148 are de-energized and shifted closed by the control system C. Solenoid valves 150, 158 and 166 are likewise de-energized by the control system C. In addition, the directional control valve 182 will assume a normally open position and allow hydraulic fluid as represented by arrows E to be sent therethrough past check valve 188 and to a low-pressure filter unit including return filter 160, a clogging switch 162 and a bypass-check valve 164 for delivery to the reservoir 110.

It should be appreciated that at this point, no pressurized hydraulic fluid has been supplied to the rod ports 58 of the piston-cylinders 42. Instead, the hydraulic fluid is given a free path from the cap-side chambers 66 back to reservoir 110 defining a relaxed position for the piston-cylinder 42 in which the weight of the levers 38, 40 and the return springs 55, 57 will cause at least partial opening of the brakes 30 via a non-powered movement. This feature provides for faster brake opening reaction times and makes the retarder system 20 more energy efficient.

Figure 13:
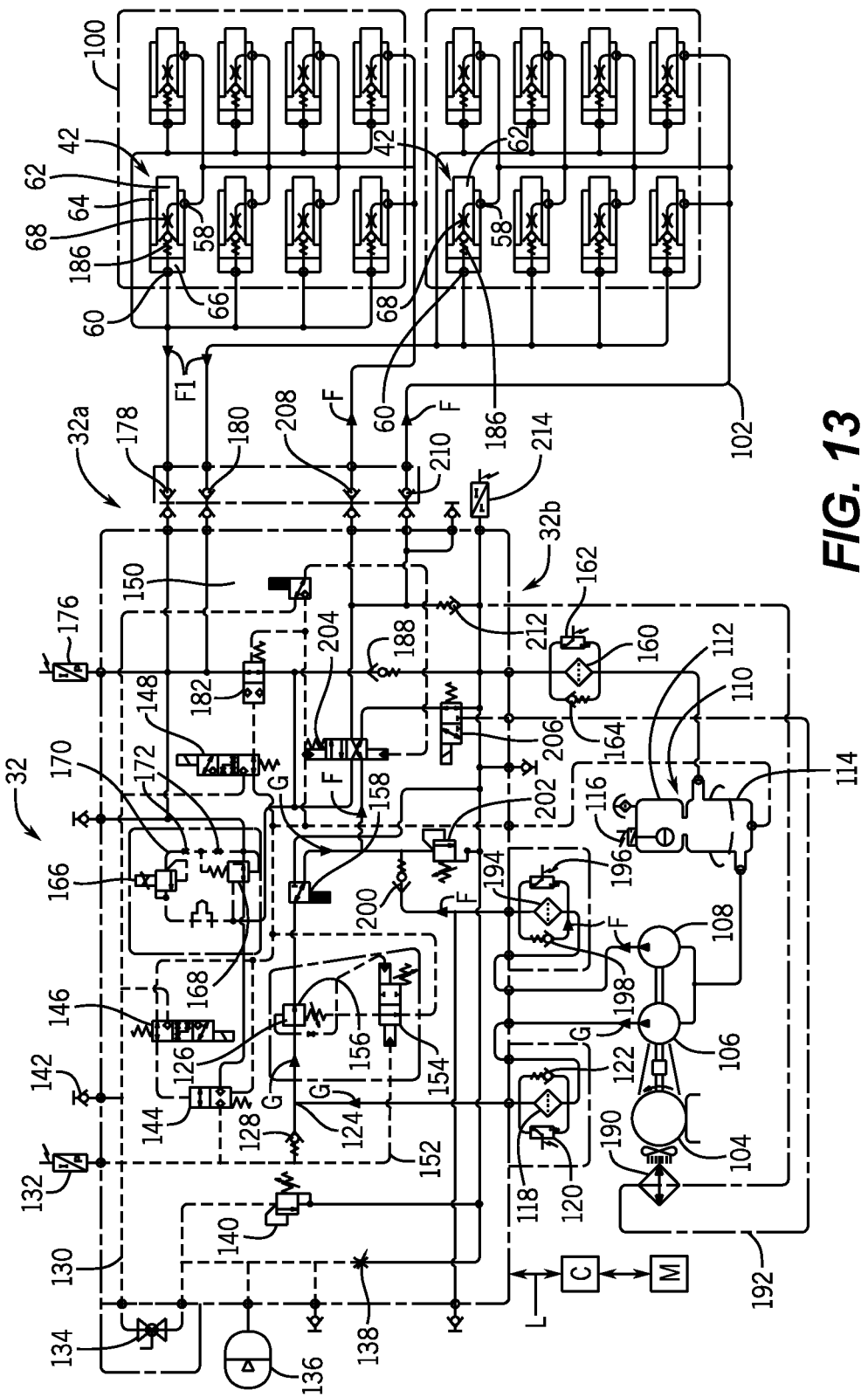
FIG. 13 is a schematic view of the system of FIG. 7 showing a powered opening of the brake into a Power Open/Flush State.

Referring to FIG. 13, when it is desired to provide a powered opening of the brakes 30, the secondary pump 108 pumps hydraulic fluid as represented by arrows F from the reservoir 110 through a filter 194 of a high-pressure filter unit defined further by a clogging switch 196 and a check valve 198 that operates similarly to clogging switch 120 and check valve 122. Hydraulic fluid is pumped by the secondary pump 108 past a check valve 200 which is in communication with a relief valve 202 similar to relief valve 140. That is, the relief valve 202 acts to allow hydraulic fluid flow back to the filter 194 when the pressure exceeds a predetermined maximum value (e.g., 600 psi). The hydraulic fluid leaving the check valve 200 flows to a pilot controlled directional control valve 204 for assisting in a power open and flush and retraction of the piston-cylinders 42. The directional control valve 204 is in communication with a flow diverter solenoid valve 206 selectively used to divert flow of heated hydraulic fluid to a cooler 190 in a cooling loop 192. The solenoid valves 146, 148 and 158 are de-energized and solenoid valve 150 is energized to shift the spool of the pilot controlled directional control valve 204 so that hydraulic fluid pumped by the secondary pump 108 flows through multi-port connectors 208, 210, as represented by arrows F, and to the rod-side chambers 64 to power retract and flush the piston-cylinders 42. As hydraulic fluid enters the rod-side chambers 64, the hydraulic fluid passes through the dampening orifices 68 and pushes open the check valves 186 so that some hydraulic fluid flushes to the cap-side chambers 66. This flushing arrangement enables the hydraulic fluid fed into the cap-side chambers 66 to be slowly recycled into the hydraulic circuit 32 and through filters 118, 160, 194 so that the hydraulic fluid can be better cleaned. Thus, the piston-cylinders 42 assume retracted positions and the brakes 30 are actuated via a powered movement into the open position and a Power Open/Flush State using either the secondary pump 108 or both pumps 106, 108 as described below. Hydraulic fluid flows out of the cap-side chambers 66, as represented by arrows F1, and is discharged back to the hydraulic circuit 32.

As a feature of the disclosure, it may be possible to combine hydraulic fluid flows of the primary pump 106 and the secondary pump 108 to move the brakes 30 to their powered open position with decreased cycle times and faster speeds if the accumulator 136 is at full hydraulic charge pressure. When primary pump 106 is available, both the solenoid valve 150 and the flow diverter solenoid valve 158 are energized which results in the shifting of their spools and the combining of the hydraulic fluid flows from the primary pump 106 as represented by arrows G and the secondary pump 108 as represented by arrows F. This combined pump flow is again delivered through the multi-port connectors 208, 210 into the rod-side chambers 64 of the piston-cylinders 42 to effect a faster, more efficient powered movement and opening of the brakes 30.

Figure 14:
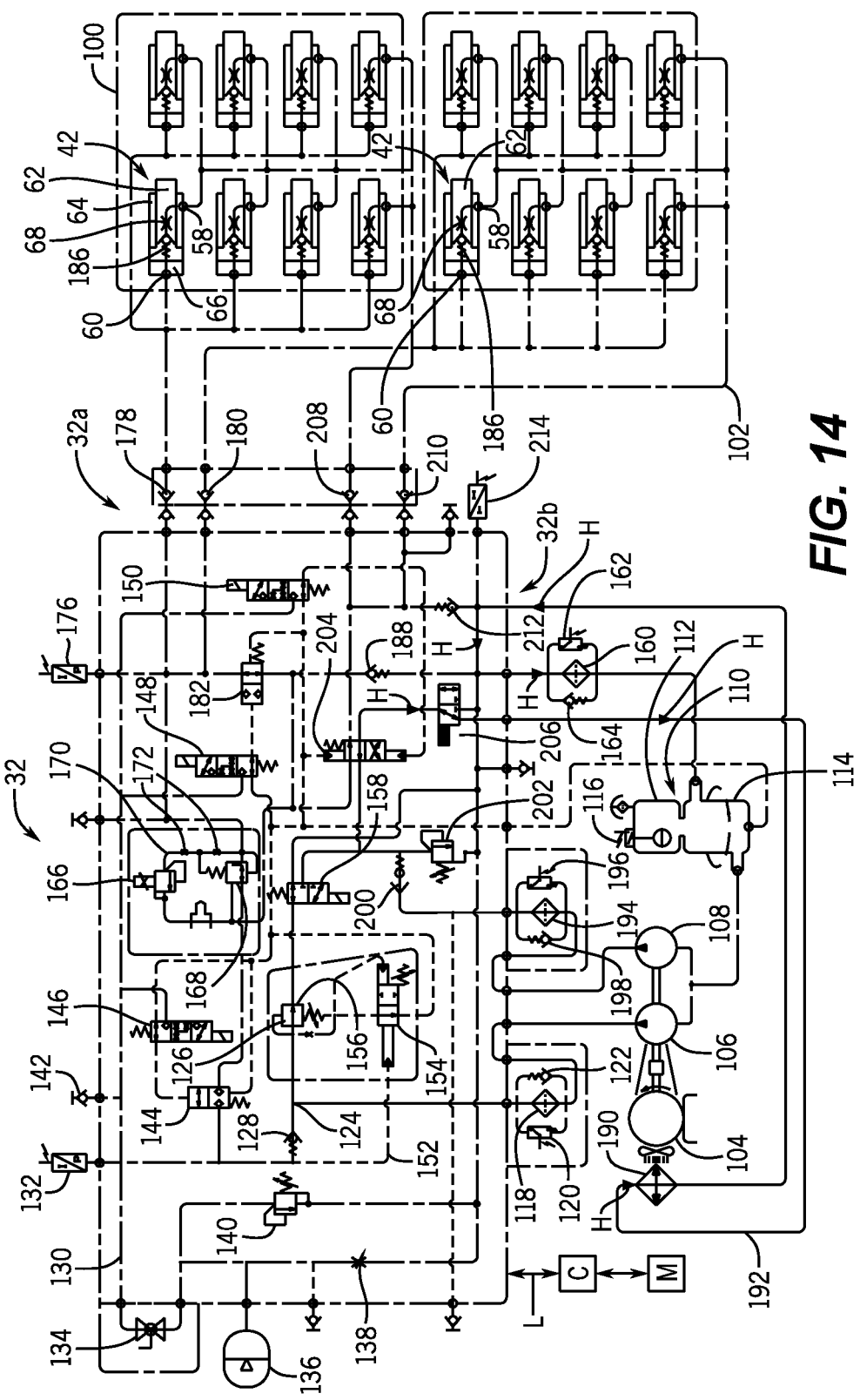
FIG. 14 is a schematic view of the system of FIG. 7 showing a cooling loop.

Referring to FIG. 14, should the hydraulic fluid become heated during operation, the solenoid valve 206 is energized to shift its spool so that the heated hydraulic fluid, as represented by arrows H, passing through directional control valve 204 will flow to the cooler 190. Cooled fluid from cooler 190 is then returned back into the cyclonic reservoir 110.

A further feature of the disclosure resides in the provision of certain components 144, 146, 148, 150, 154 (pilot port three), 182 which are designed to provide ultra-low fluid leakage for maintaining accumulator charge. An anti-cavitation check valve 212 connects the low pressure return fluid directly to the rod-side 64 of each piston-cylinder 42. In the event the piston-cylinders 42 are forced open while the motor 104 is off, the check valve 212 allows oil to freely flow from the low pressure return to the rod-side 64 of each piston-cylinder 42 to prevent cylinder cavitation. All return hydraulic fluid is monitored by a temperature sensor 214.

The reservoir 110 is a cyclonic reservoir defined generally by a circular tank that holds the returned hydraulic fluid. The fluid spins and centrifugal forces push the entrained air to the center of the reservoir and the air bubbles will rise past an integrated baffle and naturally aspirate in the upper portion 112 of the reservoir 110. The cyclonic reservoir 110 provides for a more efficient reservoir used in the processing of the returned hydraulic fluid in the hydraulic circuit 32.

Figure 15:
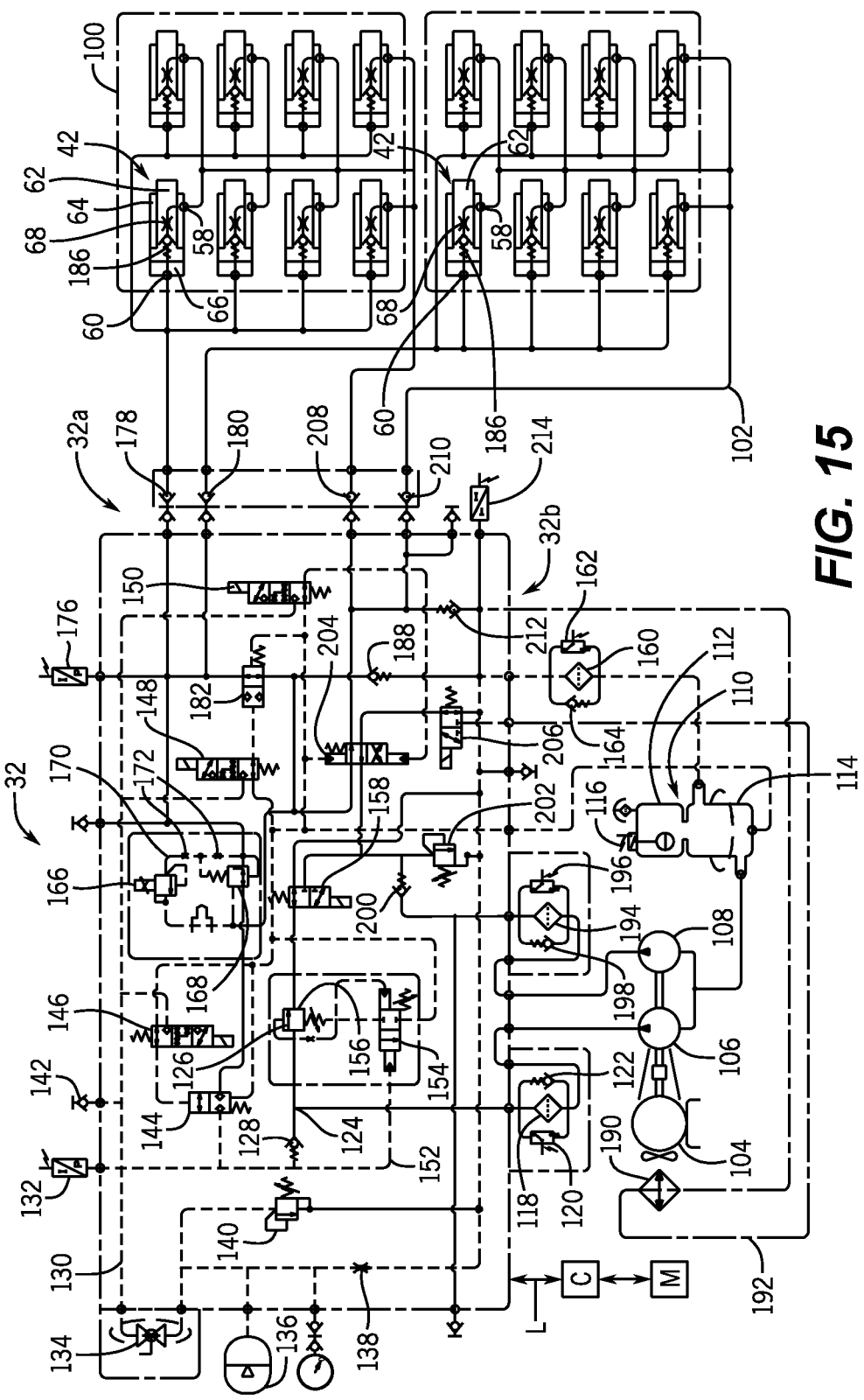
FIG. 15 is a schematic view of the system of FIG. 7 showing an accumulator repair/replacement.

Referring to FIG. 15, should it be necessary to repair or replace the accumulator 136, the motor 104 is turned off and the system must first be drained by manually opening the flow control valve 138 and then manually closing the ball valve 134. Following accumulator repair/replacement, the flow control valve 138 is manually closed and the ball valve 134 is manually opened.

The present inventors have developed the presently disclosed systems and methods for further improving upon systems known in the rail industry, including managing railcars in a rail yard. For simplicity, the present disclosure principally refers to applications relating to retarder systems for slowing a speed of a railcar. However, it should be recognized that the variable speed motors, pump configurations, hydraulic circuits, cooling systems, and control systems disclosed herein may also be used in other applications, including any in which a member is controlled to selectively contact a railcar, such as a derailer system.

With reference to FIG. 7, retarder systems known in the art utilize brushed, single-speed motors 104 to drive the primary gear pump 106 and/or the secondary gear pump 108, which are also referred to either together or separately as the "pump arrangement." This single-speed motor 104 operates the pump arrangement to cause the hydraulic fluid to flow through the hydraulic circuit 32, as discussed above.

The present inventors have recognized that the control systems C known in the art control the motor 104 to operate regardless of the actual need for further pressure within the hydraulic circuit, essentially stopping only when the accumulator 136 storing hydraulic fluid is fully charged. Consequently, much of the hydraulic fluid pumped by the primary gear pump 106 and/or the secondary gear pump 108 from operating the motor 104 is unnecessary. Specifically, the hydraulic fluid is frequently cycled from the cyclonic reservoir 110, through the hydraulic circuit 32, and back to the cyclonic reservoir 110 without being used to move the brakes 30 in either direction. This unnecessary operation of the motor 104 wastes energy, thereby increasing the cost of operating the retarder system 20. This operation also generates additional heat through the retarder system, wasting further energy by increasing the demand on the cooling loop 192 to remove this additional heat. The increased use and additional heat of the motor 104, the primary gear pump 106 and/or the secondary gear pump 108, the cooling loop 192, and other valves and components also reduces the lifespan of these elements. It then follows that this further increases the cost of ownership, decreases reliability, and decreases the uptime between maintenance events.

The prevent inventors have further identified problems with controlling the motor 104 such that it is completely stopped when the accumulator 136 is fully charged. First, there is no movement of the hydraulic fluid through the hydraulic circuit 32 while the motor 104 is stopped. Therefore, the retarder system 20 is not cooled or lubricated during this time, leading to further thermal and mechanical failures. Additionally, starting and stopping the motor 104 causes greater wear and tear on the motor 104 and related electrical components versus continuously operating the motor 104. The same wear may also occur to the primary gear pump 106 and/or the secondary gear pump 108, which are driven by the motor 104. Once again, the result is deteriorated performance from additional mechanical, thermal, and electrical wear on the motor 104, the primary gear pump 106 and/or the secondary gear pump 108, and other components.

In certain configurations, the single speed motor operating speed is dependent on the voltage level of the source. Higher voltages in one retarder system installation location can cause a reduction in motor speed and conversely lower voltages will cause higher speed at the expense of increase current load on the source. This leads to another major variable on equipment performance based on equipment location.

Figure 16:
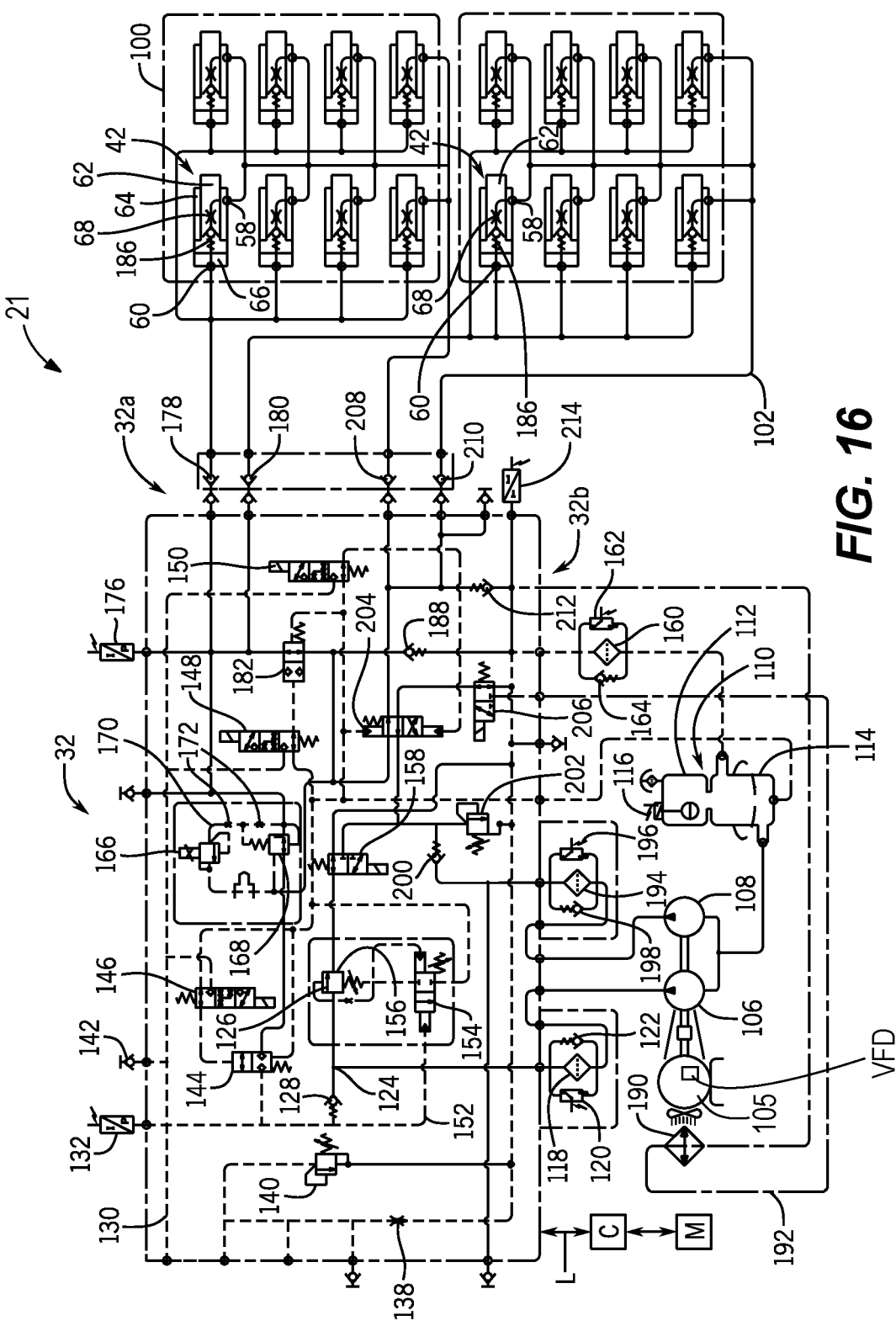
FIG. 16 is a schematic view of an electro-hydraulic system for operating a retarder system according to the present disclosure.

FIG. 16 depicts a retarder system 21 for retarding the speed of a railcar according to the present disclosure. As will become apparent, the retarder system 21 improves the efficiency in hydraulic fluid flow and pressure production over systems presently known in the art. The retarder system 21 includes many of the elements described above and shown in FIG. 7, which are labeled using like-reference numbers for simplification. In contrast to the configuration of FIG. 7, the retarder system 21 of FIG. 16 includes a variable speed motor 105 that is configured to drive the primary gear pump 106 and the secondary gear pump 108 to pump the hydraulic fluid through the hydraulic circuit 32.

Through experimentation and development, the present inventors have recognized that using a variable speed motor 105, such as a brushless DC or AC induction motor, along with a correspondingly configured control system C, improves the performance and efficiency of the retarder system 21. In addition to improved efficiency and performance, using a brushless motor as the variable speed motor 105 (whether AC or DC) overcomes some the short-comings of the brushed technology, such as brush wear and contamination. In the case of a brushless DC motor as the variable speed motor 105, the control system C controls the frequency of DC voltage provided to the variable speed motor 105 to adjust the speed setting thereof (in other words, to change the RPM of the motor). One example of a variable speed, brushless DC motor available in the market is Model Number BLDC1.5-90, produced by Volcano Electric in Zhejiang, China, the Model Rx30, produced by MGM COMPRO of the Czech Republic, or Tesla® Model 3.

In the case of an AC induction motor as the variable speed motor 105, the control system C includes an AC Variable Frequency Drive (VFD) that controls the frequency of AC voltage provided to the variable speed motor 105 to adjust the speed setting thereof. Examples of AC induction motors that could be used in the present retarder system 21 include the drive motors commonly used in electric cars, for example the Marathon Motors with Rockwell Automation Allen Bradley PowerFlex.

A conventional VFD includes three separate sections. The first section includes a convertor that converts AC power to DC power. The second section includes DC-based circuitry such as a capacitor and inductor to provide filtering, which ensures delivery of a smooth, rectified DC voltage. The third section includes a DC-to-AC inverter that converts the DC power back to three-phase AC power (or a pulse width representation of three phases). In short, the inverter rapidly switches the DC power on and off so that the variable speed motor 105 receives a pulsating voltage that is like AC power. The switching rate is controllable by the control system C to vary the frequency of the simulated AC that is applied to the variable speed motor 105.

Using an AC induction motor as the variable speed motor 105 requires that the applied voltage be proportionally adjusted whenever the frequency is changed. In other words, if a motor is designed to operate at 460 Volts at 60 Hz, the applied voltage must be reduced to 230 Volts when the frequency is reduced to 30 Hz. Therefore, the ratio of volts over hertz must be regulated to a constant value (460/60=7.67 in this case). The control system C or VFD may use pulse width modulation (PWM) for adjusting the voltage in proportion to changes in the frequency of the power delivered to the variable speed motor 105. With PWM voltage control, inverter switches are used to divide the simulated sine-wave output waveform into a series of narrow voltage pulses with modulated width of the pulses, which are created by rapidly turning on and off the DC voltage. Therefore, the control system C delivers both a varying voltage and a varying frequency to the variable speed motor 105 to adjust the speed setting thereof. The higher the frequency supplied to the variable speed motor 105, the faster it will run.

It should be recognized that the same principals can also be used to vary the torque and/or horsepower of the variable speed motor 105. Moreover, the present inventors have recognized that using these techniques, the control system C can control the variable speed motor 105 to operate at speed settings outside the rated range of speeds (above and/or below).

One advantage of using a brushless DC motor as the variable speed motor 105 is the ability to implement a permanent magnetic rotor field, as opposed to an induced rotor filed found in an AC induction motor. The permanent magnet rotor field allows the motor to rotate with a significantly less energy, particularly as the motor does not need to compensate for loses (e.g., iron losses) to generate a rotational field as required by an AC induction motor. This provides higher power densities without increasing the required input energy. However, there are also advantages to AC motors and thus both are contemplated for use.

The present inventors have recognized that maximizing the output energy of the variable speed motor 105 with the least amount of input energy requires tracking the position of the rotors therein. For this purpose, hall-effect sensors are mounted in the variable speed motor 105, which send signals to the control system C to provide rotor position feedback. Using this position feedback, the inverter sends power into the windings of the variable speed motor 105 to cause rotation. The control system C uses the hall effect sensors feedback to coordinate the turning on and off of IGBT switches to rotate the motor rotor (a process also referred to as commutation).

Commutation for either a brushless DC motor or an AC induction motor is a six-step process. A three-Phase H-Bridge is used to create six flow vectors each causing a rotation of 60 degrees relative to each position of the rotor, thus making a full rotation of 360 degrees. The rate that these vectors change controls the speed of the variable speed motor 105, which changes the pulse width of power from the control system C. The control system C generates a simulated sine wave using pulses of energy with varying widths to build this wave. When the flow vectors lag behind the commanded speed, the vectors increase the width of each pulse to release more energy to the variable speed motor 105 winding. The changes in width continue until the variable speed motor 105 is achieves the speed setting desired. Conversely, the control system C narrows the widths of the pulses to reduce the speed setting of the variable speed motor 105. The vectors are used to control the energy delivered to the variable speed motor 105 based on the load that is applied to the rotor. In focus these vectors represent torque. The greater the vector angle, the wider PWM signal, and the more torque that will be generated. In particular, the wider PWM signal causes more current to flow to the motor windings, which generates more flux to thus generate the increased torque.

It should be recognized that portions of the control system C, such as the VFD, may be provided onboard the variable speed motor 105 itself. It should further be recognized that the same type of control system C may be used for either a brushless DC motor or an AC induction motor, for example, with the control system C being powered via DC power.

Figure 17:
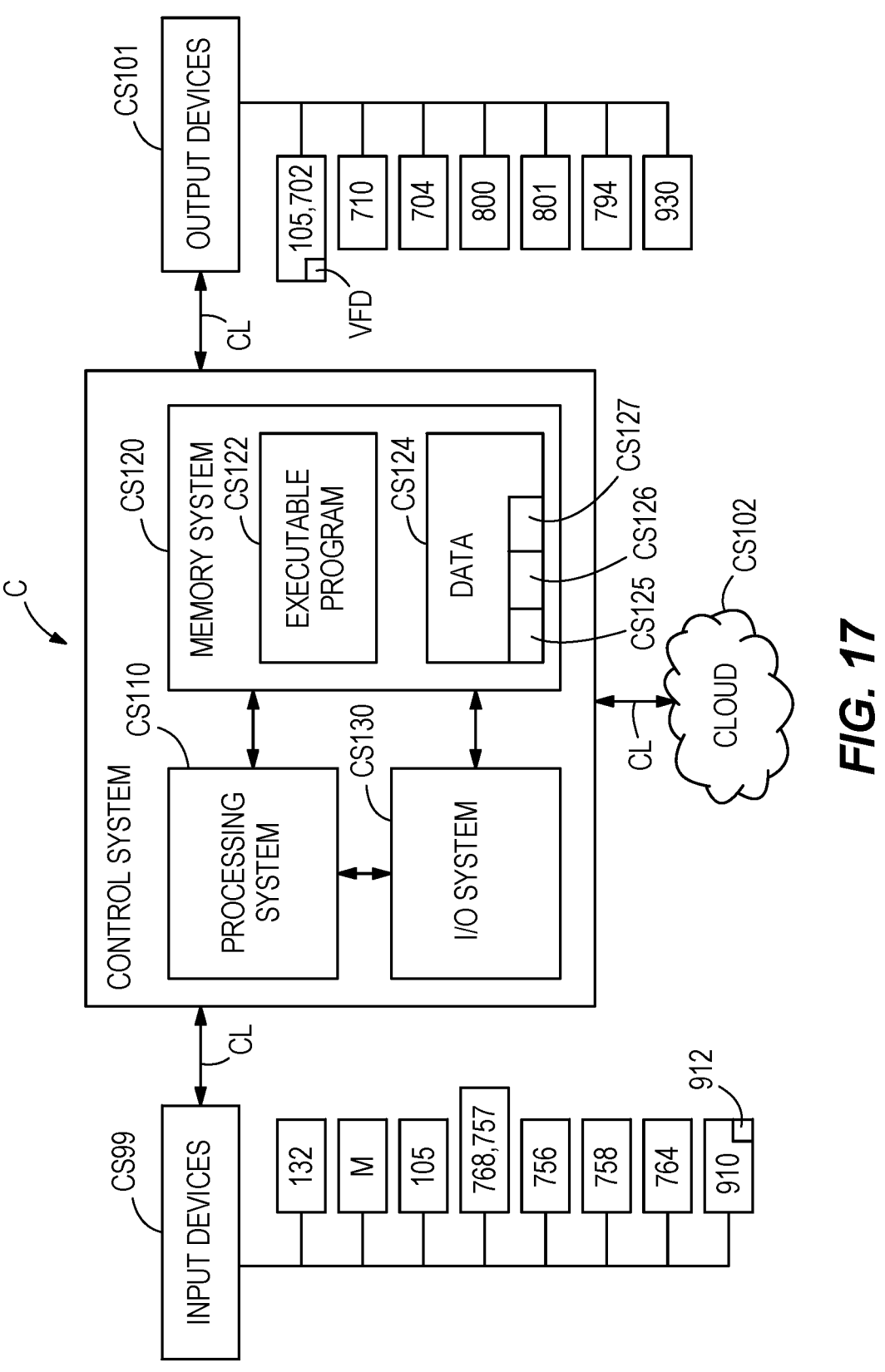
FIG. 17 is a schematic view of a control system for operating and cooling a retarder system according to the present disclosure.

With reference to FIG. 17, the control system C receives signals from various input devices CS99, such as a yard monitoring system M and a pressure transducer 132 (also referred to as a pressure sensor) that measures the pressure of the hydraulic fluid within the hydraulic circuit 32. It should be referenced that while the immediate discussion may focus on components of the hydraulic circuit 32, the teaching also apply to the hydraulic circuit 701 and the cooling circuit 801 discussed below and components thereof. The control system C also provides signals to output devices CS101, such as the variable speed motor 105. It should be recognized that the same element may be both an input device CS99 and an output device CS101, such as for a variable speed motor 105 that provides data via an onboard voltage sensor, current sensor, temperature sensor, and/or speed sensor.

In certain examples, the control system C communicates with each of the one or more components of the retarder system 21 via a communication link CL, which can be any wired or wireless link L as discussed above. The communication link CL may be a controller area network (CAN) bus; however, other types of links could be used. It will be recognized that the extent of connections and the communication links CL may in fact be one or more shared connections, or links, among some or all of the components in the retarder system 21. Moreover, the communication link CL lines are meant only to demonstrate that the various control elements are capable of communicating with one another, and do not represent actual wiring connections between the various elements, nor do they represent the only paths of communication between the elements. Additionally, the retarder system 21 may incorporate various types of communication devices and systems, and thus the illustrated communication links CL may in fact represent various different types of wireless and/or wired data communication systems.

The control system C includes a processing system CS110, memory system CS120, and input/output (I/O) system CS130 for communicating with other devices, such as the input devices CS99, the output devices CS101, and/or a cloud-based computing system CS102. The processing system CS110 loads and executes an executable program CS122 from the memory system CS120, accesses data CS124 stored within the memory system CS120, and directs the retarder system 21 to operate as described herein.

The processing system CS110 may be implemented as a single microprocessor or other circuitry or be distributed across multiple processing devices or sub-systems that cooperate to execute the executable program CS122 from the memory system CS120. Non-limiting examples of the processing system include general purpose central processing units, application specific processors, and logic devices. The memory system CS120 may comprise any storage media readable by the processing system CS110 and capable of storing the executable program CS122 and/or data CS124. The memory system CS120 may be implemented as a single storage device or be distributed across multiple storage devices or sub-systems that cooperate to store computer readable instructions, data structures, program modules, or other data. The memory system CS120 may include volatile and/or non-volatile systems and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example.

Returning to FIG. 16, the control system C controls the operation of the variable speed motor 105 to control the flow of the hydraulic fluid as necessary to move brake 30 between the closed position and the open position. However, unlike the control of the motor 104 described above (e.g., FIG. 7), the control system C also determines a speed setting from among a plurality of speeds for operating the variable speed motor 105. The plurality of speeds at which the motor 104 may be operated range from 0% to 100% speed corresponding to fully-off and full-on states, respectively, with at least one intermediate speed therebetween. Determining the speed setting is not limited to when the brake 30 is being moved, but also when the brake 30 is held stationary. In particular, the control system C is configured to determine the speed setting for operating the variable speed motor 105 based on the pressure of the hydraulic fluid in the hydraulic circuit 32. This pressure may be measured via the pressure transducer 132 or pressure sensor discussed above. In certain embodiments, the pressure transducer 132 produces an output that varies in current based on the pressure within the hydraulic circuit (e.g., ranging from 4 mA to 20 mA, whereby 20 mA corresponds to a pressure of 3000 PSI). It should be recognized that the pressure transducer 132 need not be in the position shown in FIG. 16, and/or need not reflect the same pressure as the braking pressure provided to the brake 30.

With reference to FIG. 17, in certain embodiments the control system C determines a speed setting for operating the variable speed motor 105 based on data CS124 that is stored in the memory system CS120. In certain embodiments, the speed setting is based on a maximum speed CS125, also referred to as an upper setpoint, for operating the variable speed motor 105. The maximum speed CS125 may correspond to the rated speed of the variable speed motor 105, the primary gear pump 106 and/or the secondary gear pump 108, and/or the power systems supplying energy to these components. The speed setting for operating the variable speed motor 105 may be further determined with reference to a function CS126 that is based on the measured pressure of the hydraulic fluid. By way of non-limiting example, the function CS126 may include an algorithm, a table, and/or other control scheme stored in the memory system CS120. It should be recognized that the maximum speed need not be the literal maximum RPM of the motor. In certain examples, the function CS126 provide a reduction of offset to the maximum speed CS125, based on the pressure of the hydraulic fluid, for operating the variable speed motor 105.

In certain configurations, the control system C reduces the speed setting for operating the variable speed motor 105 inversely proportionally to changes in the pressure. For example, the speed setting may be reduced from the maximum speed at a rate of 10 RPM for every 20 PSI increase in pressure within the hydraulic circuit 32 while the pressure is below 3000 PSI. The present disclosure also contemplates other control schemes for determining the speed setting as a function of the pressure of hydraulic pressure, including other proportions (e.g., 30 RPM for every 20 PSI), exponential relationships, step-wise adjustments, or other functions.

By reducing the speed setting of the variable speed motor 105, the control system C decreases the flow of hydraulic fluid in the hydraulic circuit 32 as the pressure increases. In certain embodiments, an upper setpoint CS127 of pressure is stored in memory system CS120 and referenced by the control system C such that the flow of hydraulic fluid is reduced as the pressure in the hydraulic circuit 32 approaches this upper setpoint. Likewise, the control system C is also configured to increase the flow of hydraulic fluid as the pressure gets further below the upper setpoint CS127 pressure. A lower setpoint CS128 may also be stored in the memory system CS120, whereby the speed setting is adjusted to be greater when the pressure is below the lower setpoint CS128 as compared to other values (e.g., the speed setting has a step increase and/or is adjusted according to a different function CS126 at the lower setpoint CS128). The control system C therefore actively manages the pressure within the hydraulic circuit 32 such that the pressure is sufficient to move the brakes 30 as needed, but to not create waste beyond this need.

The present inventors have recognized that by controlling the flow of hydraulic fluid to actively manage the pressure of hydraulic fluid within a set range, other components necessary for retarder systems with single-speed motors can be eliminated. These components include the accumulator 136, which helps manage pressure in the hydraulic circuit 32 as well as the ball valve 134 and other elements that are needed with the accumulator 136 (see FIG. 7). Eliminating these components provides for a simpler and lower-cost retarder system 21 over systems presently known in the art.

In addition, a typical accumulator may hold as much as 5 gallons of hydraulic fluid therein. Therefore, the retarder system 21 of FIG. 16 may be further simplified by not requiring as much hydraulic fluid, also saving time for changeovers and cleaning.

In addition to adjusting the speed setting of the variable speed motor 105, the control system C may limit the rate at which this speed setting is changed (e.g., a maximum ramp-up and/or ramp-down rates for the variable speed motor 105). By way of example, the control system C may be limited to increasing the speed setting no more than 10 RPM per second or 10% per second (based on the maximum RPM, a current RPM, or another preset RPM). Likewise, the control system C may limit decreases to the speed setting to not be greater than 50 RPM per second or 20% per second. The control system C may also control the speed and pressure of braking, provide a power boost during ramp-up, and/or provide a variety of controls during ramp-down. A power boost is available during ramp-up because the controller at this point has the ability to provide more current and more power than the rated nameplate of the motor. This makes the motor provide more power output than nominally available, but is limited by the available input current (which the control system C monitors and controls). In the ramp down, the controller can control the rate at which power is reduced, preventing the DC portions of the control system C from increasing the voltage too quickly. Moreover, if the DC voltage does become too high, the control system C is configured to dump voltage to a resistor.

FIG. 18 depicts one method 300 for retarding the speed of a railcar, such as using the retarder system 21 of FIG. 16. Steps 302-306 may be performed in a similar or same manner as described above for using the system of FIG. 7. Step 302 provides for configuring a brake to apply braking pressure on a wheel of a railcar when in a closed position and to not apply braking pressure on the wheel of the railcar when in an open position. Step 304 provides for coupling a hydraulic actuator to the brake and configuring the hydraulic actuator to move the brake into and between the closed position and the open position. Step 306 provides for fluidly coupling a manifold, a pump arrangement, a reservoir, and the hydraulic actuator together to form a hydraulic circuit. Step 308 proceeds similarly to that described above, configuring the pump arrangement to supply hydraulic fluid from the reservoir to the hydraulic actuator. However, in the method 300 of FIG. 18, the pump arrangement is driven by a motor operable at a plurality of speeds (a variable speed motor 105) in contrast to the single-speed motors used in retarder systems known in the art.

Step 310 provides for configuring a control circuit to receive a pressure of the hydraulic fluid in the hydraulic circuit. In step 312, a speed setting is determined from among the plurality of speeds to operate the motor based on the pressure of the hydraulic fluid in the hydraulic circuit. The speed setting determination may be made via application of an algorithm, reference to a lookup table, and/or the like in which the pressure is an input and the output is a speed setting for operating the variable speed motor 105. Step 314 provides for operating the motor to move the brake into and between the closed position and the open position and operating the motor at the speed setting to control a flow of the hydraulic fluid based on the pressure of the hydraulic fluid in the hydraulic circuit.

FIG. 19 depicts another method 400 for retarding the speed of a railcar. Steps 402 through 410 may proceed in the substantially same manner as steps 302 through 310 of FIG. 18. In step 412, the determination of a speed setting for operating the variable speed motor is specifically made via comparison of the pressure of the hydraulic circuit to a lookup table of speed selections 401 stored in the memory system CS120 (see FIG. 17). In particular, the lookup table of speed selections 401 may have a first column corresponding to pressures measured in the hydraulic circuit and a second column corresponding to the speed setting for operating the variable speed motor. Step 414 then proceeds in the substantially similar manner as step 314.

FIG. 20 depicts another method 500 for retarding the speed of a railcar. Steps 502 through 510 may proceed in the substantially same manner as steps 302 through 310 of FIG. 18. In step 512, the determination of a speed setting for operating the variable speed motor is specifically made via comparison of the pressure of the hydraulic circuit to an upper setpoint 501 stored in the memory system CS120 (FIG. 17), such as 3000 PSI. When the pressure in the hydraulic circuit is found in step 514 to be less than the upper setpoint 501, step 516 provides for adjusting the speed setting inversely proportionally to the pressure relative to the setpoint, or in other to changes in the pressure. For example, the speed setting may be adjusted from a maximum speed (e.g., 100% RPM) when the pressure is 2100 PSI to decrease at a rate of 10% of the maximum speed for every additional 100 PSI (here resulting in a speed setting of 10% of the maximum speed when the pressure is 3000 PSI). In another example, the speed setting is operated via a step function having at least a low pressure—high flow mode and a high pressure—low flow mode. In particular, the control system C may control the variable speed motor 105 to operate at a first RPM (e.g., 1500, 1750, or 2000 RPM) when the pressure in the hydraulic circuit is below 100 PSI, and at a second RPM (e.g., 500, 750, or 1000 RPM) when the pressure in the hydraulic circuit is at or above 100 PSI. In certain configurations, the present inventors have identified that this may correspond to a flow rate for the hydraulic fluid of between 50 and 100, 60 and 90, or 70 and 80 gallons per minute at the first RPM, and a flow rate between 20 and 70, 30 and 60, or 40 and 50 gallons per minute at the second RPM, by way of example. The control system C may also subject the speed adjustment in step 516 to other limitations, such as a minimum speed for operating the variable speed motor.

Alternatively, if in step 514 it is determined that the pressures exceed the upper setpoint 501, step 520 provides for determining a speed setting that is a low, non-zero speed setting. With reference to the example provided above with first and second RPMs for operating a step-wise function, this low, non-zero speed setting may be the same step or a further step distinct from the second RPM above. This low, non-zero speed setting need not be the same as the minimum speed for operating the variable speed motor. In one example, the low, non-zero speed setting of step 520 is 8% of the maximum speed, whereas the minimum speed is less (e.g., 5% of the maximum speed). Following the determination of speed setting in either step 516 or step 520, step 518 proceeds in the substantially same manner as step 314 of FIG. 18, operating the variable speed motor according to the speed setting determined. It should be recognized that the presently disclosed methods are not limited to embodiments in which the variable speed motor 105 always maintains a non-zero speed. The present inventors have recognized particular benefits from continuing to operate the variable speed motor 105, including avoiding spikes of in-rush current when the variable speed motor 105 is commanded to rapidly increase speed (e.g., during a braking event). Inventors: feel free to propose modified language here.

Figure 21:
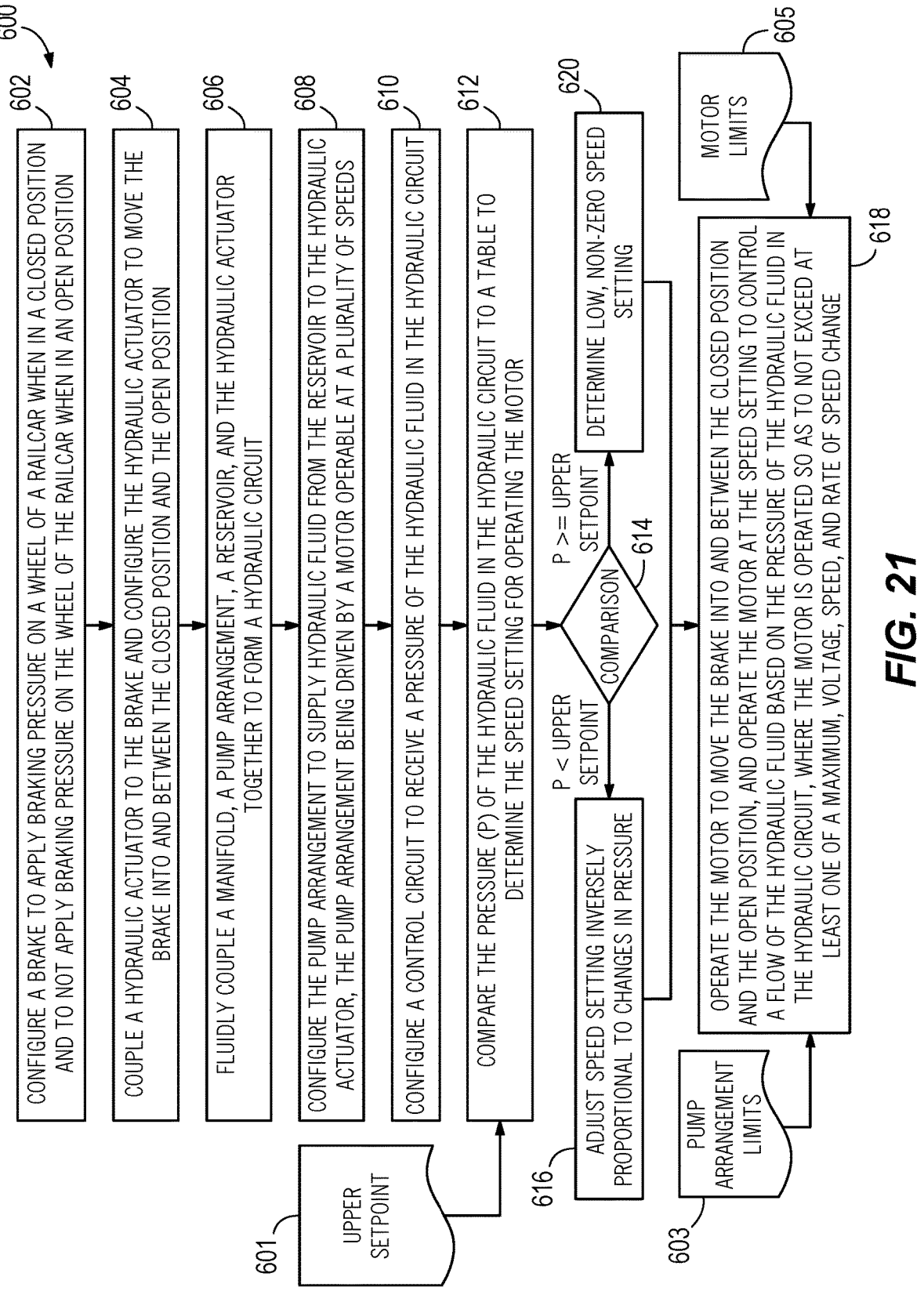
FIG. 21 is a flow chart of another method for retarding the speed of a railcar according to the present disclosure.

FIG. 21 depicts another method 600 for retarding the speed of a railcar. Steps 602 through 616 and 620 may proceed in the substantially same manner as steps 502 through 516 and 620 of FIG. 20. However, in addition to step 618 operating the variable speed motor based on the speed setting determined as a function of the pressure in the hydraulic circuit, step 618 further operates the motor so as to not exceed one of a maximum voltage, a maximum speed (and/or a minimum speed), and a maximum rate of speed change. These maximums and minimums may be provided via pump arrangement limits 603 and motor limits 605 stored in the memory system CS120, as well as other stored sources of limitations.

In certain embodiments, the pump arrangement limits 603 may include a maximum speed for operating the pump arrangement. The control system C may control the operation of the pump arrangement via a known correlation to the speed setting of the variable speed motor driving it (e.g., the pump arrangement rotating at a rate 1.3 times greater than the variable speed motor). This maximum speed for operating the pump arrangement (and/or the variable speed motor) need not be constant, factoring in additional variables such as the pressure in the hydraulic circuit, whether the brakes are moving (and in which direction), and/or temperature measurements of the pump arrangement or other components. These same examples also apply to the motor limits 605, which may also include maximum voltages, currents, or speeds that limit the determination of speed setting to preserve the safety and longevity of the motor. For example, the motor limits 605 may not permit a change in the speed setting or greater than 10 RPM per second, requiring adjustments to the speed setting to not exceed these further motor limits 605.

Figure 24:
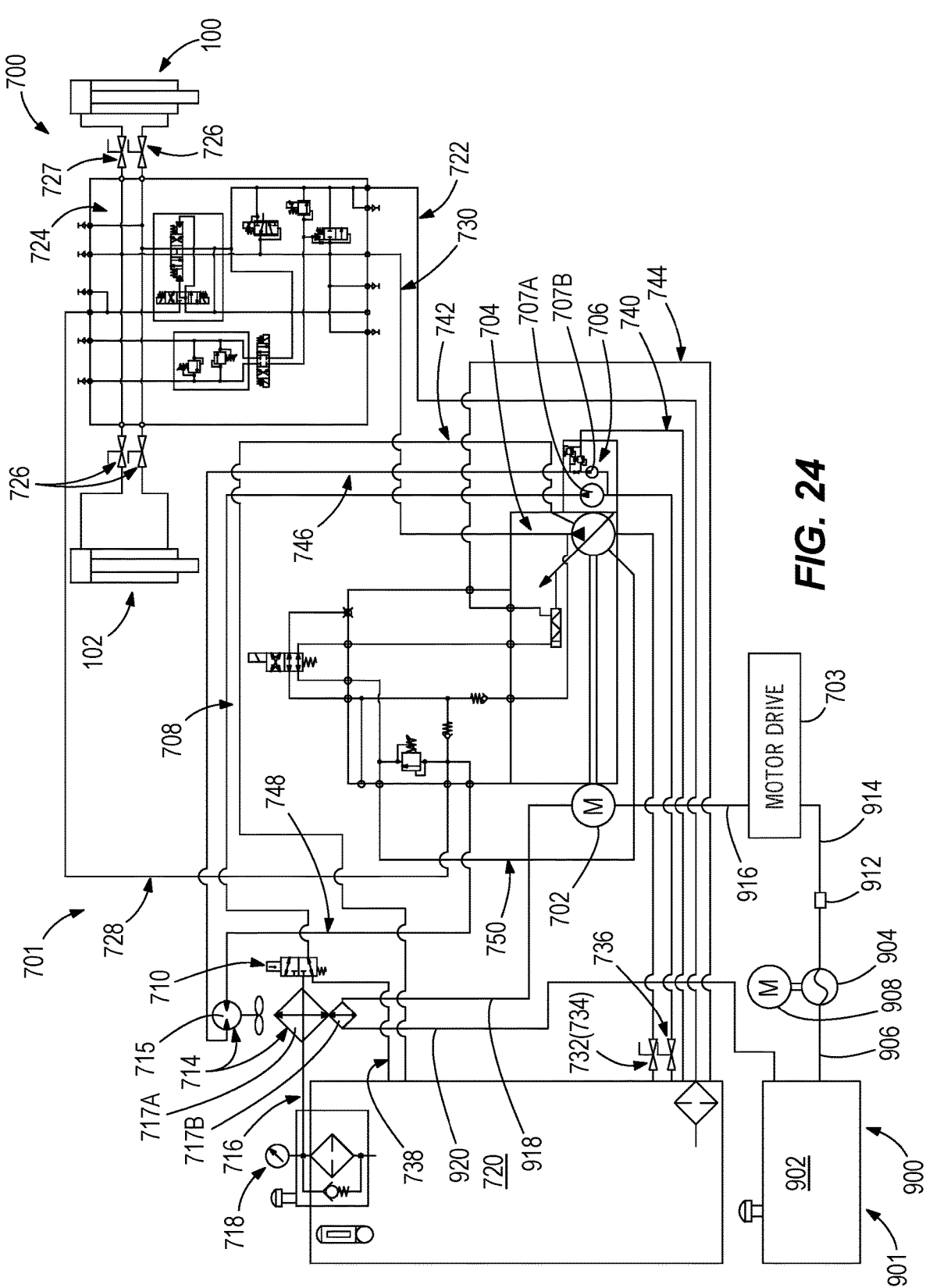
FIG. 24 is a schematic view of a system such as shown in FIG. 23.

FIG. 29 provides an exemplary method 1000 for slowing a railcar according to the present disclosure via the elements described above and/or the elements discussed below. Step 1002 provides for configuring a brake to slow the railcar when in a closed position and to not slow the railcar when in an open position and step 1004 provides for configuring an actuator to move the brake into and between the closed position and the open position, each in the manner described above. Step 1006 provides for fluidly coupling the actuator, a reservoir, and a pump to form a hydraulic circuit, such as shown in FIG. 24. As discussed above, the pump may be driven by a variable speed motor operable at a plurality of speeds between fully-on (e.g., 100% power, a maximum RPM, a threshold RPM, etc.) and fully-off (e.g., 0% power or 0 RPM) states to supply hydraulic fluid from the reservoir to the actuator. Step 1008 provides for controlling the speed setting of the variable speed motor based on a pressure of the hydraulic fluid in the hydraulic circuit such that the pressure is sufficient to operate the actuator, the in step 1010 operating the actuator to move the brake into the closed position to slow the railcar.

Figure 22:
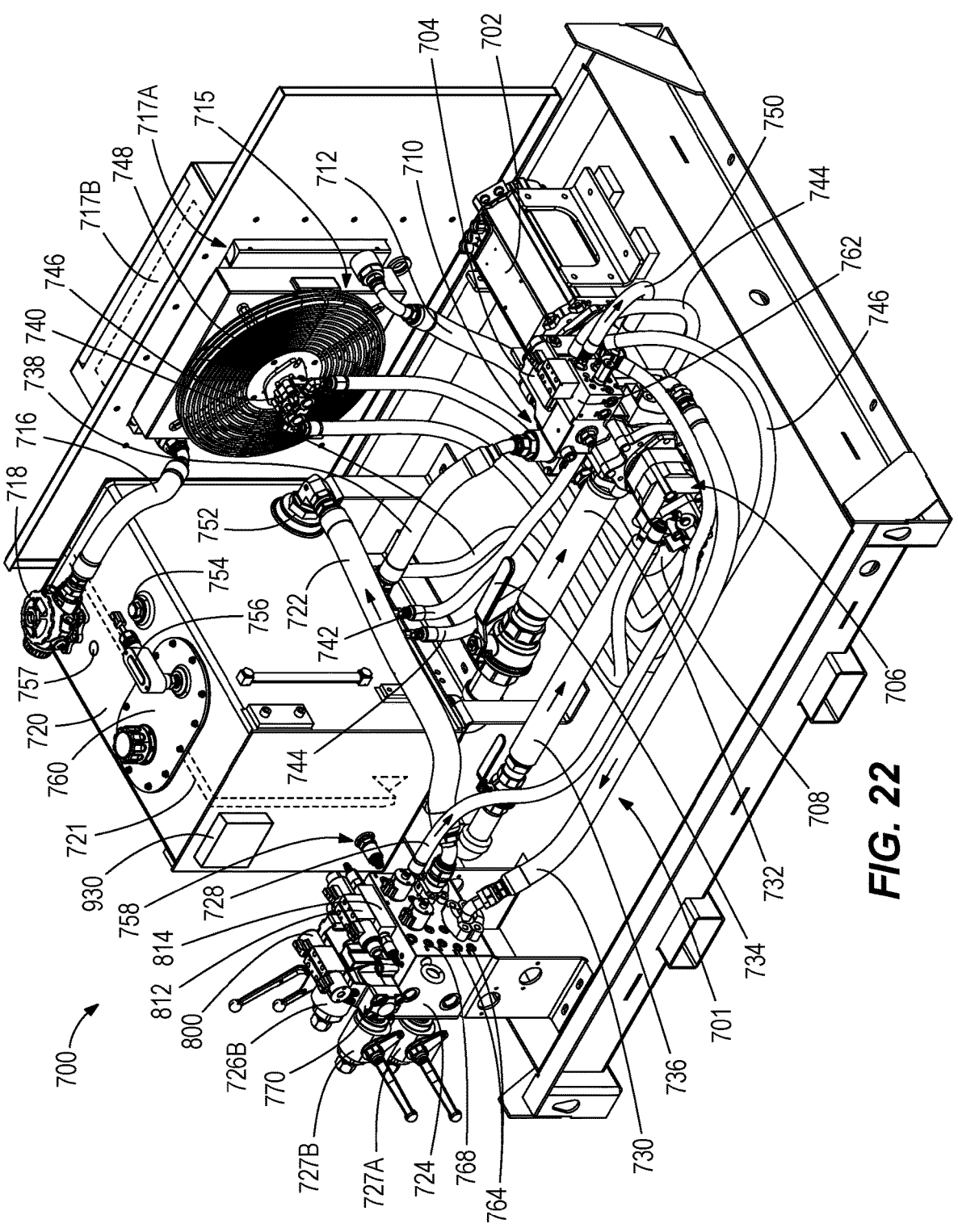
FIG. 22 is a perspective view of another embodiment of a system for retarding a railcar according to the present disclosure.
Figure 23:
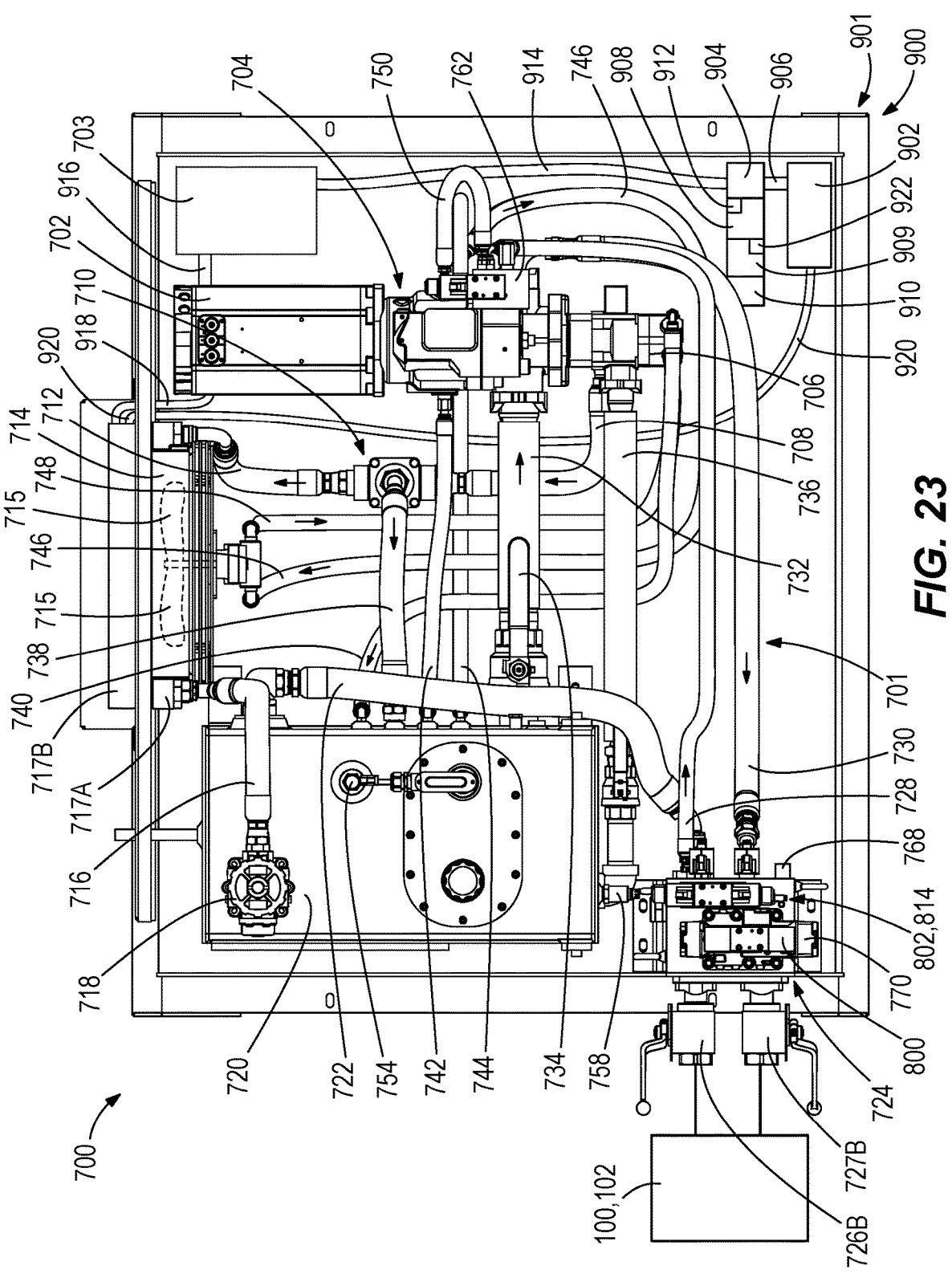
FIG. 23 is a top view of the system of FIG. 22, also showing a coolant system incorporated therein according to the present disclosure.

Another embodiment of a system 700 for providing hydraulic fluid for retarding or otherwise engaging with a railcar is shown in FIGS. 22-23, as well as the schematic of FIG. 24. The system 700 may also be referred to as a "hydraulic power unit". It should be recognized that the system 700 is therefore part of a greater system, which by way of example may include actuators that move brakes to slow the railcar in the context of a retarder system, as discussed above. Many of the components shown in the system 700 may be the same or similar to those discussed for the retarder system 20 above and thus any discussion of like-components should be referenced together. Similarly, components of the retarder system 20 or others discussed above may be incorporated within the system 700 despite not being expressly shown. The system 700 comprises a series of components that are fluidly connected within a hydraulic circuit 701. These components include a motor 702, which may be a variable speed motor as discussed above (e.g., a brushless AC motor or a brushless DC motor), a first pump 704, a second pump 706, and a hydraulic fluid tank (also referred to as the tank 720 or a reservoir), as well as various hoses, valves, blocks, and manifolds to be discussed further below. The pumps may also be referred to as pump arrangements.

Figure 28:
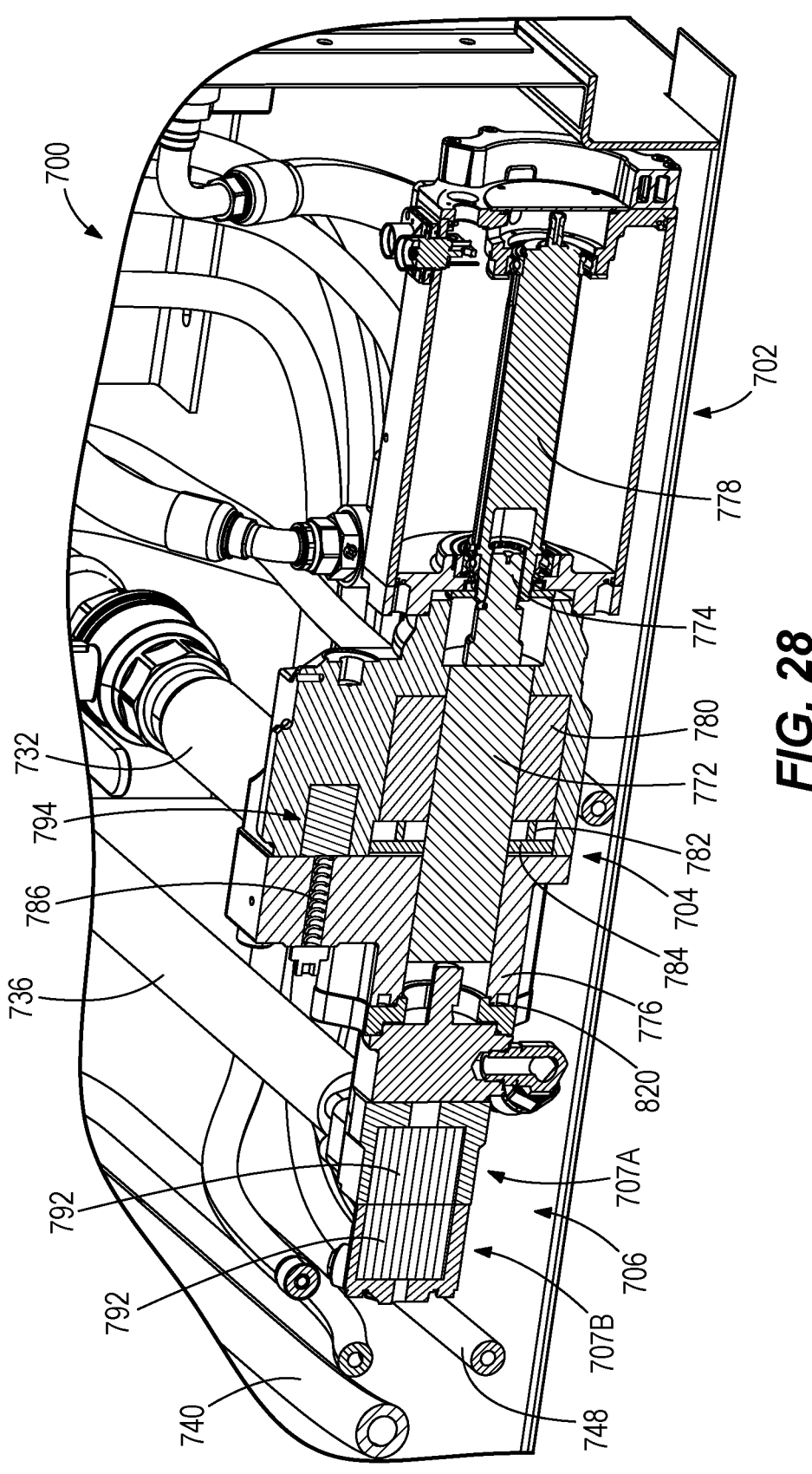
FIG. 28 is a sectional view taken through a motor, a first pump, and a second pump from the system of FIG. 22.

With reference to FIGS. 22-23 and 28, the motor 702 may be a Parker GVM motor produced by Parker Hannifin, which is permanent magnet AC motor with resolver feedback. As discussed further below, the motor 702 may have a direct motor mount to allow the first pump 704 and the second pump 706 to be mounted directly to the motor without the use of a shaft coupling. Motor 702 is capable of operating at the voltage level provide by most railyards. Motor will be liquid cooled, which allows for an overall cooler operating temperature, which the present inventors have recognized provides better operating efficiency and longer component life. The motor 702 is controlled and powered by a motor drive 703, such as an Inmotion ACH drive produced by Inmotion Technologies, which is a mobile duty motor controller that will convert direct current voltage to a variable frequency signal to the permanent magnet motor. The motor drive 703 is capable of controlling the speed and output torque of the motor 702. The motor drive 103 may communicate to the application controller via a CanOpen communication bus. Feedback from the motor 702 and the motor drive 703 may be communicated over the bus to the application controller. Both the motor 702 and the motor drive 103 are provided with pathway to be liquid cooled, as discussed further below. It should be recognized the motor 702 and the motor drive 703 may also be referred to collectively as simply the motor.

In the illustrated system 700, the first pump 704 is a modified axial piston pump having two or more displacements (also referred to as flow rates) that are selectable by a digital directional control valve 794, as discussed further below. An example of a commercially available pump usable as the first pump is produced by Parker Hannifin of Cleveland, OH, part number GVM210-200. The first pump 704 has a manifold that regulates the control pressure and provides case flushing oil (hydraulic fluid) to lubricate and cool the internal components of the first pump 104. In this manner, it should be recognized that both the motor 702 may have variable speed operation and the first pump 704 may have variable output or displacement, each being controllable by the control system C to provide the necessary pressures and flows described throughout this disclosure.

The second pump 706 is a double vane cooling pump, whereby the two vanes can also be referred to corresponding to separate pumps 707A, 707B. One commercially available pump suitable for use as the second pump is produced by Metaris of Chesterfield, MI, part number V2010. The second pump 706 has common inlet that provides hydraulic fluid to both of the separate pumps 707A, 707B, as well as a flow control and relief valve cover on the rear section. The front section of the second pump 706 (i.e., separate pump 707B of FIG. 28) is used as a cooling and filtration loop, as discussed further below. This loop ensures that adequate hydraulic fluid is provided through a heat exchanger to remove heat as needed and to provide a constant laminar flow through filters to provide the best possible filtration. The loop for the rear section of the second pump 706 (i.e., separate pump 707A of FIG. 28) incorporate a bypass flow control and a relief valve for the hydraulic fluid flowing to the heat exchanger, as well as providing control pressure hydraulic fluid to the first pump 704 for selecting the displacement thereof, as discussed above and further below.

Both the first pump 704 and the second pump 706 are operated simultaneously by rotation of the same motor 702. In addition to reducing the bill of materials, operating both pumps via a shared motor 702 saves space and requires fewer power leads. In certain configurations, separate pumps 707A, 707B of the second pump 706 may each provide a flow rate ranging from between 1 and 20, 2 and 10, or 3 and 8 gallons per minute. It should be recognized that when operated by a variable speed motor as the motor 702, this flow rate will vary as a function of the speed setting of the motor 702.

With continued reference to FIGS. 22-24, further description is now provided for how the components may be fluidly coupled within the hydraulic circuit 701. Starting with the first pump 704, the first pump 704 provides hydraulic fluid to a manifold 724 via a hose 730 therebetween. The manifold 724 may be a D08 manifold block similar to the D08 manifolds produced by Parker Hannifin of Cleveland, OH or Daman Products of Mishawaka, IN. Additional detail regarding the manifold 724 is provided below. Ball valves 726A-726B and ball valves 727A-727B fluidly couple the manifold 724 to the first and second cylinder banks 100, 102, respectively, which have brakes moved by actuators to slow a railcar in a manner described above or as otherwise known in the art. In particular, the ball valves are high pressure flange mounted ball valves that are mechanically linked together to provide the ability to isolate sections of the retarder.

In this manner, the hydraulic fluid flows from the manifold 724 to the actuators to move the brakes via ball valves 726A and 727A and back to the manifold 724 via ball valves 726B and 727B. The manifold 724 is further connected via a hose 722 to return the hydraulic fluid to the tank 720. In the illustrated embodiment, a hydraulic diffuser 752 is positioned within the tank 720. The hydraulic fluid from the hose 722 flows through the hydraulic diffuser 752 before entering the tank 720, which helps to dissipate the hydraulic fluid to prevent or reduce air bubbles or turbulence from being introduced into the tank 720. This may be particularly important during a high speed open or close of the retarder. An example of a commercially available hydraulic diffuser is Lenz Inc. of Dayton, OH's part number LTMAD-50. The tank 720 also includes an internal baffle 721 that generally bisects the interior of the tank, but allows for a small amount of flow across (here, under) the baffle 721 to provide even volume and pressure within the tank 720. The prevent inventors have identified that the baffle 721 advantageously prevents turbulence and vortex effects in which air is sucked into the hydraulic fluid where the hydraulic fluid exits the tank 720. The tank 720 also includes a filler breather 760 that allows the tank to breath as well as filters out any airborne contaminants from the outside. The filler breather may also include a desiccant.

The hydraulic fluid from the tank 720 is returned to the first pump 704 via a hose 732. A ball valve 734 is connected to the hose 732 so as to close off the pathway for the hydraulic fluid to flow from the tank 720 to the first pump 704 via the hose 732. This is advantageous for performing service and maintenance on the system 700, such as to replace the first pump 704 or components thereof.

With continued reference to FIGS. 22-24, the tank 720 is also connected to the second pump 706, specifically via a hose 736. There are multiple flow paths for the hydraulic fluid exiting the second pump 706, which are now described. The second pump 706 is connected to a bypass valve 710 via a hose 708. The bypass valve 710 is a two position, 3 valve thermostatic bypass valve operable to select whether the hydraulic fluid provided to the bypass valve 710 flows to a heat exchanger 714 via a hose 712, or bypasses the heat exchanger 714 and is instead directed to return to the tank 720 via hose 738. As discussed further below, a control system such as the control system C of FIG. 17 receives temperature measurements from a temperature sensor 768 that measures the temperature of the hydraulic fluid within the hydraulic circuit 701. The control system C is configured to compare the temperature measured by the temperature sensor 768 to a lower threshold CS127 (e.g., 110° F.) stored in the memory system CS120 and to bypass the heat exchanger 714 when the temperature is below the lower threshold CS127. In other words, the hydraulic fluid is circulated to the heat exchanger 714 as needed to prevent the hydraulic fluid within the hydraulic fluid from exceeding a target operating temperature. In certain embodiments, the target operating temperature ranges from 120° F.-140° F.

The heat exchanger 714 is configured to exchange heat with the hydraulic fluid. If the hydraulic fluid is at a temperature of 110° F. or greater, hydraulic fluid will travel to the heat exchanger. If the hydraulic fluid in less than 110° F., it will bypass the heat exchanger and flow back to the hydraulic oil tank. In the illustrated system 700 of FIGS. 22-24, the heat exchanger 714 comprises a fan 715 and a first radiator 717A (e.g., AKG Thermal System of Mebane, NC's part number HR45) and a second radiator 717B (e.g., AKG Thermal System of Mebane, NC's part number C-8) that are stacked upon each other. In other words, the first radiator 717A and the second radiator 717B are aligned such that air may flow across the coils of one before flowing across the coils of the other. The hydraulic fluid provided to the heat exchanger 714 is cooled via heat exchange with the first radiator 717A as it winds through the first radiator 717A, further assisted by the fan 715 causing the first radiator 717A to exchange heat with atmosphere. As discussed further below, the second radiator 717B is configured to exchange heat with a coolant for liquid cooling the motor 702 and motor drive 703.

In the illustrated system 700, the fan 715 itself is hydraulically operated, being fluidly connected within the hydraulic circuit 701 via hoses 746, 748. The present inventors have identified this configuration to be particularly efficient and reliable. However, it should be recognized that other types of fans are also contemplated by the present disclosure, including those operated by a separate electric motor. Additionally, the illustrated system 700 is configured such that the same fan 715 draws heat away from both the first radiator 717A and the second radiator 717B (the second radiator 717B being discussed further below). However, it should be recognized that other configurations are contemplated by the present disclosure, including having separate fans for the two radiators, and/or using other cooling mechanisms known in the art.

The hydraulic fluid exits the heat exchanger 714, and particularly the first radiator 717A to return to the tank 720 via a hose 716. A filter 718 is fluidly connected to the hose 716 such that the hydraulic fluid must flow therethrough before entering the tank 720. The filter 718 may be of a type known in the art for use with hydraulic fluid, which prevents or reduces impurities being introduced into the tank 720. In certain embodiments, the filter 718 includes an electrical indicator that detects when the element has reached its end of life, and a breather which allows the tank to breathe when the hydraulic fluid level changes during cylinder extension and retraction. In addition to allowing the reservoir to breathe, the breather includes media that allows moisture vapors to escape the reservoir, but blocks them from entering the reservoir. The filter 718 may have a 3 micron absolute rating, built in by-pass valve, and have an inside to outside flow path to allow the element to not only filter the oil, but also to act as a diffuser.

The second pump 706 is also fluidly connected back to the tank 720 via a hose 740. The hose 740 acts as a pressure compensator or pump drain for the hydraulic system 700.

The second pump 706 is also fluidly connected to the fan 715 as discussed above. In particular, a hose 748 returns hydraulic fluid from the fan 715 to the second pump 706. The hydraulic fluid is provided to the fan 715 (via the hose 746) from a de-stroke block 762 coupled to the first pump 704. Exemplary pump and de-stroke block assemblies are produced by Power Systems AHS, LLC of Chanhassen, MN (part number PS-02501-VVA-20) and Parker Hannifin (part number MSG30-3245).

With continued reference to FIGS. 22-24, additional discussion is now provided for a further flow path from the first pump 704. In particular, the first pump 704 is fluidly connected to the tank 720 via a hose 742, which serves as a flow path for returning hydraulic fluid to the tank 720 that has been used to flush the first pump 704. A magnet assembly 754 extends into the tank 720 so as to collect any ferrous impurities within the hydraulic fluid returned to the tank 720 through the hose 742 after flushing the first pump 704, which is conventionally known.

The de-stroke block 762 is directly coupled to the first pump 704 such the first pump 704 pumps a portion of the hydraulic fluid into the de-stroke block 762 when rotated by the motor 102. The de-stroke block 762 has multiple outlets therefrom. The de-stroke block 762 is connected back to the pump 704 via a hose 750 such that the hydraulic fluid flushes the pump 704, such as flushing impurities away from any pistons, valves, vanes, or other components within the pump 704. The first pump 704 is further connected to the tank 720 via a hose 742 to drain the hydraulic fluid used for flushing back to the tank 720, again with any ferrous impurities being caught by the magnet assembly 754 being near the inlet of the tank 720 where this hydraulic fluid is returned. A hose 744 also serves as a drain and exhaust for the de-stroke-block 762, leading back to the tank 720.

The de-stroke block 762 is also fluidly connected to the manifold 724 discussed above via a hose 728. This hose 728 is used to control the flow rate of the first pump 704, particularly by providing a pilot pressure that controls the position of a swash plate within the first pump 704, which is discussed further below. Also relating to the pilot side of the pressures provided within the system 700, the first pump 704 is fluidly connected to the manifold 724 via a hose 730. The hose 730 provides hydraulic fluid on the pilot side of the manifold 724 to ensure even pilot pressure throughout the entire range of operation for the system 700 (e.g., preventing pressure drops during braking events). The hydraulic fluid received within the manifold 724 from the hose 730 flows through a pressure compensated valve stack 802 having solenoids 801A and 801B operable to control the flow through a valve 803 fluidly connected to the manifold 724, which may be a D03 valve such as Danfoss of Denmark's part number DG4V-3-0A-M-U-G7-60. The hydraulic fluid then flows from the valve 803 via the hose 728 to the de-stroke block 762 for controlling the flow rate of the first pump 704, as discussed above. A relief valve 814 is also provided to ensure that the pilot pressure provided through the pressure compensated valve stack 802 does not exceed a maximum threshold, such as 300 PSI.

Figure 25:
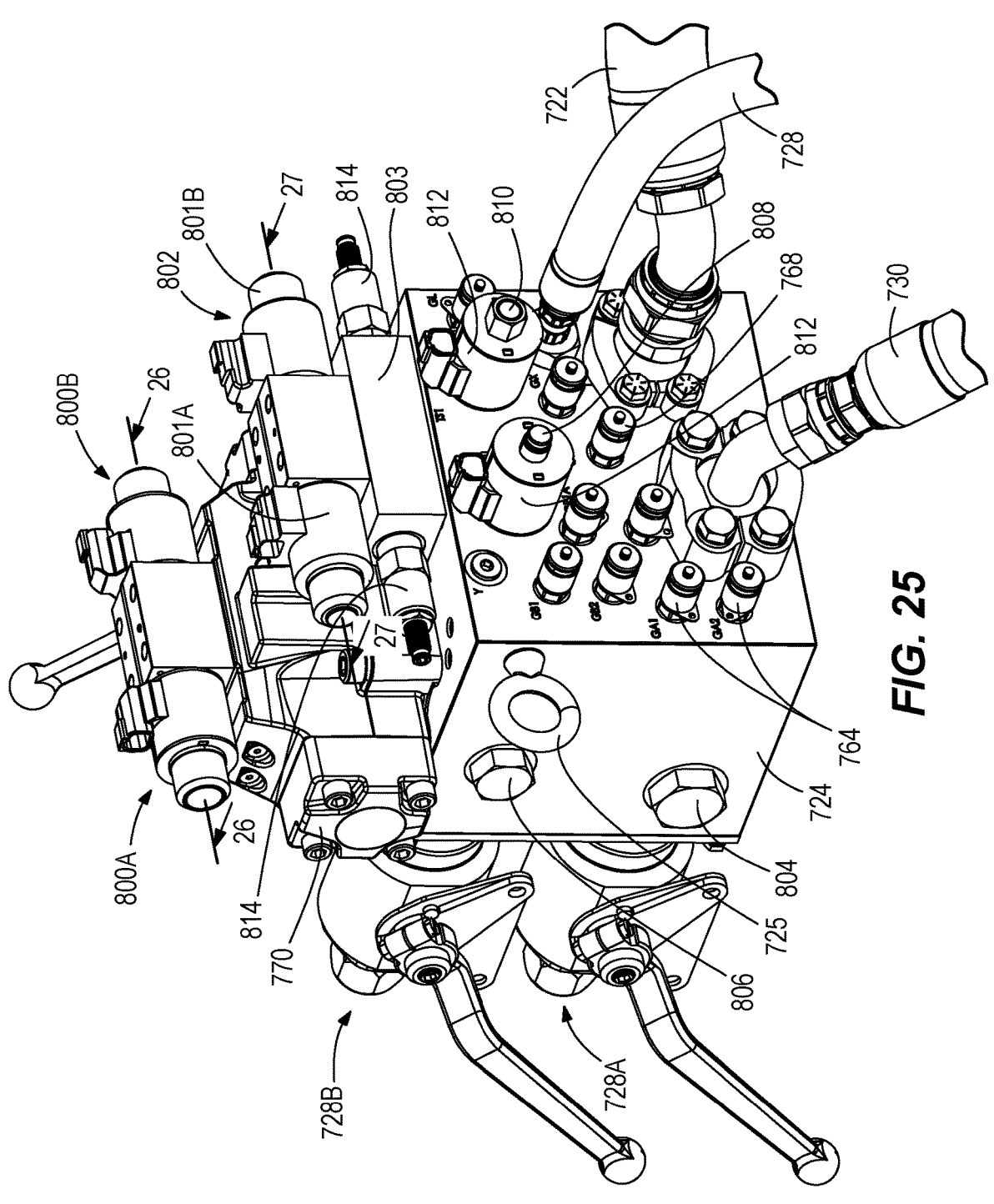
FIG. 25 is a perspective view of a manifold from the system of FIG. 22.
Figure 26:
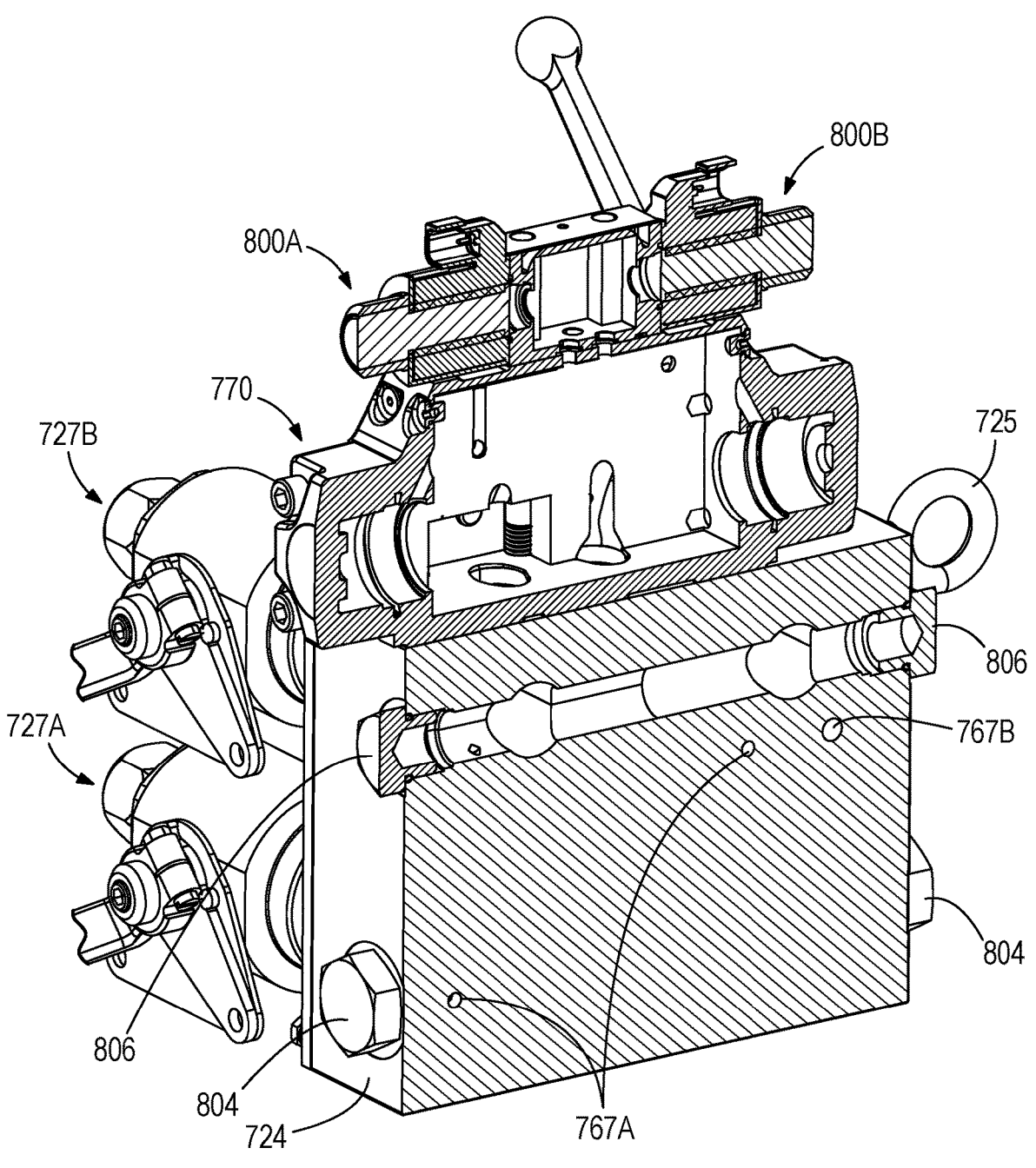
FIG. 26 is a sectional view taken along the line 26-26 in FIG. 25.
Figure 27:
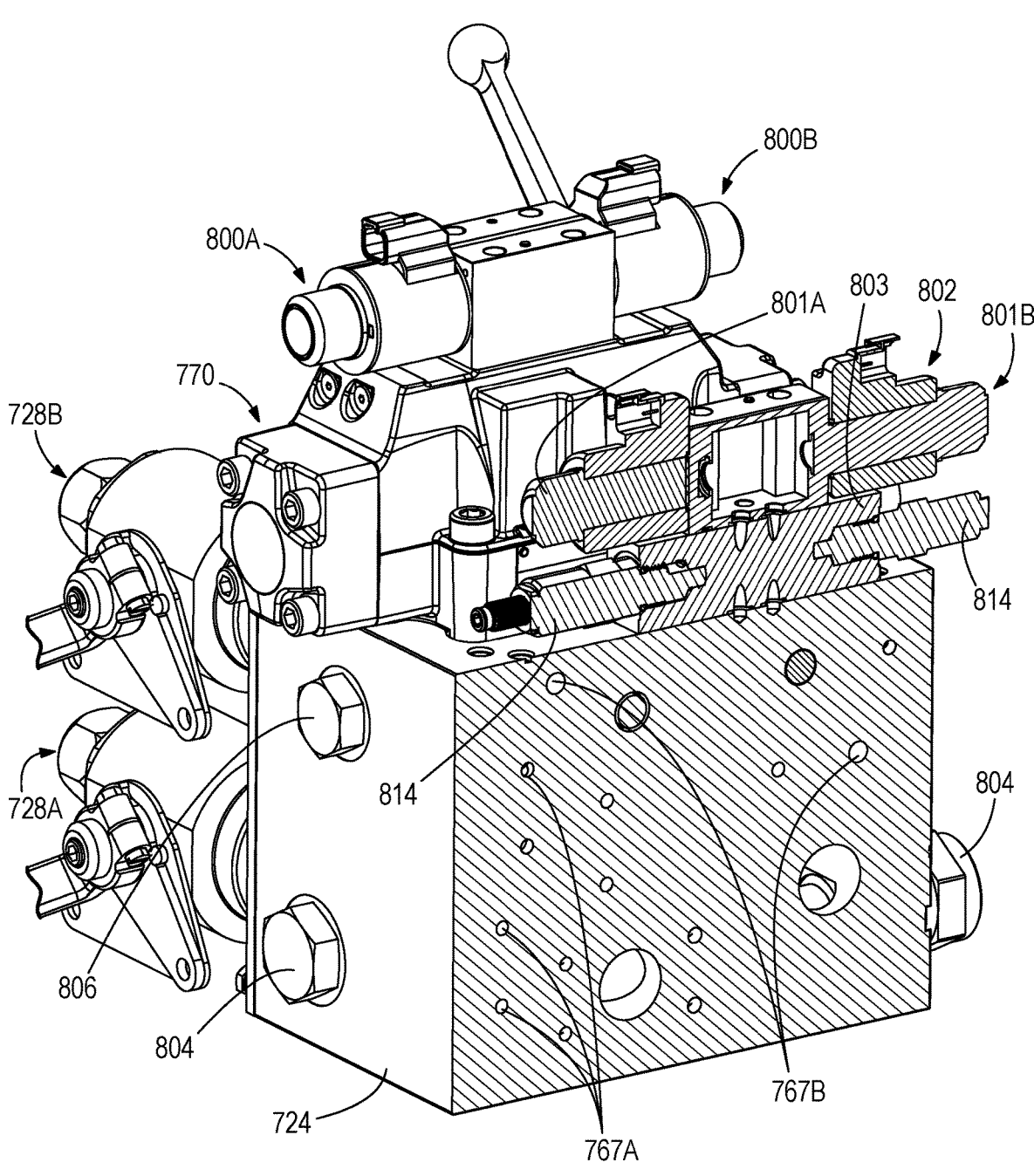
FIG. 27 is a sectional view taken along the line 27-27 in FIG. 25.

FIGS. 25-27 provided additional details regarding the manifold 724. The flow of hydraulic fluid between the manifold 724 and the ball valves 726A-726B, 727A-727B is controlled via operation of direction control solenoid valves 800A and 800B in a manner known in the art, such as to operate the actuators to move the brakes and slow the speed of a railcar, as discussed above. One example of a commercially available directional control solenoid valve is Danfoss part number DG5V-8-H-6C-M-U-H-10. The directional control solenoid valves 800A, 800B control the flow particularly via operating a valve 770 fluidly connected to the manifold 724, which may be a D08 valve such as Danfoss part number DG5V-8-H-6C-M-U-H-10.

With reference to FIG. 25, it should be recognized that various pathways are provided through the manifold 724 to fluidly connect the different ports connected to the hoses and valves discussed above. In certain cases, plugs 804, 806 are provided to seal off these pathways from the outside of the manifold 724, which provides for ease of manufacturing. Additional valves may also be provided for the purposes of providing relief and/or reducing the pressure through different pathways within the manifold 724. By way of example, the manifold 724 includes a pair of cartridge valves 808, 810 operated via solenoids 812 (e.g., 24 VDC Deutsch cartridge valves). The cartridge valves 808, 810 are operable to control a pressure reduction of the hydraulic fluid flowing through different portions of the manifold 724 and thus through different portions of the hydraulic circuit 701.

The manifold 724 further includes a series of test ports (e.g., ports 767A in FIG. 26) through which different measurements may be made for conditions within the different pathways in the manifold 724. In the illustrated example, a series of pressure transducers 764 (also referred to as pressure sensors) are provided in fluid connection with this ports, which provide for measuring a braking pressure for the brakes, a pressure of available for braking, pilot pressures (e.g., if fluidly connected to a pilot pressure passage such as passage 767B in FIG. 26), interior pressure drops within the manifold 724, pressure drops between components connected by hoses, and the like. By way of example, the present inventors have recognized that these pressure transducers 764 may be used to identify when a cartridge within the manifold may be starting to fail or is failing (e.g., via a decrease in pressure) or that a pump may be starting to fail or is failing (e.g., via an increase in pressure). Temperature sensors 768 may also be provided to measure the temperature of the hydraulic fluid in different parts of the hydraulic circuit 701 by measuring in different ports of the manifold 724.

In addition to providing test ports, the present inventors have recognized that it is advantageous to provide lifting eyes 725 for the manifold 724, which when made of ductile iron may be upwards of 200 pounds with cartridges, valves, and the like installed.

Returning to FIGS. 22-24, details are now provided for additional features of the system 700. The system 700 further includes a hydraulic fluid level sensor 756 that measures a volume of hydraulic fluid in the tank 720, which may also include a conventional sight glass, a temperature sensor 757 that measures a temperature of hydraulic fluid in the tank 720, and a hydraulic fluid condition sensor 758 (also referred to as a fluid quality sensor) that measures the quality or condition of the hydraulic fluid within the hydraulic circuit 701. These sensors or others like them may also be positioned elsewhere in the hydraulic circuit 701. The hydraulic fluid condition sensor 758 by may be of a type commercially available, such as Power Systems part number OQSXG2-1-CC-10-5. By way of example, the hydraulic fluid condition sensor 758 can measure an amount of particulate within the hydraulic fluid (e.g., in ppm), and also ascertain the types of particulates therein (e.g., brass versus copper versus iron). The hydraulic fluid level sensor 756 and the hydraulic fluid condition sensor 758 each serve as input devices CS99 to the control system C (FIG. 17) and allow the control system C to generate notifications, schedule maintenance, and/or modify an operation within the system 700 based on these inputs. In certain embodiments, the control system C compares the quality measurement from the hydraulic fluid condition sensor 758 to one or more thresholds stored in the data CS124 in the memory system CS120 and triggers actions such as notifications when these thresholds are exceeded. By way of example, the control system C may be configured to notify the user that one of the body of one of the pumps may be wearing if the particulate is identified as iron and exceeds a first threshold, and to notify the user that the shoe of a piston pump (e.g., first pump 704) is wearing if the particulate is identified as brass and exceeds a second threshold.

FIG. 28 illustrates a representation of the motor 702, the first pump 704, and the second pump 706. As discussed above, the same motor 702 (which may be a variable speed motor), rotates both the first pump 704 and the second pump 706 to perform the functions detailed above. A shaft 772 extends between a first end 774 that is a male and a second end 776 that is female. The first end 774 mates via splined teeth with a corresponding female portion of the shaft 778 of the motor 702. The first pump 704 is a pressure compensated pump. Within the first pump 704, the shaft 772 rotates a cylinder block 780 (e.g., having a splined connection therewith) having pistons 782, which when rotated engage with a swash plate 784 to cause a pumping action in a known manner. Other types of pumps are also contemplated, such as the shaft 772 rotating a vane or impeller. However, the present inventors have recognized that having a swash plate pump as the first pump 704 is particularly advantageous in that the flow rate of the first pump 704 is adjustable to meet the demand of the system 700, as discussed above. In short, a digital directional control valve 794 uses the hydraulic fluid provided via the hose 728 (FIG. 22) to apply a force on the swash plate 784 that overcome a bias from a spring 786 to thereby change a position of the swash plate 784 relative to the cylinder block 780. This changes the flow output of the first pump 704.

The shaft 772 extends entirely through the first pump 704 with the second end 776 engaging a correspondingly splined first end 788 of the shaft 790 rotating within the second pump 706. In the illustrated example, the second pump 706 has two vanes 792 and thus also functions like separate pumps 707A, 707B. The two vanes 792 may be rotationally fixed together to form part of the shaft 790. In the hydraulic circuit 701 discussed above, one of the two vanes 792 maintains the pressure within the pilot side of the manifold 724 (FIG. 22) and the other of the two vanes 792 circulates the hydraulic fluid to be cooled by the heat exchanger 714, among other functions provided by the second pump 706.

Additional information is now provided regarding one exemplary manifold 724 for use within the system 700 according to the present disclosure. In general, the manifold 724 controls the direction of the hydraulic fluid traveling within the hydraulic circuit 701 and also regulates the maximum pressure to be provided for the retarder. The manifold 724 has 3 positions to extend and retract the cylinders to slow the railcar in the manner described above. The center position of the valve provides for the flow of hydraulic fluid from the first pump 704 flow to unload at idle times, and also provides a means of releasing all stored pressure in the retarder in the event of e-stop condition or lock out and tag out.

The pressure to the retarder is regulated by the manifold 724 (within a tolerance) in at least three modes. During a first mode providing high flow and low pressure mode, the first pump 704 is operated at a maximum flow (e.g., approximately 70 gallons per minute) and minimum pressure (e.g., less than 150 PSI). In this first mode, one of the solenoid 801A and the solenoid 801B of the valve 803 is energized, whereby the valve 810 determines the pressure setting. The pressure setting of the valve 808 and the valve 810 may be higher than for the solenoid 801 to ensure no interference with the pressure setting for the solenoid 801.

A second mode provides for low flow and low pressure, whereby the first pump 704 is operated at the minimum flow (e.g., approximately 2-3 gallons per minute) and minimum pressure (e.g., less than 150 PSI). Either the solenoid 801A or solenoid 801B is energized, the valve 810 is set to a pressure of 400 PSI, and the valve 808 is set to a pressure of 300 PSI.

A third mode provides for low flow and high pressure, whereby the first pump 704 is operated at the minimum flow (e.g., approximately 2-3 gallons per minute) and high pressure (e.g., above 150 PSI). Both the solenoid 801A and the solenoid 801B are de-energized and the pressure of the valve 810 is set 100 PSI higher than the pressure of the valve 808, by way of example. This higher pressure in the valve 810 pilots a large logic element (e.g., a Vent to Open Logic Valve such as Eaton's part number DPS2-20-V-F-0-40) to form a high flow relief valve. This limits the amount of pressure overshoot that occurs when a load induced pressure spike occurs within the hydraulic circuit 701.

Referring to FIGS. 23 and 24, additional information is now provided for the coolant system 900 for circulating a coolant through a coolant circuit 901 to cool the motor 702 and the motor drive 703, which also exchanges heat through the second radiator 717B of the heat exchanger 714 as discussed above. By way of example, the coolant may be a 50/50 water ethylene glycol mixture (WEG), which is stored in a tank 902 (also referred to as a reservoir). The tank 902 is configured to accommodate thermal expansion of the coolant as needed and provides a "make-up" system for the volume of coolant circulating throughout the coolant circuit 901. In certain embodiments, the tank 902 has a 5 qt capacity and is clear so as to easily discern the level of coolant therein.

A pump 904 draws the coolant from the tank 902 via a hose 906. The pump 904 is driven by a motor 908, such as a 24 VDC electric motor (powered by a correspond type and size of power supply 909). The motor 908 includes a controller 910 that communicates (e.g., via CanOpen bus) within the control system C (FIG. 17) more generally, whereby the controller 910 controls the operation of the motor 908, including based on a temperature of the coolant measured by a thermistor 912 that communicates with the controller 910. By way of example, the controller 910 may be an HFX 32 controller or an HFX48 controller produced by Eaton, which are mobile duty controllers with 16 configurable inputs and 16 configurable outputs, or 24 configurable inputs and 24 configurable outputs, respectively, that communicate on the CanOpen bus. In certain embodiments, the controller 910 within the control system C of FIG. 17, or another element within the control system C more generally, is configured to communicate via a transceiver 922 with another remove device located outside the enclosure of the system 700 for control, diagnostics, and/or the like.

The pump 904 pumps the coolant to the motor drive 703 via a hose 914, which flows through conduits in the motor drive 703 to provide cooling thereto. The coolant then flows to the motor 702 via a hose 916, which then flows through conduits in the motor 702 to provide cooling thereto. The coolant then flows via a hose 918 to the second radiator 717B of the heat exchanger 714, exchanging heat therewith. The fan 715 provides for additional heat removal from the coolant as it flows through the second radiator 717B. The coolant then flows back to the tank 902 via a hose 920 to continue the loop again.

With reference to FIG. 17, the control system C may be or include a Deep Sea Electronics mobile duty HMI (e.g., part number P/N: M840-02) that serves as the master controller to the systems 20, 700, 900 and will contain the application code to control the various retarder functions described in. While not exhaustive, these functions include input logic with diagnostics (e.g., for evaluating sensors if and when they fall out of a specified range) and output logic with outputs to detect open and shorted conditions (e.g., for solenoids, sensors, and other valves). The control system C further provides control logic for the motor 702 and/or the motor drive 703, such as to provide a default speed settings for the motor 702 (e.g., an RPM between 1000 and 2500 or between 1500 and 2000), as well as other speed settings to help with heat generation and provide energy saving by reducing the RPM (e.g., between 400 and 800 or between 500 or 700 RPM) when the system is idling for long periods of time. When in pressure control modes, the control system C is configured to reduce the speed setting for the motor 702 to a speed sufficient to provide enough hydraulic fluid to overcome system leakage while maintaining the desired pressure setting. In certain embodiments, the control system C may nonetheless provide for a minimum RPM, such as between 400 and 800 or between 500 and 700 RPM.

The control system C may also be configured to provide for retarder state or pressure logic, which is the logic to determine if the retarder is open or closed and the desired pressure setting to effectuate these positions as demanded. This logic may also include code to auto-correct the pressure setting to maintain a desired tolerance.

The control system C may also be configured to provide for control of the coolant system 700, such as speed setting for the pump 904. The speed setting may be based on temperature feedback from within the coolant circuit 901, such as the thermistor 912 or other temperature sensors within the motor 702 and/or the motor drive 703.

The control system C may also be configured to provide for predictive maintenance calculations. By way of example, this includes determining end-of-life calculations for the various components described herein, including the motor 702, the first pump 704, the second pump 706, or the motor 908, for example. In another example, the control system C uses sensor data to determine when the hydraulic fluid or a filter (e.g., hydraulic, glycol, and/or air) needs to be replaced.

Returning to FIG. 22, the system 700 further includes a notification system that communicates within the control system C and is configured for notifying the user of the various conditions described above. By way of example, the notification system may communicate information relating to high or low pressures, high or low temperatures, high or low flow rates, high or low power, current, voltage, or resistance levels, the quality of the hydraulic fluid, maintenance information, and/or other information. The notification system may include a display device 930 (e.g., an LED touchscreen), speakers or alarms, or other known mechanisms for communicating information to users. The notification system and components thereof may be positioned inside the enclosure of the system 700 so as to be protected from weather elements, positioned on the outside of the enclosure for ease of viewing, or located remotely from the enclosure (e.g., a remote computer or portable electronic device).

The display device 930 is configured to not only display the various conditions discussed above, but also guidance for how to resolve or prevent any issues identified by the control system C based on these conditions. For example, a low pressure measurement in one portion of the hydraulic circuit may indicate one component failing, whereas a low pressure measurement elsewhere may indicate a different component failing. The display device 930 notifies the user of this condition (e.g., low pressure in a particular location) and also that the component of interest should be checked.

In certain embodiments, a warning appears on the display device 930 (which may be accompanied by a buzzing sound), requiring the user to resolve the issue and/or press a "clear" button on the touch screen to stop the warning. The control system C may record these warning and clearing events so as to provide insights for when the user clears a warning without taking the appropriate corrective measures, which may have implications for future troubleshooting or warranty coverage.

FIG. 30 provides an exemplary method 1100 for cooling a system that is configured for slowing a railcar, whereby the system includes a brake that slows the railcar when in a closed position and does not slow the railcar when in an open position, and the system further includes an actuator that moves the brake into and between the closed position and the open position. Step 1102 of the method 1100 provides for fluidly coupling the actuator, a reservoir, and a pump to form a hydraulic circuit (e.g., the hydraulic circuit 701 of FIG. 24). Step 1104 provides for measuring a temperature of hydraulic fluid within the hydraulic circuit and comparing the temperature to a threshold (e.g., stored in the memory system CS120 of FIG. 17). Step 1106 then provides for controlling a valve to cause the hydraulic fluid to flow to a heat exchanger when the temperature of the hydraulic fluid exceeds the threshold, and controlling the valve to cause the hydraulic fluid to bypass the heat exchanger when the temperature of the hydraulic fluid is less than the threshold. The heat exchanger is configured to exchange heat with the hydraulic fluid to prevent the temperature of the hydraulic fluid from exceeding a target operating temperature.

FIG. 31 provides another exemplary method 1200 for cooling a system that is configured for slowing a railcar, whereby the system includes a brake that slows the railcar when in a closed position and does not slow the railcar when in an open position, and the system further includes an actuator that moves the brake into and between the closed position and the open position. Step 1202 provides for fluidly coupling the actuator, a reservoir, and a pump operated by a motor to form a hydraulic circuit through which a hydraulic fluid flows (e.g., the hydraulic circuit 701 of FIG. 24). Step 1204 provides for fluidly coupling the motor to a coolant circuit through which a coolant flows, wherein the coolant remains fluidly isolated from the hydraulic fluid (e.g., the coolant circuit 901 of FIG. 24). Step 1206 provides for circulating the coolant through the coolant circuit to prevent the motor overheating during operation of the system for slowing the railcar.

FIGS. 32-37 shows additional details for one embodiment of enclosure 1300 for housing the components of the system 700 discussed above. The enclosure 1300 extends a depth D1 between a front 1302 to a back 1304, a width W1 between a left 1306 and a right 1308, and a height H1 between a top 1310 and a bottom 1312. Forklift openings 1314 are provided within the bottom 1312 for ease of moving the enclosure 1300. The enclosure 1300 includes a housing 1316 that comprises the lower portion of the enclosure 1300, as well as a lid 1318 that is movable relative to the housing 1316 for accessing the system 700. In the illustrated enclosure 1300 of FIGS. 32-33, the lid 1318 is pivotable relative to the housing 1316 via hinges 1320. Handles 1321 and gas springs 1322 are provided for ease of pivoting the lid 1318 to the open position shown in FIG. 33, as well as retaining it in that open position.

A front panel 1324 of the housing 1316 is also pivotable (via hinges 1326) relative to the remainder of the housing 1316 to provide improved access within the enclosure 1300. By way of example, the front panel 1324 may be pivoted downwardly for installation, inspection, and maintenance of the manifold 724 (FIG. 22, discussed above) or other components of the system 700. The front panel 1324 can be locked in the closed position of FIG. 32 via toggling rotatable latches 1328. The lid 1318 can be locked to the front panel 1324 via hasp 1330 such that neither can be opened without removing a padlock.

Figure 33:
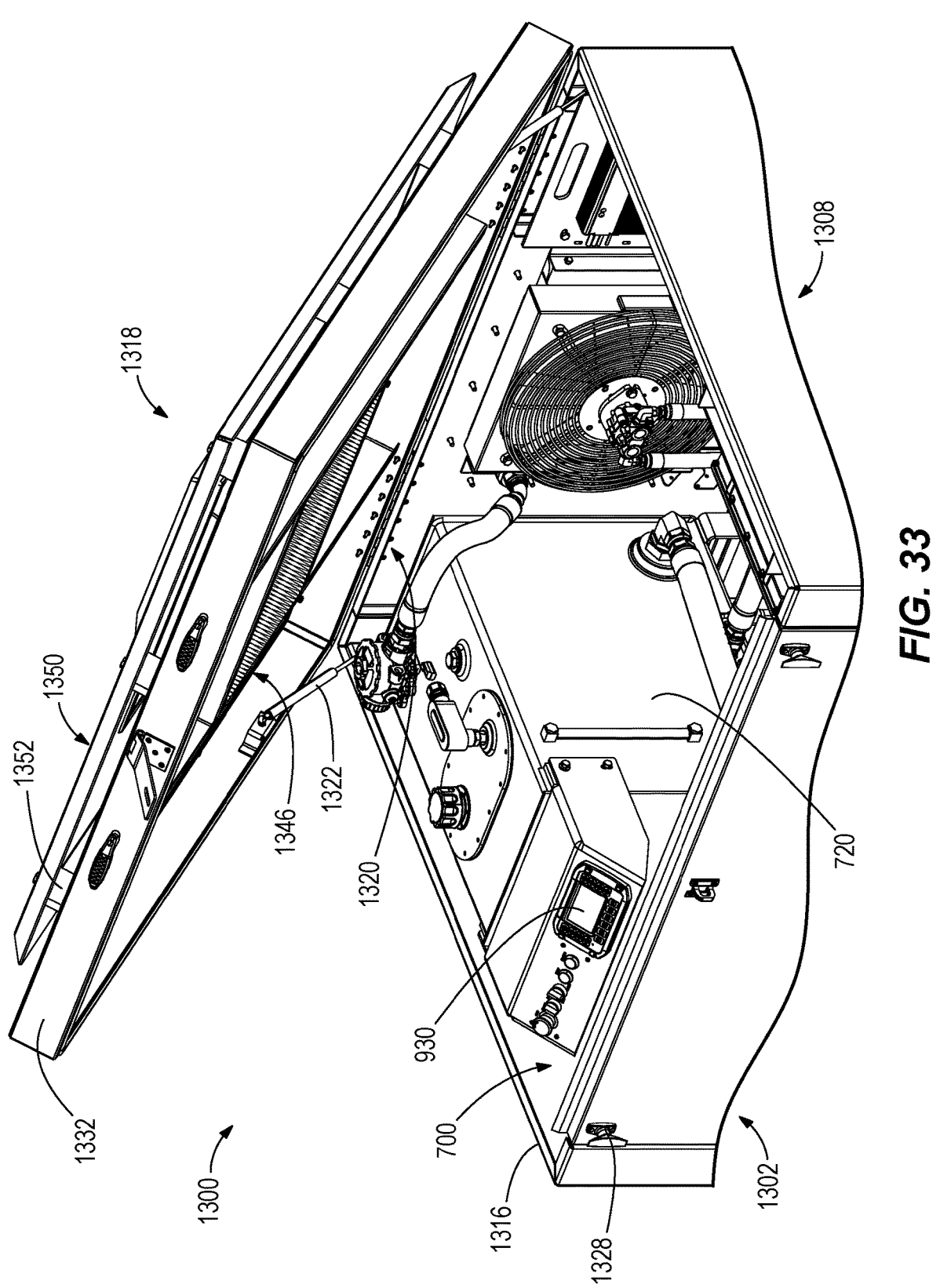
FIG. 33 is a perspective front view of the enclosure of FIG. 32 with a lid open.
Figure 34:
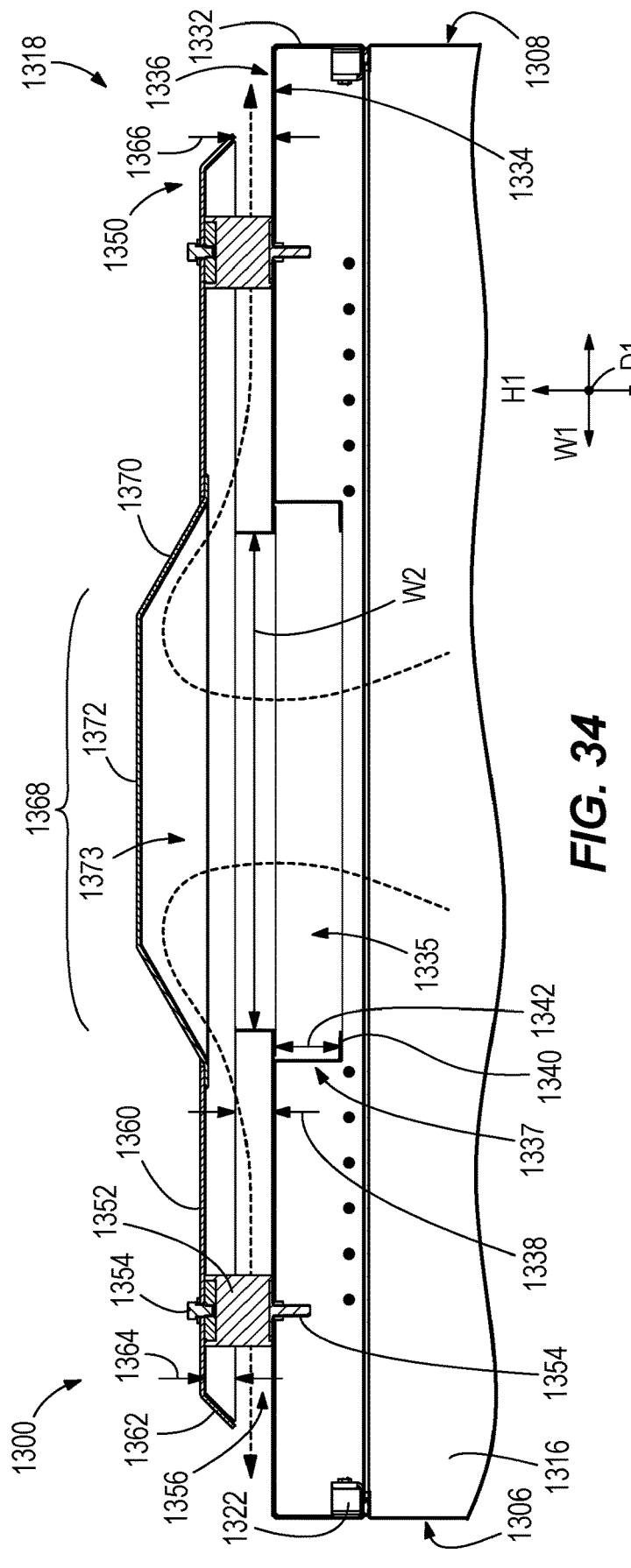
FIG. 34 is a sectional view taken along the line 34-34 in FIG. 32.

A sectional view of one embodiment of the lid 1318 is shown in FIG. 33-34. The lid 1318 has walls 1332 and an upper plate 1334 that form a lower frame 1336. which generally extends the same depth D1 and width W1 as the housing 1316 upon which is rests when in the closed position. The upper plate 1334 has an opening 1335 therethough, which has a width W2 and a depth (extending into the page), in the present embodiment being approximately square shaped such that the width W2 approximately equals the depth. A chimney 1337 is provided around the perimeter of the opening 1335. The chimney 1337 extends perpendicularly from the upper plate 1334 and extends a distance 1338 above and a distance 1340 below the upper plate 1334. A lip 1342 extends perpendicularly inwardly from the lower end 1344 of the chimney 1337 and is configured to hold a filter 1346 therein. The filter 1346 may be a metal screen.

The lid 1318 further includes a cover 1350 that is attached to the lower frame 1336 via a series of standoffs 1352, which may be plastic or rubber blocks connected via fasteners 1354 such as screws or bolts, adhesives, or other known methods. The standoffs 1352 provide that the cover 1350 is separated in the height H direction from the housing 1316, and here also from the lower frame 1336 of the lid 1318. In other words, the lid 1318 is configured such that a gap 1356 remains between the cover 1350 and the housing 1316.

Figure 32:
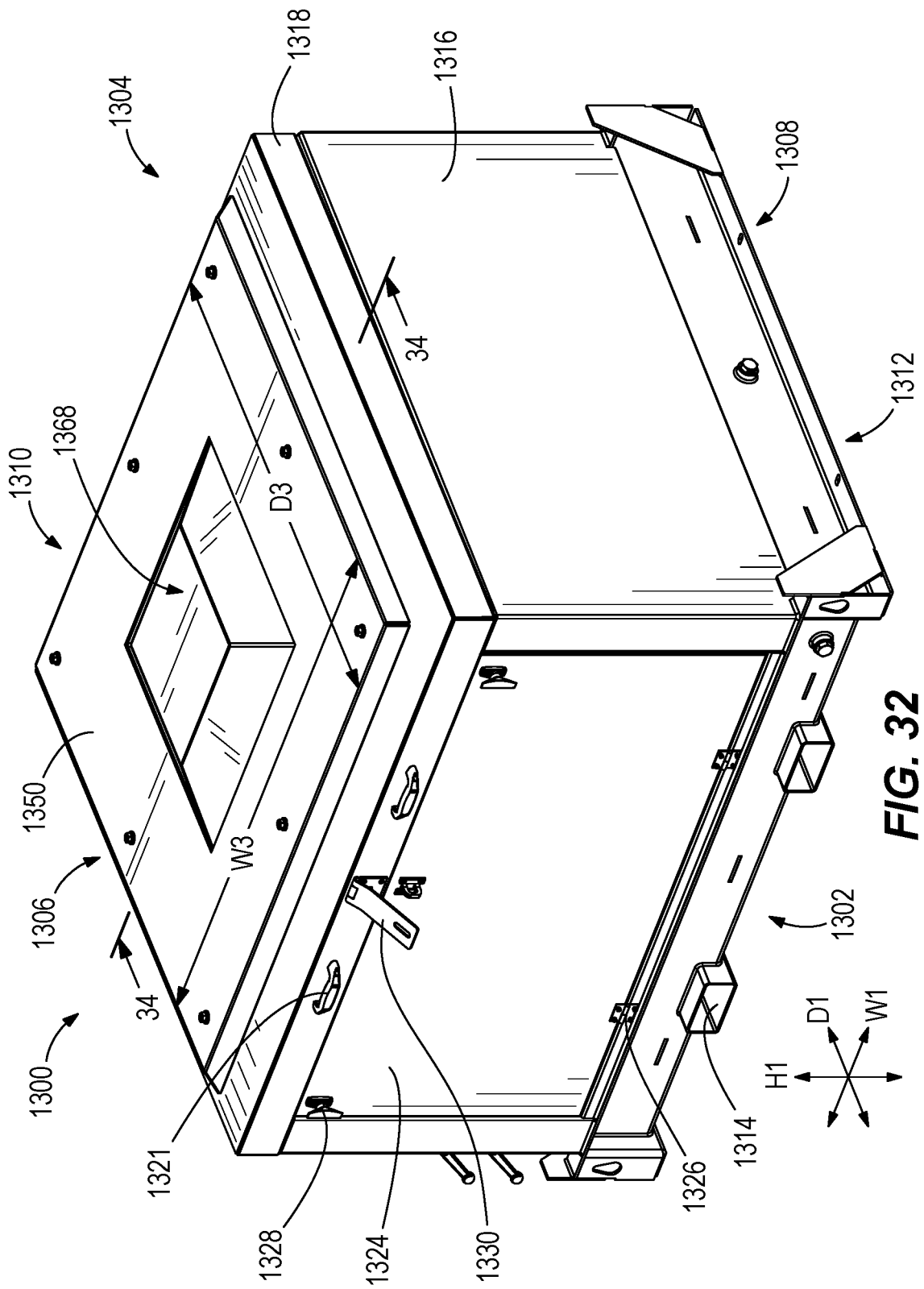
FIG. 32 is a perspective front view of the enclosure housing the system of FIG. 23.

For the lid 1318 illustrated to FIGS. 32-34, the cover 1350 is centered over the lower frame 1336 (in both the width and depth direction). The cover 1350 has a width W3 and a depth D3 that are approximately equal to each other, but less those of the lower frame 1336. The cover 1350 has a lower plate 1360 and angled plates 1362 that extends downwardly at an angle from the outer perimeter of the lower plate 1360. The angled plates 1362 extend downwardly by a height 1364. A height 1366 between the outer edge of the angled plates 1362 and the lower frame 1336 is shown to be approximately equal to the distance 1338 that chimney 1337 extends above the upper plate 1334. The present inventors have configured the lid 1318 in this manner such that horizontally moving precipitation or debris that flows under the cover 1350 is blocked by the upper portion of the chimney 1337 and thus does not enter the enclosure via the opening 1335.

To further improve airflow, including the escape of heat from inside the enclosure 1300, a central portion 1368 extends upwardly from the lower plate 1360 of the cover 1350. The central portion 1368 includes angled plates 1370 that extend at an angle upwardly from the lower plate 1360 and are connected via an upper plate 1372. The angled plates 1370 and the angled plates 1362 may extend at approximately the same angle as each other (e.g., 45 degrees relative to the vertical direction), and the lower plate 1360 and the upper plate 1370 may each extend at approximately the same angle as each other (here being approximately parallel to the horizontal plane). The illustrated configuration provides for an increased volume of a cavity 1373 below the central portion 1368 of the cover 1350, which improves the airflow 1374 from inside the enclosure 1300 outwardly, particularly in recognition of hot air rising.

By configuring the enclosure 1300 in this manner, the cover 1350 at least partially shades the housing 1316 of the enclosure 1300 from direct sunlight. In other words, the gap between the cover 1350 and the upper plate 1334 of the lid 1318 provides a thermal buffer for the housing 1316. Through experimentation and development, the present inventors have found that the cover 1350 acting as a sunshade can result in the cover 1350 and the upper plate 1334 of the lower frame 1336 having a temperature difference of 15-20° F. This greatly reduces the temperature within the enclosure, improving the lifespan of components therein and reducing the load for the systems involved in keeping them cool.

Additionally, the positioning of the cover 1350 relative to the housing 1316, including the opening 1335 that communicates air and heat through the upper plate 1334, prevents ingress into the housing 1316 from above, as discussed above.

Figure 35:
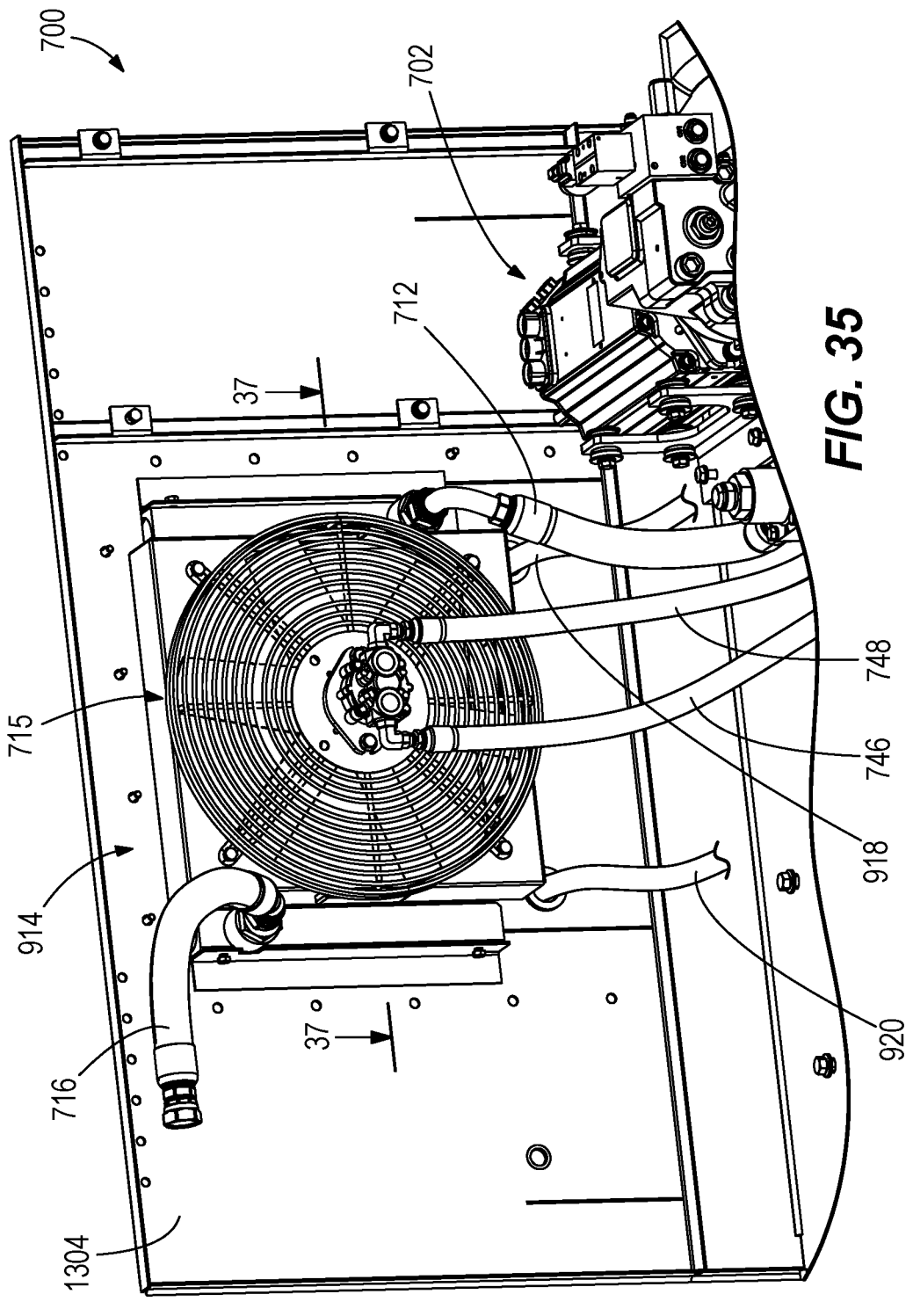
FIG. 35 is a perspective front view of a back wall of the enclosure of FIG. 32.
Figure 36:
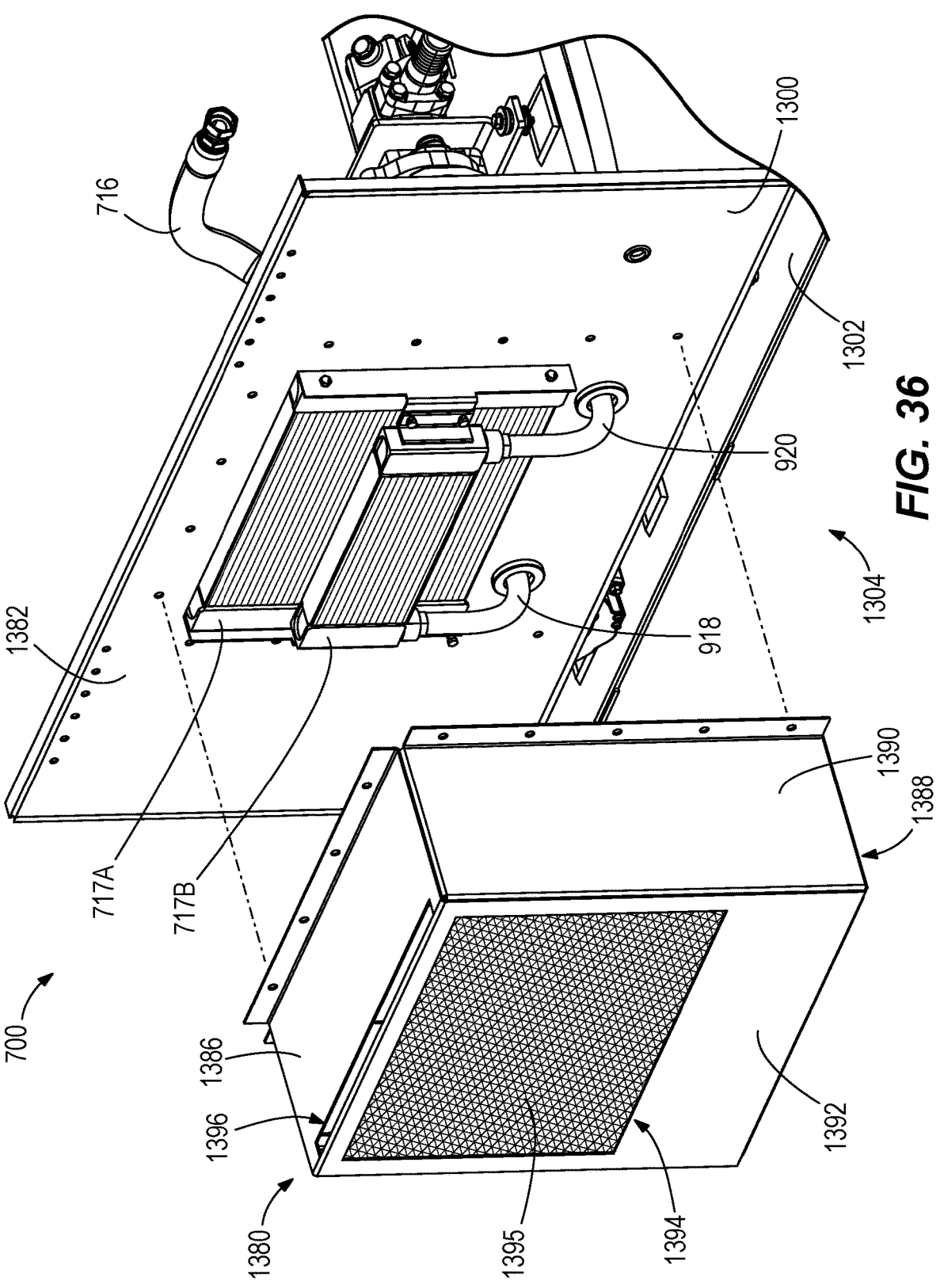
FIG. 36 is a perspective rear view of the enclosure of FIG. 32 with a back cover removed.
Figure 37:
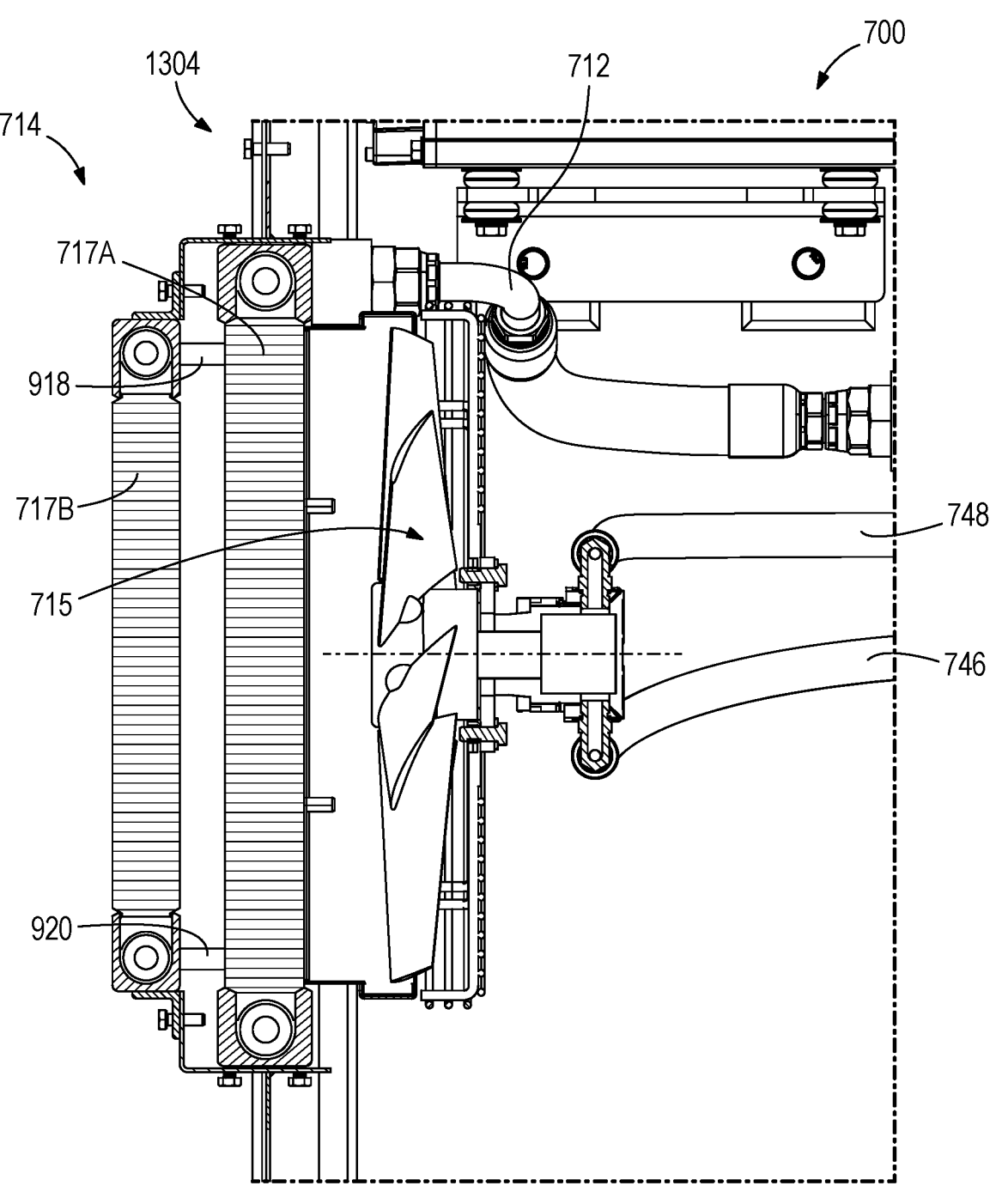
FIG. 37 is a sectional view taken along the line 37-37 in FIG. 35.

FIGS. 35-37 show another configuration of a system 700 according to the present disclosure along with further details regarding the enclosure 1300. FIG. 36 shows a rear enclosure 1380 removed from a rear wall 1382 of the enclosure 1300 to expose the second radiator 717B and part of the first radiator 717A, which as discussed above exchange heat for cooling the coolant and the hydraulic fluid within the system 700. The rear enclosure 1380 has sides 1384 corresponding to a top 1386, a bottom 1388, and sides 1390, as well as a rear panel 1392. The rear enclosure 1380 is configured so as to entirely enclose the first radiator 717A, the second radiator 717B, and hoses 918, 920 connected thereto so as to protect these components from the elements. The rear enclosure 1380 is removably attached to the rear wall 1382 via fasteners such as screws or bolts, but may be attached by other methods known in the art (e.g., hinges and latches like the front panel 1324 (FIG. 32) discussed above.

As shown in FIG. 36, an opening 1394 is provided in the rear panel 1392 of the rear enclosure 1380, here having a rectangular shape. The opening 1394 allows air to be drawn in the enclosure therethrough, via the fan 715 (FIG. 35) to cool the stacked radiators. It should be recognized that the first radiator 717A and the second radiator 717B are considered stacked despite not touching each other, describing the serial flow path from outside the enclosure to the fan 715. A filter 1395 is contained within a slot 1396 that extends from the top 1386 of the rear enclosure 1380. The filter 1395 prevents debris and pests from entering or being sucked into the rear enclosure 1380.

The systems and methods described herein therefore provide improved efficiency, performance, and reliability over retarder systems presently known in the art, particularly by managing the pressure of the hydraulic fluid via active control of a variable speed motor and/or cooling such as system.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for retarding a railcar having wheels, the system comprising:
   a brake and an actuator configured to move the brake between a closed position in which the brake contacts the wheels of the railcar and an open position in which the brake does not contact the wheels of the railcar;
   a hydraulic circuit through which a hydraulic fluid flows between the actuator and a reservoir;
   a first pump operably connected within the hydraulic circuit and configured to provide the hydraulic fluid to the actuator for operating the brake;
   a heat exchanger operably connected within the hydraulic circuit and configured to cool the hydraulic fluid flowing therethrough, wherein the heat exchanger prevents the hydraulic fluid within the hydraulic circuit from exceeding a target operating temperature;
   a second pump operably connected within the hydraulic circuit and configured to provide the hydraulic fluid to the heat exchanger;
   a motor that operates at least one of the first pump and the second pump, wherein the motor is a variable speed motor operable at a plurality of speeds between fully-on and fully-off states; and
   a control system configured to control a displacement of the first pump during operation thereof, wherein the displacement is controllable independently from controlling the variable speed motor.

2. The system according to claim 1, wherein the motor is liquid cooled.

3. The system according to claim 1, wherein the motor operates the first pump and the second pump simultaneously.

4. The system according to claim 1, wherein the motor is controlled via a motor drive, and wherein the motor drive is liquid cooled.

5. The system according to claim 1, wherein the variable speed motor is a brushless DC motor.

6. The system according to claim 1, wherein the variable speed motor is operable at the plurality of speeds by adjusting a frequency of voltage delivered thereto.

7. The system according to claim 1, further comprising a temperature sensor that measure a temperature of the hydraulic fluid within the hydraulic circuit, a valve operatively coupled within the hydraulic circuit and configured to change a flow of the hydraulic circuit to the heat exchanger, wherein the control system is operatively coupled to the valve and configured to control the valve based on the temperature measured by the temperature sensor.

8. The system according to claim 7, wherein the control system is configured to compare the temperature measured by the temperature sensor to a lower threshold and to bypass the heat exchanger when the temperature is below the lower threshold.

9. The system according to claim 1, wherein the heat exchanger comprises a radiator and a fan.

10. The system according to claim 9, wherein the fan is hydraulically operated via the hydraulic fluid flowing through the hydraulic circuit.

11. The system according to claim 1, further comprising a coolant system in which a coolant flows through a coolant circuit to cool the motor so as to prevent the motor from overheating.

12. The system according to claim 11, wherein the heat exchanger comprises a first radiator and a second radiator, and wherein the first radiator is operatively connected within the hydraulic circuit so as to provide heat exchange for the hydraulic fluid, and wherein the second radiator is operatively connected within the coolant circuit so as to provide heat exchange for the coolant.

13. The system according to claim 12, wherein the first pump and the second pump are both operated by the motor.

14. The system according to claim 12, further comprising a fan configured to cool both the first radiator and the second radiator.

15. The system according to claim 11, wherein the coolant system comprises a pump for circulating the coolant through the coolant circuit, further comprising a temperature sensor that measures a temperature of the coolant within the coolant circuit, wherein the control system is configured for operating the pump based on the temperature of the coolant within the coolant circuit.

16. The system according to claim 1, wherein the displacement of the first pump is controllable via a digital directional control valve operatively coupled thereto.

17. A system for retarding a railcar having wheels, the system comprising:
   a brake and an actuator configured to move the brake between a closed position in which the brake contacts the wheels of the railcar and an open position in which the brake does not contact the wheels of the railcar;
   a hydraulic circuit through which a hydraulic fluid flows between the actuator and a reservoir;
   a first pump operably connected within the hydraulic circuit and configured to provide the hydraulic fluid to the actuator for operating the brake;
   a heat exchanger operably connected within the hydraulic circuit and configured to cool the hydraulic fluid flowing therethrough, wherein the heat exchanger prevents the hydraulic fluid within the hydraulic circuit from exceeding a target operating temperature;
   a second pump operably connected within the hydraulic circuit and configured to provide the hydraulic fluid to the heat exchanger;
   a motor that operates at least one of the first pump and the second pump; and
   an enclosure in which the first pump, the second pump, and the motor are situated for protection, wherein the enclosure comprises a housing and a cover separated from the housing, wherein the cover at least partially shades the housing, and wherein the cover is positioned above the housing such that a gap remains therebe-
tween to provide a thermal buffer between the housing
and the cover.

18. The system according to claim 17, wherein an opening
extends through a top of the housing, and wherein the cover
is positioned at least over the opening to prevent ingress into
the housing from above.

19. A method for cooling a system for slowing a railcar,
the system including a brake that slows the railcar when in
a closed position and does not slow the railcar when in an
open position, and the system further including an actuator
that moves the brake into and between the closed position
and the open position, wherein the actuator is fluidly coupled
to a reservoir and a pump to form a hydraulic circuit and the
pump is operated by a variable speed motor, the method
comprising:

measuring a temperature of hydraulic fluid within the
hydraulic circuit and comparing the temperature to a
threshold;

controlling a valve to cause the hydraulic fluid to flow to
a heat exchanger when the temperature of the hydraulic
fluid exceeds the threshold, and controlling the valve to
cause the hydraulic fluid to bypass the heat exchanger
when the temperature of the hydraulic fluid is less than
the threshold, wherein the heat exchanger is configured
to exchange heat with the hydraulic fluid to prevent the temperature of the hydraulic fluid from exceeding a
target operating temperature;

measuring a pressure of the hydraulic fluid within the
hydraulic circuit; and controlling a speed of the variable speed motor and
controlling a displacement of the pump during opera-
tion thereof based on the pressure of the hydraulic fluid.

20. A method for cooling a system for slowing a railcar,
the system including a brake that slows the railcar when in
a closed position and does not slow the railcar when in an
open position, and the system further including an actuator
that moves the brake into and between the closed position
and the open position, the method comprising:

fluidly coupling the actuator, a reservoir, and a pump
operated by a variable speed motor to form a hydraulic
circuit through which a hydraulic fluid flows;

fluidly coupling the variable speed motor to a coolant
circuit through which a coolant flows, wherein the
coolant remains fluidly isolated from the hydraulic
fluid;

changing a displacement of the pump and a speed of the
variable speed motor during operation thereof; and circulating the coolant through the coolant circuit to
prevent the variable speed motor from overheating
during operation of the system for slowing the railcar.

* * * * *